United States Patent

[11] 3,554,187

[72] Inventors Harvey F. Glassner
 Los Angeles, Calif.;
 Clinton O. Jorgensen, Ogden, Utah; Lee R.
 Baessler, Manhattan Beach, Calif.
[21] Appl. No. 500,122
[22] Filed Oct. 21, 1965
[45] Patented Jan. 12, 1971
[73] Assignee Humetrics Corporation
 a corporation of Delaware. by mesne
 assignment

[54] METHOD AND APPARATUS FOR
 AUTOMATICALLY SCREENING OF
 ELECTROCARDIAC SIGNALS
 43 Claims, 25 Drawing Figs.
[52] U.S. Cl. .................................................. 128/2.06
[51] Int. Cl. .................................................. A61b 5/04
[50] Field of Search .......................................... 128/2.05,
 2.06

[56] References Cited
 UNITED STATES PATENTS
 3,123,768  3/1964  Burch et al. .............. 128/2.06X
 3,156,235  11/1964 Jaeger ...................... 128/2.05
 3,267,934  8/1966  Thornton ................. 128/2.06
 3,280,817  10/1966 Jorgensen et al. ........ 128/2.05

Primary Examiner—William E. Kamm
Attorney—Thomas W. Brennan

ABSTRACT: The method of evaluating electrocardiac signals comprising:
 detecting electrocardiac signals comprising cycles of successive functional periods variable in both recurrency and wave form characteristics, one of said variable periods including a QRS wave train having at least one peak;
 determining S-wave duration;
 generating a triggering signal responsive to the substantially unfiltered detected electrocardiac signal in substantial uniform time phase relation with the R wave peak and after a delay of S-wave duration;
 generating gating pulses in dependency on the triggering signal, each of the gating pulses having a duration and time phase range for selecting a prescribed functional period of the detected signal;
 electrically measuring the detected electrocardiac signal during each gating pulse to evaluate at least one predetermined characteristic of the related functional period; and
 generating a distinctive output signal when said measurement deviates from limits prescribed for each functional period.

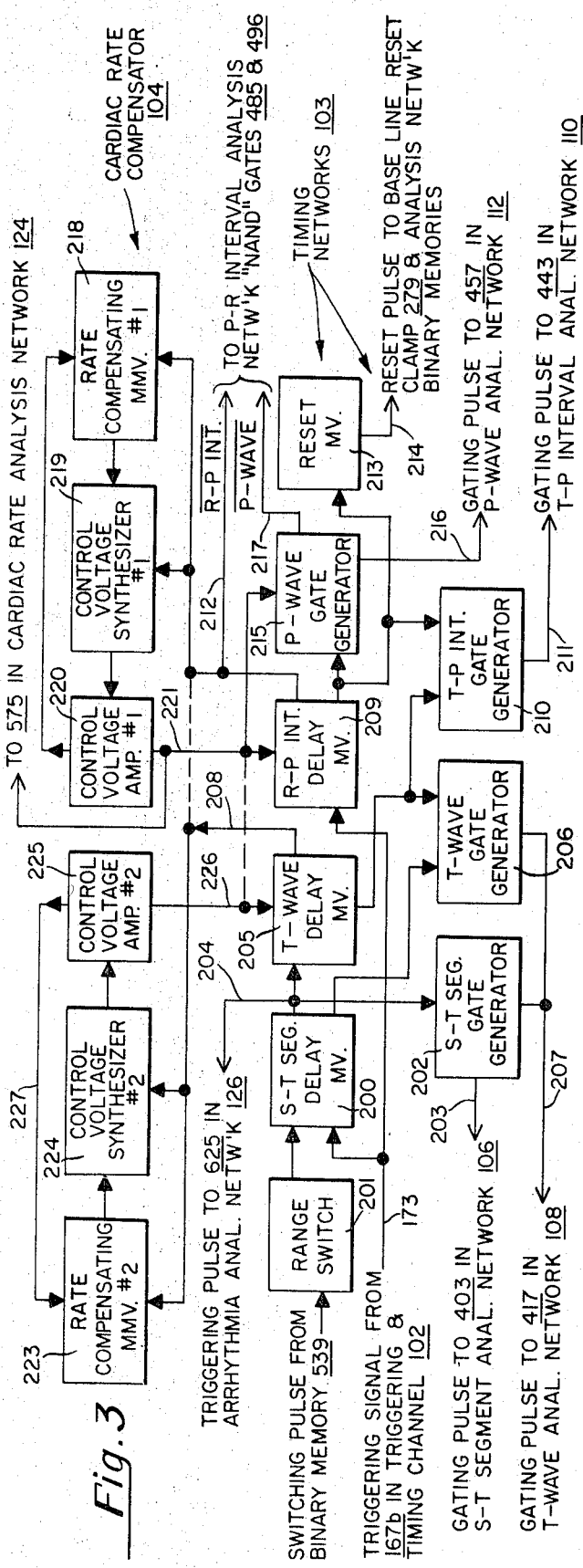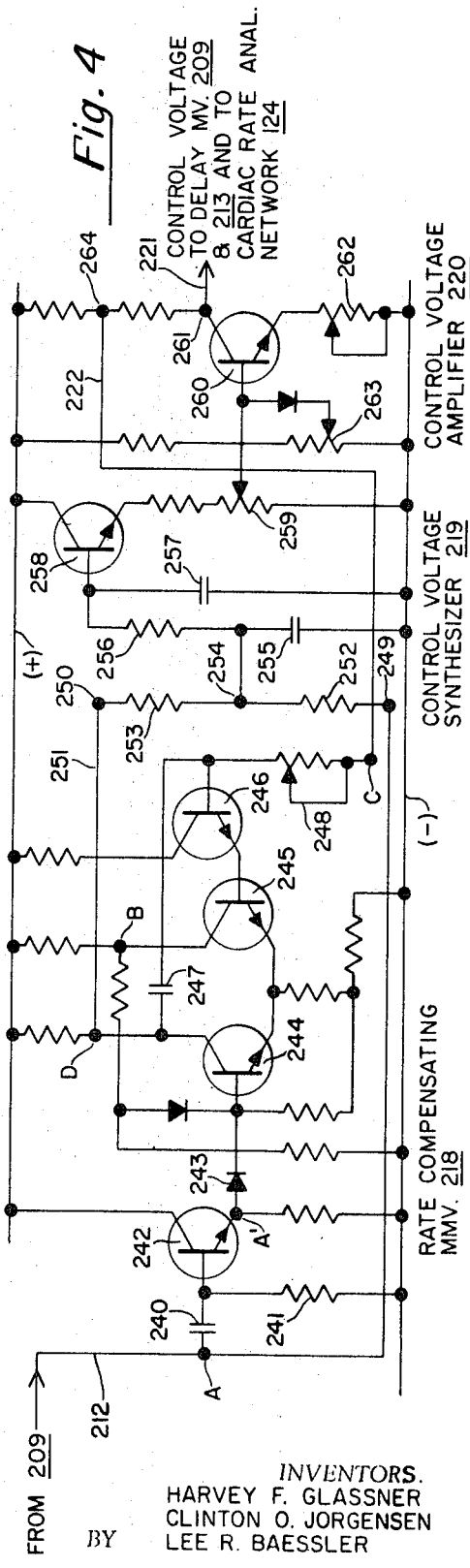

INVENTORS.
HARVEY F. GLASSNER
CLINTON O. JORGENSEN
LEE R. BAESSLER

BY George G. Dower
AGENT

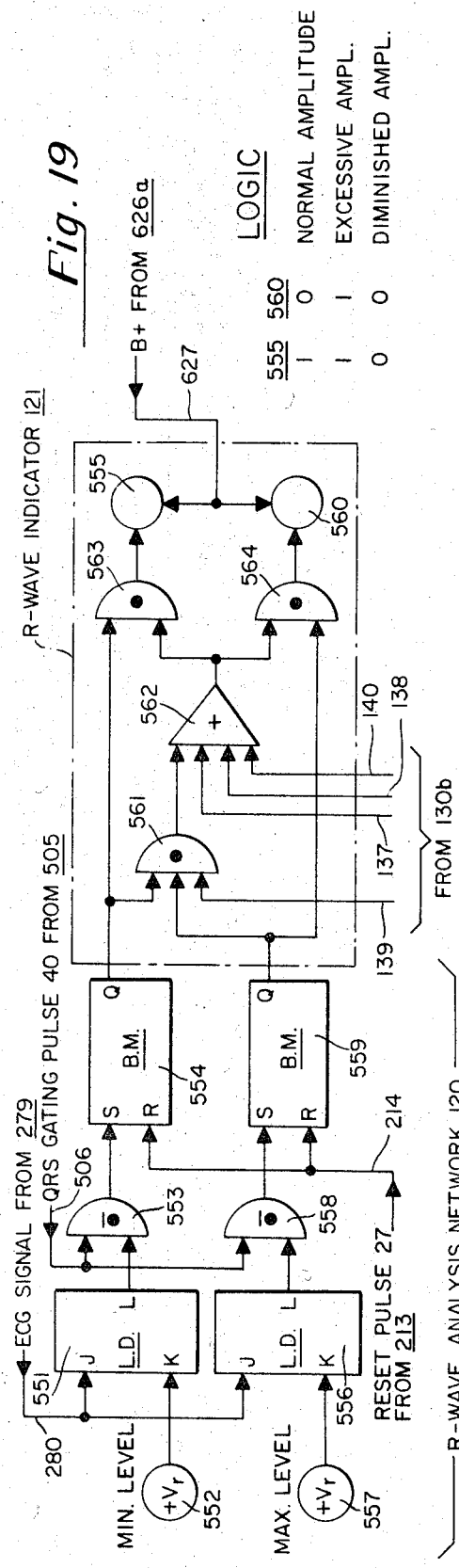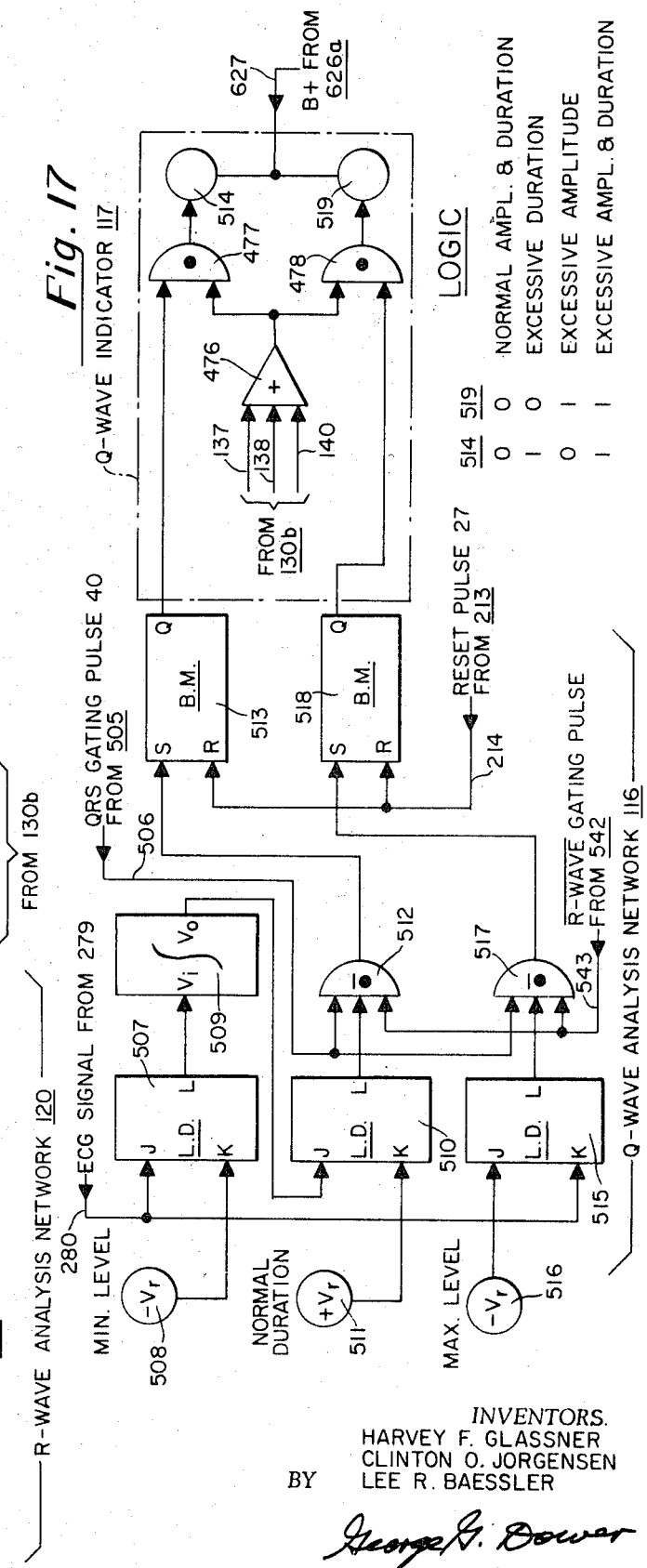

S-WAVE INDICATOR 123

| LOGIC | | |
|---|---|---|
| 569 | 574 | |
| 0 | 0 | NORMAL AMPLITUDE |
| 0 | 1 | EXCESSIVE AMPL. |
| 1 | 0 | DIMINISHED AMPL. |

Fig. 21

CARDIAC RATE INDICATOR 125

| LOGIC | | |
|---|---|---|
| 585 | | |
| 581 | | |
| 0 | 0 | NORMAL RATE |
| 0 | 1 | HIGH RATE |
| 1 | 0 | LOW RATE |

1 = RATE ≤ 70 BPM
0 = RATE > 70 BPM

INVENTORS.
HARVEY F. GLASSNER
CLINTON O. JORGENSEN
LEE R. BAESSLER

BY George F. Dower
AGENT

METHOD AND APPARATUS FOR AUTOMATICALLY SCREENING OF ELECTROCARDIAC SIGNALS

This invention relates to a method and apparatus for screening the heart activity of patients as indicated by recurrent electrocardiac signals representing heart activity information, and for automatically and precisely indicating one or more functional periods of the heart activity in which an abnormality occurs.

The inventive method and apparatus are particularly useful in rapidly screening individuals as well as large numbers of patients for a variety of abnormal electrocardiac signals. Application of the method and apparatus is carried out on a real time basis in physicians offices, hospitals, clinics, schools, industries, military centers and the like, by an attendant who need not be a cardiologist. Subjects characterized by an abnormality are however referred to a cardiologist for further examinations, diagnosis and/or treatment according to classical medical procedures.

Heretofore, it has been general practice to detect electrocardiac signals from the surface of a patient's skin in twelve standard lead configurations, and to amplify the signals and record them, as for example, on a strip chart recorder the record of which includes superimposed timing marks. A physician specially trained in cardiology then visually examines the record and evaluates the wave form characteristics of each recurrent cycle of every lead configuration recorded. This means does not lend itself to rapid screening of large numbers of individuals as will become apparent from the description below.

The electrocardiac signals from each lead configuration comprises recurrent cycles of a recognized series of successive active functional periods disposed between substantially quiescent functional periods which together define a cardiac cycle. These recurrent cycles vary both in recurrency and wave form characteristics from patient to patient as well as within many individuals while the electrocardiac signal is being recorded. The active functional periods are conventionally identified as the P, Q, R, S and T-wave intervals; the substantially quiescent functional periods as the P—R segment which follows the P-wave interval, the S—T segment which lies between the S-wave and the T-wave intervals, and the T—P interval which lies between the T-wave interval and the succeeding P-wave interval. The combined P-wave and P—R segment functional periods are customarily identified as the P—R interval. The R—R period is generally referred to for cyclic identification purposes.

Detection of abnormal electrocardiac signals by current procedures is a difficult and time consuming task. It requires concentrated and protracted attention on the part of the physician to visually examine massive amounts of recorded details and their interactions with respect to the aforementioned functional periods. For example, the recording of each lead configuration is evaluated according to clinical standards for defects in wave amplitude, duration and polarity, intervals of essentially no activity, elevations and depressions of specific segments of the base line; and intracycle and intercycle timing including cardiac rate and arrhythmia, and other features of the signals. This practice is so demanding that even highly skilled physicians sometimes err because of fatigue, their misinterpretation of the recording, or the influential effect a patient's case history may have upon them. While every effort is made to avoid such errors, results of the evaluation vary and at times are not always precise with regard to kind and degree of abnormality evidenced by the recording. It is therefore understandable why rapid screening of large numbers of patients by this means is not only impractical but almost prohibitive when considering the amount of time and proportionate expenses involved.

In the practice of the present invention the electrocardiac signals are also detected from multiple sources and amplified in a conventional manner. However, each source is selected for individual processing on a real time basis generally by means of a triggering and timing channel and a signal analysis channel. The triggering and timing channel includes precise timing networks for sequentially selecting portions of a cardiac cycle representing the aforesaid functional periods and which are automatically compensated when variations in cardiac rate occur. The analysis channel includes a base line reset clamper for restoring the DC base line to a precise reference level each cycle. It further includes electrocardiac signal analysis networks responsive to the timing networks for selectively measuring predetermined characteristics of each of the functional periods. Cardiac rate and arrhythmia are continuously measured but are dependent on the triggering and timing channel for initiation. Output signals are generated when each measurement deviates from prescribed electrical standards representative of clinical standards. For convenience, the output signals are utilized to provide digital indications of normal and abnormal ECG. signals and are observable by an attendant who need not be a cardiologist. Most of the indications are disabled when a severe arrhythmia condition is encountered to prevent false indications of defects.

It is therefore an object of this invention to provide a method and apparatus for rapidly screening the heart activity of patients on a real time basis as indicated by electrocardiac signals representing heart activity information.

Another object of this invention is to provide a method and apparatus for automatically and precisely indicating one or more functional periods of a patient's heart activity in which an abnormality occurs.

Still another object of this invention is to provide a method and apparatus for selectively measuring electrocardiac signals to indicate abnormalities in a patient and for automatically adjusting the selection timing according to cardiac rate.

Yet another object of this invention is to provide a method and apparatus for the keying of selected measurements of electrocardiac signals to the R-wave, or to the S-wave when the R-wave is defective, while maintaining a uniform time phase relation of the selected measurements.

It is still another object of this invention to provide a method and apparatus for screening electrocardiac signals to provide definitive information about heart activity to an attendant who need not be a cardiologist.

Another object of this invention is to provide for a method and apparatus for the disabling of a definitive heart activity signal responsive to a predetermined arrhythmia of a cyclic electrocardiac signal.

Still another object of this invention is to provide for portable, relatively inexpensive, analogue-digital apparatus operative on a real time cycle-to-cycle basis for evaluating a patient's electrocardiac signals to provide definitive heart activity information.

Other objects and features of the present invention will become apparent from the following description taken in connection with the accompanying drawings in which:

FIG. 3 shows in block diagram form the timing networks and cardiac rate compensator.

FIG. 4 shows circuitry for the cardiac rate compensator of FIG. 3.

FIG. 14 is a block diagram of the T—P interval analysis network.

FIG. 15 is a block diagram of the P-wave analysis network.

FIG. 17 is a block diagram of the Q-wave analysis network.

FIG. 18 is a block diagram of the combined R and S wave analysis network.

FIG. 19 is a block diagram of the R-wave analysis network.

FIG. 20 is a block diagram of the S-wave analysis network.

FIG. 21 is a block diagram of the cardiac rate analysis network.

FIGS. 23–1 and 23–2 show representative wave forms of the system.

OPERATIONAL CONFIGURATION

Figure 1:
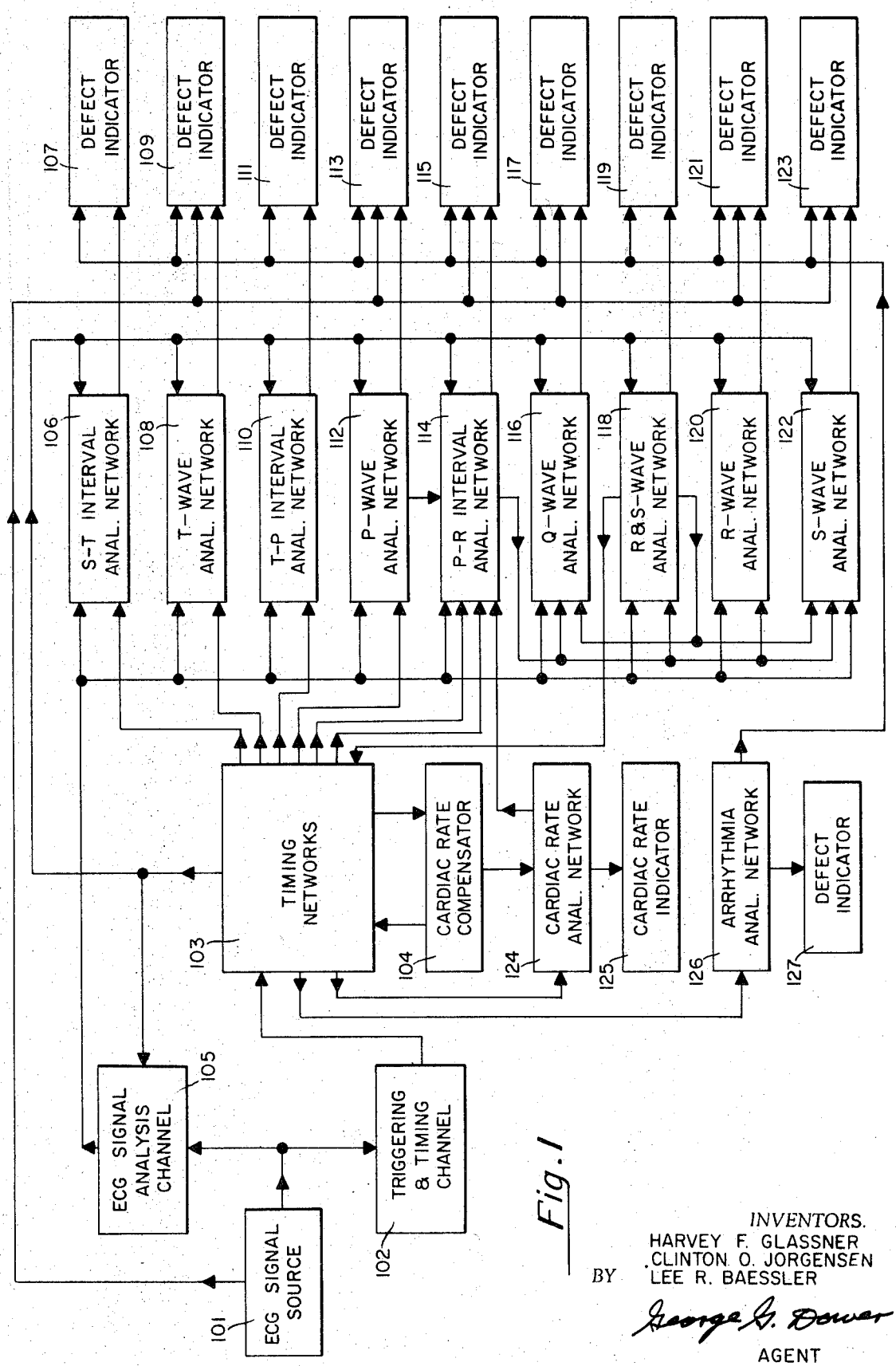
FIG. 1 is a simplified block diagram of the entire system.

The operational configuration of apparatus for carrying out the present invention is shown in FIG. 1. Electrocardiac (ECG.) signals are derived by source 101 from electrodes placed on a patient's skin surface in four standard lead configurations, these being only representative of the 12 standard lead arrangements commonly employed in electrocardiography. Signals from each lead configuration are separately amplified and then filtered. Signals from one lead configurations are generally selected for further processing through both the triggering and timing channel 102 and the ECG. signal analysis channel 105. Occasionally, the ECG. signal character is such that it is either not suitable or desirable for triggering purposes in addition to analysis purposes. In these instances, and ECG. signal from a second lead source is selected by an attendant only for timing purposes.

The ECG. signal selected in source 101 is received by the triggering and timing channel 102 where it is amplified and adjusted to a predetermined level. The resulting signal is then processed to detect and indicate the presence and prescribed levels of the R-wave and the S-wave. The R-wave is preferred for initial triggering purposes although when it is defective the S-wave is automatically selected for this purpose by the presence indicator. The ECG. signal is further processed through a phase splitter which provides separate R-wave and S-wave signal sources. The signals from each of these sources are then differentiated and base clipped to sharpen the signal and one is automatically selected for driving a Schmitt trigger. Under R-wave mode of operation, the Schmitt trigger output initiates an R-wave delay multivibrator having S-wave endurance which normally supplies the basic triggering pulse to the timing networks described below. When the S-wave is automatically selected, the R-wave delay multivibrator is bypassed and the Schmitt trigger output supplies the basic triggering pulse so as to maintain essentially a uniform time phase relation of the triggering pulse regardless of whether the R-wave or the S-wave does the initiating.

The triggering and timing channel 102 is substantially frequency insensitive in that the triggering pulses are derived from the substantially unfiltered electrocardiac signal. The terms "substantially frequency insensitive" and "substantially unfiltered," as hereinafter used, are not intended to exclude the band pass limitations of the equipment nor the recurrence rate of the electrocardiac signal. The terms denote merely that the triggering pulses are derived from the electrocardiac waveform and not from a waveform made to to differ significantly or substantially from the electrocardiac signal by means of the removal of substantial frequency components.

Timing networks 103 receives the triggering pulse from channel 102. These networks generate successive timing pulses which individually, and combined through logic networks, produce a sequence of gating pulses. The gating pulses are identified with a successive ECG. functional period and are used in controlling analysis networks for evaluating the signal during a respective functional period. Some additional gating pulses are generated within analysis networks in dependency on the triggering and other pulses and together complete the sequence of gating pulses required for the selective analysis and evaluation of each cardiac cycle. Timing networks 103 also generates a reset pulse in dependency on the trigger pulse prior to the end of the cardiac cycle for use in the analysis networks as described below.

Cardiac rate compensator 104 receives signals from the timing networks 103 and supplies control voltages to timing components therein. This action maintains the selective time sequencing for the cyclic subdivision of the electrocardiac signals into functional periods in conformity with the durations of the functional periods as they depend on cardiac rate. Thus, the output signals from the timing networks 103 are adapted to control the duration and time phase ranges in which the analysis networks respond to the gating pulses for evaluation of the electrocardiac signals.

The electrocardiac signal selected from source 101 is also directly applied to ECG. signal analysis channel 105. This channel amplifies the ECG. signal by means of a differential DC amplifier to a prescribed level set through adjustment of a calibration control and read on an indicator by an attendant. The amplified signal is coupled through a baseline clamper to the wave analysis networks described below. The baseline clamper operates responsive to the reset pulse to restore the DC baseline of the ECG. signal to a ground reference potential. Because of this action, precise wave analysis may proceed from the same reference level at the beginning of each cardiac cycle evaluated.

It has been discovered that only a number of the many known wave characteristics of the ECG. signal need be evaluated to provide reliable definitive information about cardiac abnormalities. This is advantageous for screening purposes and is effected through evaluation of the ECG. signals by a plurality of analysis networks having analogue-digital signal discriminating circuits generally selectively responsive to the aforementioned gating pulses. The analysis networks provide binary output signals which for design convenience drive corresponding digital defect indicators. Table I below lists the ECG. functional periods and wave parameters evaluated according to the present invention. The table also suggests which of the four representative ECG. lead sources are utilized for measurement purposes for each parameter evaluated. This is so designated by an X in the appropriate column. Otherwise, the defect indicators not involved in evaluation of a particular lead are disabled to prevent erroneous indications, this being designated by a bar or space in the appropriate column.

TABLE I

| ECG functional period | ECG wave parameter evaluated | ECG lead measured | | | |
|---|---|---|---|---|---|
| | | I | III | $V_1$ | $V_6$ |
| S-T segment | Normal amplitude | X | X | X | X |
| | Elevated amplitude | X | X | X | X |
| | Depressed amplitude | X | X | X | X |
| T wave interval | Absent | X | — | — | X |
| | Normal amplitude | X | — | — | X |
| | Excessive amplitude | X | X | X | X |
| | Diminished amplitude | X | — | — | X |
| | Negative polarity | X | — | — | X |
| T-P interval | Normal amplitude | X | X | X | X |
| | Excessive positive polarity. | X | X | X | X |
| | Excessive negative polarity. | X | X | X | X |
| | Excessive positive and Negative Polarity. | X | X | X | X |
| P wave interval | Absent | X | — | — | — |
| | Normal amplitude | X | — | — | — |
| | Excessive amplitude | X | X | X | X |
| | Negative polarity | X | — | — | — |
| P-R interval | Normal duration | X | — | X | X |
| | Excessive duration | X | — | X | X |
| | Diminished duration | X | — | X | X |
| Q wave portion of QRS complex. | Normal amplitude and duration. | X | X | — | X |
| | Excessive amplitude | X | X | — | X |
| | Excessive duration | X | X | — | X |
| | Excessive amplitude and duration. | X | X | — | X |

TABLE I—Continued

| ECG functional period | ECG wave parameter evaluated | ECG lead measured | | | |
|---|---|---|---|---|---|
| | | I | III | V₁ | V₆ |
| R plus S wave portion of QRS complex. | Normal duration | X | X | X | X |
| | Excessive R-wave duration. | X | X | X | X |
| | Excessive S-wave duration. | X | X | X | X |
| | Excessive R plus S wave duration. | X | X | X | X |
| R wave portion of QRS complex. | Normal amplitude | X | X | — | X |
| | Excessive amplitude | X | X | X | X |
| | Diminished amplitude | X | X | — | X |
| S wave portion of QRS complex. | Normal amplitude | — | — | X | — |
| | Excessive amplitude | X | X | X | X |
| | Diminished amplitude | — | — | X | — |
| R to R wave interval | Normal rate | X | X | X | X |
| | High rate | X | X | X | X |
| | Low rate | X | X | X | X |
| Cyclic rhythm | Severe arrhythmia R-R wave. | X | X | X | X |

The S—T interval analysis networks 106 includes level detectors receiving the analogue output signal from ECG. signal analysis channel 105 and operating against preselected DC reference voltages representative of clinical standards for the wave amplitude parameters listed in table I. When the ECG. signals differ from the reference voltages, these detectors feed binary signals to NAND gates which are controlled by the S—T gating pulse supplied by timing networks 103. The NAND gates become active only under prescribed logic conditions and during the S—T segment to pass combinations of digital signals to previously reset binary memories. These memories produce binary output signals which drive defect indicator 107 where indicator lights are read in binary logic terms to indicate the normal and abnormal ECG. wave amplitude characteristics listed in table I. The binary memories are reset each cycle by the reset pulse generated in the timing networks 103 so that a new indication is provided for each cardiac cycle. Indicating lights in defect indicator 107 are disabled during severe arrhythmia by a signal from arrhythmia analysis network 126.

T-wave analysis network 108, T—P interval analysis network 110 and P-wave analysis network 112 are constructed and operate in a manner similar to the S—T segment analysis network 106 described above. They differ in that their level detectors operate against their own preselected reference voltages and the NAND gates operate only during their respective gating pulses supplied by the timing networks 103. In addition to ECG. wave amplitude, wave polarity is indicated on their respective defect indicators 109, 111, and 113, all wave parameters evaluated being listed in table I. Indicating lights on T-wave and P-wave defect indicators 109 and 113, respectively, are disabled during improper ECG. signal lead selection by a signal from source 101.

The P—R interval is evaluated for endurance by analysis network 114 which includes a first NAND gate receiving binary output signals from memories in the P-wave analysis network 112. Therefore, this gate becomes activated when the P-wave arrives and its output signal triggers two cascaded delay multivibrators which endure for periods representative of clinical standards for the wave duration parameters listed in table I. A control signal from cardiac rate analysis network 124 is applied to a range switch which modifies the duration of the second multivibrator below a prescribed cardiac rate. A second NAND gate receives pulses in prescribed logic combinations from the first NAND gate, the delay multivibrators, the P-wave gating and other pulse sources in the timing networks 103 and a QRS gating pulse source, such that in effect it operates as the P—R interval gating pulse source and is dependent on the triggering signal mentioned above. Thus, it becomes initiated upon the onset of the P-wave and terminated with the onset of the Q-wave.

The second NAND gate output drives another series of NAND gates where the terminal portion of its output (P—R gating) pulse is compared with the delay multivibrator output pulses and consequently digital signals are delivered to previously reset binary memories. These memories produce binary output signals which drive defect indicator 115 where indicator lights are read in binary logic terms to indicate the normal and abnormal wave duration characteristics listed in table I. The binary memories are reset each cycle and the indicator lights disabled in response to improper lead selection and severe arrhythmia conditions as previously described above.

For design convenience, the QRS gating pulse source is made a part of the P—R interval analysis network 114 and includes level detectors operating against preselected DC reference voltages for detecting the onset of the Q-wave and the positive R-wave. When the ECG. signal differs from the reference voltages these detectors feed binary signals to another NAND gate. The output of this gate is supplied to still other NAND gates which become operative in response to a prescribed logic combination of pulses from the P—R interval analysis network binary memories and other sources and ultimately allows only the onset of the Q-wave to initiate operation of a triggering multivibrator. This multivibrator then applies a triggering signal to a delay multivibrator which endures for a period representative of a clinical standard for the QRS wave train duration. The delay multivibrator output supplies the QRS gating pulse to the P—R interval and subsequent analysis networks.

The Q-wave analysis network 116 includes both signal amplitude and duration discriminating circuits for evaluating the ECG. signal parameters listed in table I. The amplitude discriminating circuits are similar to those described above involving level detectors operating against preselected reference voltages. Wave duration is determined by a selfclamped integrator which receives a signal from a level detector and develops a voltage proportional to time during the presence of the Q-wave. A level detector receives this voltage and operates against a preselected reference potential representing normal Q-wave duration. The binary output signals from both the amplitude and duration level detectors are fed to NAND gates. These are controlled by the QRS gating pulse referred to above for initiation and an R-wave gating pulse described below for termination of digital signals passed to previously reset binary memories. Binary output signals are produced by these memories to drive defect indicator 117 where indicating lights are read in binary logic terms to indicate the normal and abnormal ECG. wave characteristics listed in table I. The binary memories are reset each cycle and the indicator lights disabled responsive to improper lead selection and severe arrhythmia conditions as previously described above.

The R- and S-wave analysis network 118 includes signal duration discriminating circuits for evaluating individual and combined R- and S-wave duration according to parameters listed in table I. The individual R-wave and S-wave durations are determined in a manner entirely similar to the Q-wave duration. These circuits employ selfclamped time integrators responsive to the presence of the respective R- and S-wave signals and the QRS gating pulse. Ultimately, they deliver digital signals to previously reset binary memories based on a previous comparison of the integrator output voltage and a reference voltage. Binary output signals are produced by the memories to drive defect indicators 119 where indicating lights are read in binary logic terms to indicate the normal and abnormal ECG. wave characteristics listed in table I. The binary memories are reset each cycle and the indicator lights disabled during severe arrhythmia as previously described.

The combined R- and S-wave duration is evaluated through time integration substantially the same as the individual components. One main difference is that a switched integrator, instead of a selfclamped integrator, is employed which receives a digital signal to be integrated from a NAND gate operative during the presence of both the R- and S-waves and a switching signal which controls the duration of integration. The switching signal is derived from another NAND gate which is responsive to the QRS gating pulse and an R-wave gating pulse. The switched integrator output is received by a level detector operating against a preselected reference voltage representing the combined R- and S-wave duration. This detector feeds a binary signal to NAND gates which ultimately drive the individual R- and S-wave binary memories and their corresponding indicator lights in defect indicator 119 simultaneously to provide an indication of combined excessive R- and S-wave duration.

The R-wave gating pulse is developed in the R- and S-waves analysis network 118 by a binary memory set by the R-wave onset and reset by the previously described reset signal. A complementary R-wave gating pulse is also supplied to the Q-wave and S-wave analysis networks 116 and 122, respectively for logic purposes.

In the R- and S-wave analysis network 118 one of the binary memories is involved in the determination of excessive S-wave and R- and S-wave durations. Its output signal is also supplied to a range switch located in timing networks 103 which has the effect of modifying certain gating pulses as will be described hereinafter.

R-wave analysis network 120 and S-wave analysis network 122 include amplitude discriminating circuits for evaluating ECG. signal parameters as listed in table I. These networks are constructed and operate in a manner similar to the S—T segment analysis network 106 described above. They differ in that their level detectors operate against their own preselected reference voltages and their NAND gates operate only during the QRS gating pulse generated in the P—R interval analysis network 114. The ECG. wave amplitude parameters listed in table I are indicated on defect indicators 121 and 123, respectively. The indicator lights are disabled during improper ECG. lead selection and severe arrhythmia conditions as previously described. The R-wave analysis network binary memories are reset directly by the reset pulse previously mentioned. The S-wave analysis network binary memories are reset by a logic combination of the R-wave gating pulse and the reset pulse referred to above.

Cardiac rate analysis network 124 includes amplitude discriminating circuits for evaluating cardiac rate parameters listed in table I under R-R Wave Integral. Limit detectors receive an analogue control voltage from cardiac rate compensator 104 and operates against preselected reference voltages representative of clinical standards for the aforementioned cardiac rate parameters. When the control voltage differs from the reference voltages these detectors feed binary signals to previously reset binary memories. The memories produce binary output signals which drive cardiac rate indicator 125 where indicator lights are also read in binary logic terms to indicate the normal and abnormal cardiac rate characteristics listed in Table I. The binary memories are reset each cycle by the reset pulse generated in the timing networks 103 so that a new indication is provided for each cardiac cycle. The indicating lights are disabled during severe arrhythmia by a signal from arrhythmia analysis network 126 to prevent erroneous indications.

Arrhythmia analysis networks 126 includes a conventional arrhythmia detector which receives an initiating pulse from timing networks 103 in synchronism with the triggering pulse supplied by channel 102. In this instance, the arrhythmia detector is adjusted to respond to a severe condition of arrhythmia in the electrocardiac signal selected for timing purposes. An output signal drives defect indicator 127 in addition to other means for disabling the indicator lights in other defect indicators.

ECG. SIGNAL SOURCE

Figure 2:
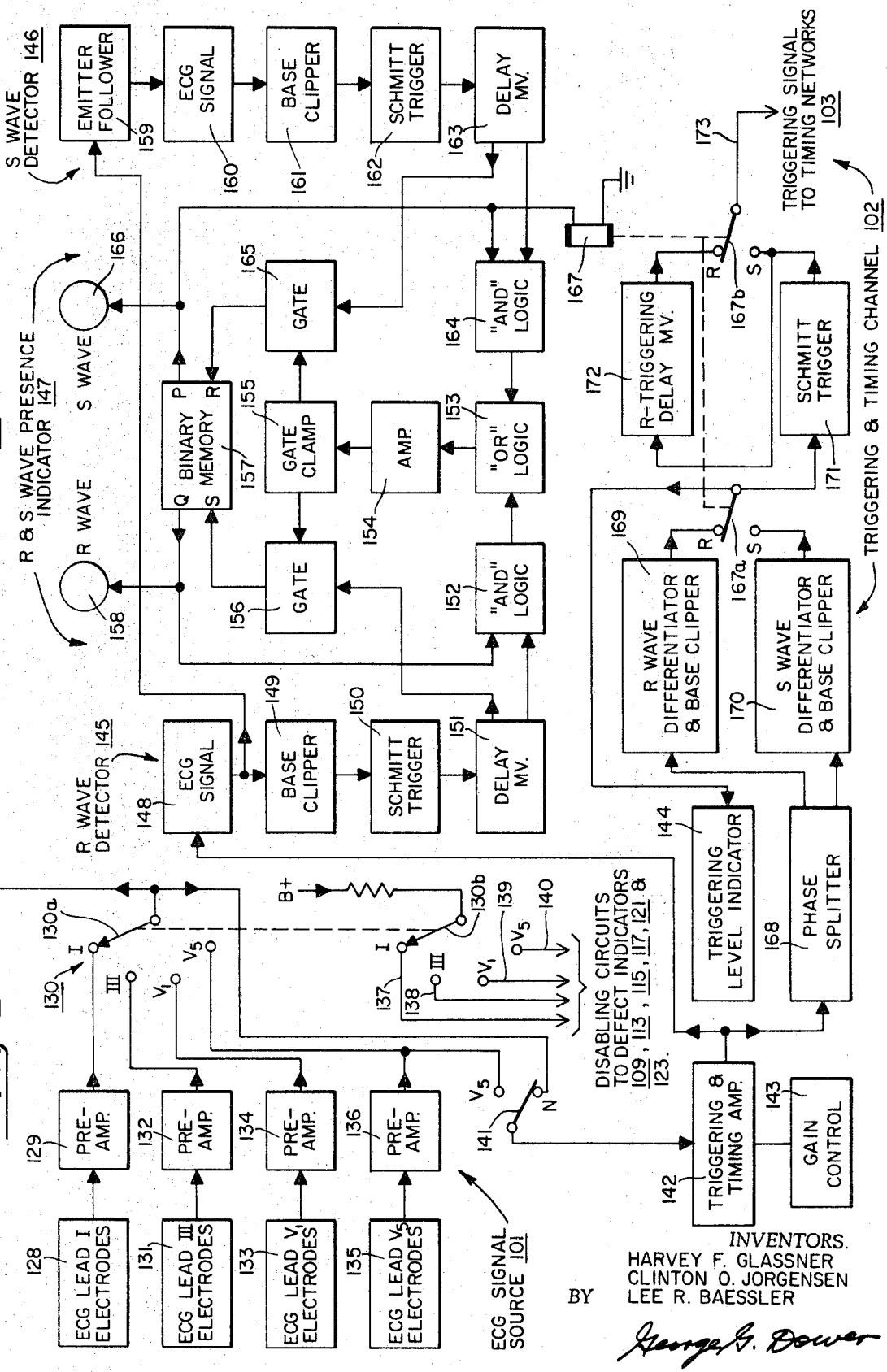
FIG. 2 is a block diagram of the electrocardiac signal source and the triggering portion of the triggering and timing channel.

The electrocardiac (ECG.) signal source 101 is shown in more detail in FIG. 2. Although only four representative standard lead configurations are shown in this FIG., i.e., Leads I, III, $V_1$ and $V_5$, the present invention contemplates employing the 12 standard leads analyzed in conventional electrocardiography as well as the more recent vectorcardiographic lead configurations in the analysis of the ECG. signals. The utilization of all signal leads and the indication of their normal and abnormal characteristics follows the examples disclosed herein. Moreover, the vectorcardiographic lead indications are accomplished in an entirely similar manner but follow scalar representations of the (additional) dimensional information on heart activity. Table I defines the ECG. signal parameters that are evaluated herein and the relative importance of the lead configurations in each instance.

More particularly, the ECG. signal from lead I, electrodes 128 is derived by placing in a standard skin surface configuration a positive electrode on a patient's left arm a negative electrode on his right arm and a ground electrode on his right leg. The signal from electrodes 128 is conducted to the input of differential preamplifier 129. This preamplifier incorporates preset controls including a bandwidth control for passing signals in the frequency range of from about 0.2 to about 350 cycles per second, and a gain adjustment for providing a calibrated amplification for the ECG. signals. Signal output from preamplifier 129 is delivered to lead selector switch 130 and conducted to a terminal on switch section 130a bearing this lead identification. It is then supplied to both the triggering and timing channel 102 and the ECG. signal analysis channel 105 for further processing.

Figures 1, 23:
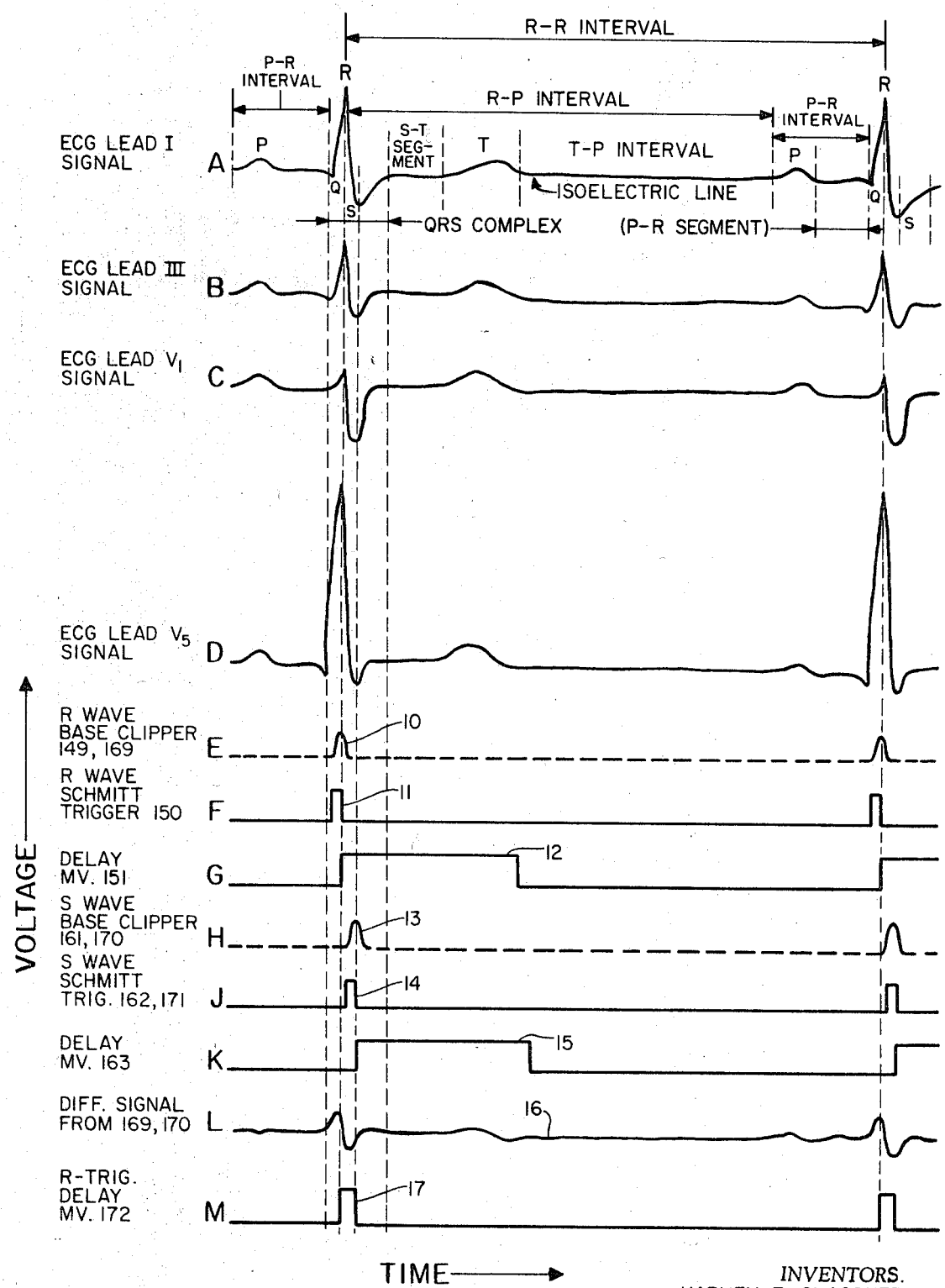
Figures 2, 23:
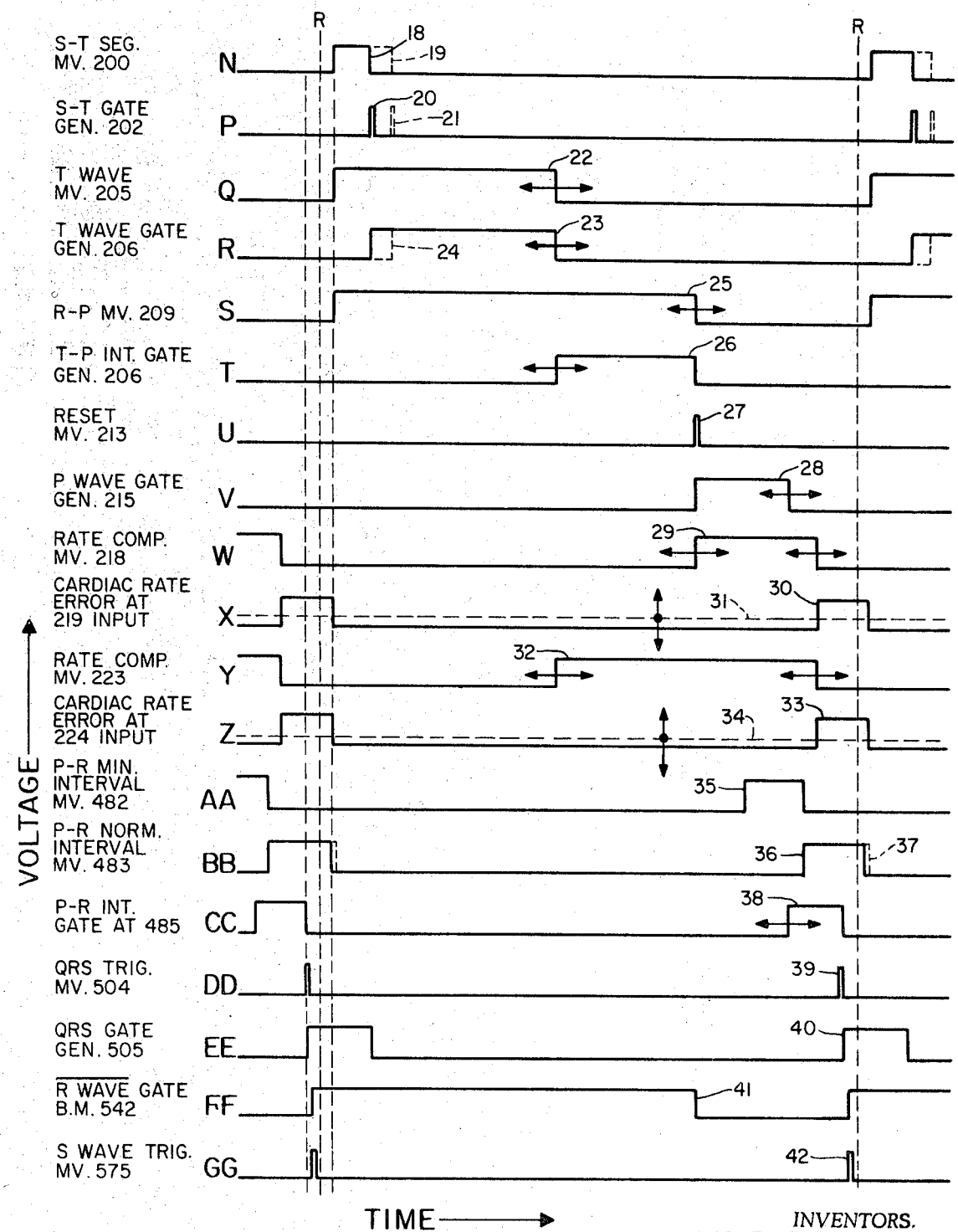

The approximate form of a lead I, normal ECG. signal is shown in (FIG. 23–1)A where the wave forms and functional periods of analysis for all leads are identified. The R-wave is referenced throughout this disclosure as a basis for generating timing signals as well as measuring intra- and intercycle timing purposes. On occasions, the R-wave is too weak for precise selection for generating timing signals so the S-wave is automatically selected for triggering as will be described below. Other types of abnormalities prevalent in the ECG. signal of this lead configuration include variations in amplitude and timing of the P-wave, Q-wave, R- and S-waves individually and combined, the QRS wave train; amplitude of the S—T segment; amplitude and polarity of the P-wave, T-wave and T—P interval, especially the latters isoelectric line, cardiac rate, and changes in cardiac rate known as arrhythmia. The particular ECG. signal parameters evaluated are of course listed in table I. However, these parameters, plus others; vary individually and in combinations, within and between patients, and at various ages and specific times of examinations, thus making precise evaluation of these signals extremely difficult by visual methods. The method and apparatus of the present invention substantially overcomes this problem as will be realized from the disclosure below.

The ECG. signals from lead III electrodes 131, lead $V_1$ electrodes 133 and lead $V_5$ electrodes 135 are also derived from standard skin surface configurations. In the lead III arrangement a negative electrode is placed on a patient's left arm, a positive electrode on his left leg and a ground electrode on his right leg. In the lead $V_1$ arrangement, electrodes are placed on the patient's left arm, right arm and left leg and each are conducted through 5k ohm resistors to a common negative electrode terminal, a positive electrode is placed at the level of the fourth intercostal space to the right of the sternum, and a ground electrode placed on his right leg. The lead$V_5$ arrangement is the same as lead $V_1$, except that the positive electrode is placed at the level of the fifth intercostal space in the anterior axillary line.

Signals from electrode configurations 131, 133 and 135 are conducted to the respective inputs or differential preamplifiers 132, !134, and 136. These are identical to preamplifier 128 including their presettings of bandwidth and gain controls. Their outputs are also delivered to lead selector switch 130 and are conducted to respective positions on switch section 130a.

An approximate normal ECG. signal form for lead III signal is shown in FIG. 23B, for lead $V_1$ in FIG. 23C, and for lead $V_5$ in FIG. 23D. Variations and abnormalities are much the same as described above in connection with lead I signal form shown in FIG. 23A. It will be observed that lead $V_5$ R-wave amplitude in FIG. 23D far exceeds that of the equivalent signal in the other leads. This distinction will be utilized as noted immediately below.

Ordinarily the same ECG. signal is supplied to both the ECG. analysis channel 105 directly and the triggering and timing channel 102 through triggering selector switch 141 when it is in its N or normal position. However, in situations where the ECG. signal under evaluation has an R-wave that is inverted, or is too weak, or is otherwise undesirable for triggering purposes, switch 141 is moved to the $V_5$ position where a strong R-wave signal usually is prevalent for triggering purposes. If this is not desired the triggering and timing channel 102 will automatically select the S-wave for triggering purposes without loss in time phase relation to the signals in the other functional periods as is disclosed below.

The analysis of selected signal parameters is more important in certain lead configurations than in others. In fact, it actually is undesirable to evaluate some of these parameters with the present apparatus under certain extreme conditions to prevent false indications of either normal or abnormal heart activity. To prevent such occurrences the indicator lights are disabled which would normally provide indications of those parameters identified by a bar or blank space in table I. This is accomplished by a signal developed during each of the positions of lead selector switch section 130b in conjunction with indicator logic components utilized for this purpose as will be described under the disclosure for the analysis networks.

TRIGGERING AND TIMING CHANNEL

The triggering and timing channel 102 develops a triggering pulse and is shown further in connection with FIG. 2. Any one of the ECG. signals selected for this purpose is received at the input of triggering and timing amplifier 142 from the common connection of triggering selector switch 141. A predetermined output signal level is required for further signal processing, this level being adjusted by an attendant using gain control 143 while observing triggering level indicator 144. Each time a different signal lead is selected by either of switches 130 or 141, the output level is checked and adjusted if necessary.

The output from triggering and timing amplifier 142 is supplied to the positive R-wave detector 145 and then to the S-wave detector 146. The outputs from these detectors are fed to the R- and S-wave presence indicator 147 where it is automatically determined and indicated each cardiac cycle which of the two waves, i.e. the R-wave, arrived first and will subsequently be used in another branch circuit for initiating the timing networks 103.

Specifically, the R-wave detector 145 receives the output from amplifier 142 at the input of ECG. signal amplifier 148 where it is first attenuated to a prescribed level, then amplified using a fixed gain. This signal is then fed to a base clipper 149 suitable biased for R-wave detection. Its output approximates the form shown in FIG. 23E, a series of pulses 10 appearing at the cardiac repetition rate. The pulses 10 are adjusted to a standardized R-wave amplitude for wave selection purposes and activate Schmitt trigger 150 which generates a short synchronizing pulse 11 as shown in FIG. 23F. The trailing edge of pulse 11 triggers delay multivibrator 151 having complementary outputs and an input inhibited against subsequent triggering pulses while in its unstable, or timing state, the triggering occurring in constant time phase relation with the R-wave. Consequently, multivibrator 151 produces pulse 12 shown in FIG. 23G which is selected for convenience to endure until about the termination of the T-wave so that subsequent signals from the Schmitt trigger 150 will be ineffective until after a selection between the R- and S-waves has been made.

The R- and S-wave presence indicator 147 receives the negative-going form of pulse 12 at the input of AND logic network where it is joined by signal from bistable memory 157 which is assumed to be in state for R-wave indication. Pulse 12 then passes on to OR logic network 153 which allows only one of two signals to pass at a time and then on to amplifier 154 which joins gate clamp 155. The positive going output pulse 12 from multivibrator 151 is fed to gate 156 which receives a control signal from gate clamp 155 and allows the pulse to pass and activate binary memory 157 at its set input. This causes indicator 158 to become illuminated signifying the presence of the R-wave to an attendant.

S-wave detector 146 is constructed and operated much the same as R-wave detector 145. It receives the ECG. signal from the output of R-wave amplifier 148 at the input of emitter-follower 159. This inverted signal is applied to the S-wave ECG. signal amplifier 160 where it is first attenuated to a prescribed level, then amplified using a fixed gain so that its output signal will be equal in amplitude, but opposite in polarity, to that from amplifier 148. This signal is then fed to a base clipper 161 suitably biased at a lower level for S-wave detection. Its output approximates the form shown in FIG. 23H, a series of pulses 13 appearing at the cardiac repetition rate. The pulses 13 are adjusted to a standardized S-wave amplitude for wave selection purposes and activate Schmitt trigger 162 which generates a short synchronizing pulse 14 as shown in FIG. 23J. The trailing edge of pulse 14 triggers delay multivibrator 163 which is identical to multivibrator 151. The triggering occurs in constant time phase relation with the S-wave and produces pulse 15 shown in FIG. 23K which lags behind pulse 12 by a substantial number of milliseconds.

The negative going form of pulse 15 is received at the input of AND logic network where it is joined by a similar signal from bistable memory 157 which is assumed to have been set in the S-wave state as appears above. Pulse 15 then passes on to OR logic network 153 where its passage is inhibited while pulse 12 from AND logic network 152 is present. If the R-waves were not present, OR logic network 153 would allow pulse 15 to pass on to amplifier 154 which joins gate clamp 155. The positive-going output pulse 15 from multivibrator 163 is fed to gate 165 which receives a control signal from gate clamp 155 and allows the pulse to pass and activate binary memory at its reset input. This causes indicator 166 to become illuminated signifying to an attendant the presence of the S-wave and the absence of a positive R-wave. At the same time, a signal is sent to relay 167 which causes it to change from its normal R position to its S position for the duration of pulse 15, thereby automatically selecting the S-wave for utilization if the R-wave is defective as appears immediately below.

Still referring to FIG. 2, the triggering and timing amplifier 142 output signal is also delivered through a parallel branch circuit to phase splitter 168 where two separate signal sources are derived. The first of these is fed to the R-wave differentiator and base clipper 169, the second to the S-wave differentiator and base clipper 170. The ECG. signal in each of these is first differentiated and assumes the approximate wave form 16 shown in FIG. 23L. Each signal is then base clipped and sharpened for triggering purposes, the R-wave output at 169 assuming a configuration similar to pulse 10 shown in FIG. 23E, the S-wave output at 170 appearing similar to pulse 13 shown in FIG. 23H. The base clipped R-wave and S-wave outputs from 169 and 170 are delivered to correspondingly identified terminals on relay contact structure 167a.

From the common connection on relay contact structure 167a the shaped signal is fed to both the triggering level indicator 144 previously mentioned and the Schmitt trigger 171. The latter generates a short synchronizing pulse similar to pulse 11 shown in FIG. 23F, when relay 167 selects the output from R-wave differentiator and base clipper 169. Alternately, it generates a pulse similar to pulse 14 shown in FIG. 23J when relay 167 selects the output from the S-wave differentiator and base clipper 170. It will be observed that the trailing edges of these pulses coincide with the approximate peak in the R-wave and S-wave, respectively.

Assuming R-wave mode of operation, this being preferred, the output pulse 11 from Schmitt trigger 171 is directed to the input of R triggering delay multivibrator 172 where its trailing edge initiates operation to produce pulse 17 shown in FIG. 23M. The multivibrator is similar in construction to multivibrator 151 except that its duration is adjusted for that of the S-wave and its terminal edge coincides with that of pulse 14. The output pulse 17 of multivibrator 172 passes through relay contact structure 167b and supplies the triggering signal to the timing networks 103 over conductor 173.

When the R-wave is defective and the S-wave mode of operation is selected as described above, the R-triggering delay multivibrator 172 output is removed from the circuit by action of relay contact structure 167b. The alternate Schmitt trigger 171 output pulse 14 is then delivered directly without delay to the timing networks 103 where its trailing edge arrives at the same instant as would that of pulse 11.

TIMING NETWORKS

The operational relationships of the triggering networks 103 are now described in connection with the block diagram shown in FIG. 3. These networks normally operate under control of pulse 17 supplied by R-triggering delay multivibrator (MV) 172 during the R-wave mode of operation, or alternatively, of pulse 14 supplied by Schmitt trigger 171 when the S-wave is automatically selected as a result of a defective R-wave. Since the trailing edges of both pulses 17 and 14 are coincident, either one is suitable for initiating the following timing sequence while providing a zero time phase position on which the evaluation proceeds.

In the present invention a regular successive sequence of precise timing signals are generated which define the durations of gating pulses, or their derivatives, for gating evaluation circuits in many of the analysis networks shown in FIG. 1. However, the duration of these signals frequently differ from that delineated for the functional periods shown in FIG. 23A. For example, after exhaustive research in cardiac mass screening techniques it has been discovered that in certain instances the duration of some gating pulses is required to overlap the functional periods, in others it is substantially equal, and still another a fractional portion of the functional period. Moreover, certain physiological differences between patients and changes occurring within a patient during examination require either a shift or extension of one or more gating pulses, or a continuous variation in their timing as cardiac rate of recurrency deviates from a prescribed standard value of about 60 beats per minute. The present invention includes such features and they are described more fully below.

More specifically, pulse 17 is fed simultaneously to S—T segment delay MV 200 and R—P interval delay MV 209. These timing circuits are conveniently constructed as monostable multivibrators (MMV) which respond to an input triggering pulse (such as pulse 17) by shifting to their unstable state of operation, recovery from which is preferably timed by a resistance-capacitor (RC) network which, when it attains a predetermined voltage, causes the circuit to shift back to its normal stable condition. Its input is inhibited against subsequent triggering pulses while the multivibrator is in its unstable state. As will further appear, the duration of the unstable state of operation may very conveniently be controlled by applying in addition to the normal circuit potentials a control voltage for varying the charging rate of the controlling condenser. This occurs when cardiac rate differs from a stable standard rate of 60 bpm. Moreover, both positive and negative going pulses are simultaneously present and available by connection at different parts of the multivibrator circuit.

Where it is desirable to obtain a timing pulse of short duration for triggering another circuit for operation, such pulses are available in the multivibrator at either desired polarity through a connection including a small differentiating capacitor coupled to the desired component of the timing circuit. Furthermore, it is conventional to employ amplifying components where necessary, or desirable, throughout the entire apparatus of the present invention, each stage of amplification will normally invert the signal wave form. Therefore, it is unnecessary to refer in every instance to the desirability of such amplification, and as a further result thereof, the actual polarities utilized in the specific timing circuits will not be identified except when required for clarity.

The S—T segment delay multivibrator (MV) 200 is triggered by the trailing edge of triggering pulse 17 and is designed to include a dual range RC timing circuit. One of these circuits provides a normal output pulse 18 as shown in FIG. 23N having a duration of about 60 ms. at the standard cardiac rate. The other circuit temporarily expands the normal pulse 18 to pulse 19 having a duration of about 100 ms. by action of electronic range switch 201. Switching action preferably removes a resistance shunt from the RC timing network in response to a control signal received from the R & S wave analysis network 118. This occurs whenever the S-wave duration exceeds about 70 ms., or the combined R- and S-wave duration exceeds about 110 ms. This provision allows for a precise analysis of the S—T segment to be made even though it follows an excessively long functional period.

The S—T segment gate generator 202 consists of a sampling monostable multivibrator (MMV) controlled by the output from delay MV 200 and is triggered by the trailing edge of pulse 18 or pulse 19 depending upon the action of range switch 201. Its output endures for about 1 ms. and assumes the form shown at 20 in FIG. 23P when triggering responds to pulse 18, or at 21 when responding to pulse 19. Gate generator 202 output is applied over conductor 203 to gate the analysis 106 only during the S—T segment functional period to evaluate the ECG. wave for normal, elevated and depressed amplitude.

The output pulse from S—T segment delay MV 200 as shown in FIG. 23N is also supplied to the arrhythmia analysis network 126 where initiation of action is keyed to the leading edge of this pulse.

Still referring to FIG. 3, the T-wave delay MV 205 is also triggered by the leading edge of the output pulse 18 (or 19) supplied from S—T segment delay MV 200. The latter device also serves to block any spurious triggering signals supplied over conductor 173 during its unstable state of operation. While not employed as a gating pulse, the T-wave delay MV 205 output endures for about 405 ms. at the standard cardiac rate and appears as pulse 22 in FIG. 23Q. The timing circuit in this multivibrator is adapted to receive a control voltage from amplifier 225 of the cardiac rate compensator 104. This operates to vary the duration of pulse 22 at its trailing edge inversely proportional to cardiac rate and will be explained more fully below.

T-wave gate generator 206 comprises a mixing circuit receiving pulses 18 (or 19) and 22 (FIGS. 23N, 23Q) in opposite polarity to provide an output pulse shown at 23 (or 24) in FIG. 23R. At the standard cardiac rate, this output pulse overlaps the T-wave functional period and endures for about 345 ms. when the gate receives pulses 18 and 22, and about 304 ms. when it receives pulses 19 and 22, pulse 19 causing the contraction of pulse 24 by delaying its onset. The varying termination of pulse 22 also causes a corresponding variance in pulses 23 and 24. Gate generator 206 output is supplied over conductor 207 to gate the analysis network 108 only during the T-wave functional period in order that the ECG. wave may be evaluated for absence; normal, elevated and depressed amplitude, and negative polarity.

Pulse 22 (FIG. 23Q) from T-wave MV 205 is also supplied in another of its forms via line 208 to cardiac rate compensator 104 as appears below.

As previously mentioned, the R—P interval delay multivibrator 209 is triggered by the trailing edge of pulse 17 (FIG. 23M) supplied over conductor 173 from the triggering and timing channel 102. While not used as a gating pulse, the output pulse duration of this multivibrator is about 730 ms. at the standard cardiac rate (60 bpm) and approximates the form 25 shown in FIG. 23S. A control voltage from amplifier 220 of the cardiac rate compensator 104 is impressed on the timing circuit of this multivibrator and operates to vary the duration of pulse 25 at its trailing edge inversely proportional to cardiac rate. In a preferred embodiment, this control voltage differs from the one supplied T-wave delay MV 205 as will become apparent below.

The T—P interval gate generator 210 also comprises a mixing circuit which in this instance receives pulses 22 and 25 (FIGS. 23Q, 23S) in opposite polarity to provide an output pulse shown at 26 in FIG. 23T. Pulse 26 occupies a fractional portion of the T—P functional period and endures for about 325 ms. at the standard cardiac rate. The duration and time phase range of this pulse vary according to the trailing edge variations of pulses 22 and 25 both of which are caused to vary inversely proportional to cardiac rate. Pulse 26 is supplied over conductor 211 to gate the analysis network 110 only during the T—P interval functional period for evaluating the ECG. wave for normal amplitude; excessive positive polarity, negative polarity and excesses of both polarities.

Pulse 25 (FIG. 23S) from R—P interval delay MV 209 is also supplied in another of its forms via conductor 212 to cardiac rate compensator 104 as appears below.

Reset monostable multivibrator 213 is also under control of the trailing edge of pulse 25 (FIG. 23S) supplied from R—P interval delay MV 209. Its output assumes the form of pulse 27 in FIG. 23U which endures for about 3 ms. near the end of the T—P interval. The time phase range of pulse 27 varies with the trailing edge position of pulse 25 which is caused to vary inversely proportional to cardiac rate. Pulse 27 is delivered over conductor 214 as the reset pulse to the base line reset clamp 279 and the ECG. signal analysis networks 106, 108, 110, 112, 114, 116, 118, 120, and 122.

P-wave gate generator 215 is a monostable multivibrator which is also triggered by the trailing edge of pulse 25 (FIG. 23S) supplied from the R—P interval delay MV 209. Its output assumes the form of pulse 28 shown in FIG. 23V which endures for about 150 ms. at the standard cardiac rate and overlaps the P-wave functional period. The same control voltage that is impressed on the R—P delay MV 209 is applied to this multivibrators' timing circuit. The control voltage operates to vary the duration of output pulse 28 at its trailing edge and its time phase range responsive to the trailing edge position of pulse 25, both inversely proportional to cardiac rate. Pulse 28 is applied over conductor 216 to gate the analysis network 112 only during the P-wave functional period for evaluating the ECG. wave for absence, normal and excessive amplitude, and negative polarity.

Pulses 25 and 28 (FIGS. 23S, 23V) are supplied in their negative forms from R—P interval MV 209 and P-wave gate generator 215 and delivered over conductors 212 and 217, respectively, to the P—R interval analysis network 114. Here they are combined with other logic pulses to operate on a NAND gate which functions as the P—R interval gate generator and whose output pulse 38 approximates the form shown in FIG. 23CC. The pulse duration approximates 100 ms. at the standard cardiac rate (60 bpm). This gate, as will appear in detail below, acts on other components in analysis network 114 only during the P—R interval functional period for evaluating the ECG. wave for normal, excessive and diminished duration.

Simultaneously, pulses 25 and 28 (FIGS. 23S, and 23V) in their negative forms are also combined in the P—R interval analysis network 114 with an additional logic pulse signifying the onset of the Q-wave. The logic product of these pulses acts to terminate the P—R interval gate (pulse 38) and at the same time initiate a QRS gating pulse multivibrator whose output pulse 40 conforms to FIG. 23EE and endures for about 120 ms. The QRS gating pulse as will also appear below operates on a number of networks. First, it gates the analysis network 116 only during the QRS wave train functional periods for evaluating the Q-wave portion of the ECG. signal for normal amplitude and duration; excessive amplitude; excessive duration; and excess amplitude and duration.

The QRS gating pulse also gates the analysis network 118 only during the QRS wave train functional periods for evaluating the combined R- and S-wave portions of the ECG. signal for normal duration; excessive R-wave duration; excessive S-wave duration; and excessive R- plus S-wave duration, all as described below.

Moreover, the QRS gating pulse also gates the analysis networks 120 and 122 only during the QRS wave train functional periods for evaluating the individual R- and S-wave portions of the ECG. signal for normal, excessive and diminished amplitude, respectively, as explained below.

Thus, a regular successive sequence of precise gating pulses are generated each cardiac cycle responsive to triggering pulse 17 (or 14) as described above. These, in summary, are various forms of FIG. 23 and are identified as the S—T segment gating pulse 20 (or 21), the T-wave gating pulse 23 (or 24), the T—P interval gating pulse 26, the P-wave gating pulse 28, the P—R interval gating pulse 38, and the QRS gating pulse 40. Each pulse has a prescribed duration and time phase range at the standard cardiac rate, some of these being varied according to cardiac rate as will be fully explained immediately below.

CARDIAC RATE COMPENSATOR

In the operation of previously described timing networks 103, insofar as FIG. 3 is concerned, it was presumed that cardiac rate was stable at a standard rate of about 60 bpm. As the cardiac rate varies the duration of each functional period for the ECG. signal changes. Moreover, it has been determined that these changes vary in different amounts with respect to cardiac rate changes, especially those relating to the P-wave and T-wave functional periods. For this reason, the cardiac rate compensator 104 shown in FIG. 1 contains two separate but similar compensating networks as a preferred embodiment for effecting the most precise compensation of the timing networks 103. This will be discussed in more detail in connection with the block diagram of FIG. 3 as will alternate but somewhat less precise arrangements.

The first compensating network of cardiac rate compensator 104 is keyed to the P-wave characteristics and employs rate compensating MMV 218 which has a monostable multivibrator circuit triggered by the trailing edge of pulse 25 (FIG. 23S) supplied by R—P interval delay 209. This circuit is used to provide an output pulse identified as 29 in FIG. 23W. Although shown contracted somewhat for clarity purposes, this pulse is normally in contiguous duration with pulse 25 at the standard cardiac rate of 60 bpm. Together pulses 25 and 29 precisely conform to the ECG. signal cycle at that rate. Pulse 29 has a prescribed duration which enables its trailing edge to either lead or lag the successive leading edge of pulse 25, (the zero time phase position) at a cardiac rate lower or higher, respectively, than the standard cardiac rate.

The action of the first compensating network in cardiac rate compensator 104 is controlled by the control voltage synthesizer 219. Here inputs are taken from the outputs of R—P interval delay multivibrator 209 and rate compensating MMV 218. Both of their respective output pulses, 25 and 29 (FIGS. 23S, 23W), are conductively coupled in opposite polarity through series resistors to a summing capacitor. Whenever pulse 25 is charging the summing capacitor toward one polarity, pulse 29 is operatively charging the same capacitor in the opposite direction. Thus, at the standard cardiac rate, no effective control voltage will be developed by synthesizer 219.

However, the present invention deals with a recurrent phenomenon which may appear over a wide range of repetition rates, from below 40 to above 140 per minute, and which furthermore can well fluctuate over a substantial range during evaluation. When the cardiac rate of a patient changes from the standard rate, or another patient be connected for screening by the apparatus which presents a different cardiac rate from that previously assumed, the conditions above discussed which develop a null control voltage on the summing capacitor will no longer hold. In case the cardiac rate is lower, pulse 29 will terminate prior to (or lead) initiation of pulse 25 and produce an error pulse 30 shown in FIG. 23X. The error pulse 30 under these circumstances will provide a net change of potential on the summing capacitor of a predetermined polarity and amplitude as shown at 31 in FIG. 23X. Conversely, should the cardiac rate increase, the terminal portion of pulse 29 will overlap or (lag) and add to pulse 25. Accordingly, the summing capacitor will develop a net voltage shift of opposite polarity, the amplitude of which is similar for similar amounts of rate changes. The summing network signal is suitably filtered and made available as the synthesizer output for further processing, or it can be used directly as the control voltage for modulating the gating pulse durations and the like.

Control voltage amplifier 220 preferably receives the output signal from control voltage synthesizer 219. Here the control voltage is proportionally amplified to produce nonlinear output characteristics as dictated by the ECG. signal P-wave characteristics. In general, the compensating effect of the control voltage is a continuous inverse one but is altered below a preselected repetition rate in the lower portion of the overall repetition rate range. The nonlinear control voltage is supplied over conductor 221 and then employed in the respective timing circuits for modulating the output durations of the R—P interval delay MV 209, the P-wave gate generator 215, and the rate compensating MMV 218 itself. In addition, it is utilized in the cardiac rate analysis network 124 for evaluating the cardiac rate of recurrence.

Under the foregoing operation, the respective timing circuits of timing networks 103 are properly modulated inversely proportional to the cardiac rate of the subject to assure precise and accurate definition of the durations of those gating pulses, or derivatives, affected. More specifically, modulating the output duration of the R—P interval delay MV 209, pulse 25 (FIG. 23S), directly varies the trailing edge position of T—P interval gating pulse 26 (FIG. 23T); directly varies the onset of the reset pulse 27 (FIG. 23U); the onset and termination of the P-wave gating pulse 28 (FIG. 23V); and the onset of rate compensating MV 218 pulse 29 (FIG. 23W).

The second compensating network of cardiac rate compensator 104 is keyed to the T-wave characteristics and employs rate compensating MMV 223 which has a monostable multivibrator circuit similar to MMV 218. This circuit is triggered by the trailing edge of pulse 22, (FIG. 23Q) supplied by T-wave delay MV 205 and its timing circuit is adjusted to provide an output pulse 32 shown in FIG. 23. Although shown somewhat contracted for clarity purposes, this pulse is normally in contiguous duration with pulse 22 at the standard cardiac rate of 60 bpm. Together pulses 22 and 32 also precisely conform to the ECG. signal cycle at the rate. Pulse 32 has a prescribed duration which enables its trailing edge to either lead or lag the successive leading edge of pulse 25 (the zero time phase position) at a cardiac rate lower or higher, respectively, than the standard cardiac rate.

The action of the second compensating network in cardiac rate compensator 104 is controlled by the control voltage synthesizer 224 which is constructed identically to synthesizer 219. Control voltage synthesizer 224 inputs are taken from T-wave delay MV 205 and rate compensating MMV 223. Both of their respective output pulses, 22 and 32 (FIGS. 23Q, 23Y) operate as do pulses 25 and 29 in synthesizer 219 to produce no effective control voltage at the standard cardiac rate. In case the cardiac rate is lower, an error pulse 33 as shown in FIG. 23Z is developed which has the effect of producing a net change on the summing capacitor as shown at 34 in FIG. 23Z. The converse in this instance is also true when the cardiac rate increases.

Control voltage amplifier 225 receives the output signal from the second control voltage synthesizer 223. In this amplifier, the control voltage is proportionally amplified to produce nonlinear output characteristics dictated by the P-wave characteristics and is otherwise constructed and operated the same as amplifier 200. This nonlinear control voltage is fed over conductor 226 and then employed in the T-wave delay MV 205 timing circuit for modulating its output duration inversely proportional to cardiac rate. The trailing edge position of the T-wave gating pulse 23 (FIG. 23R) is directly modulated as is the leading edge position of the T—P interval gating pulse 26 (FIG. 23T). Since the first control voltage varies the trailing edge of the T—P interval gating pulse 26 as described above, both its duration and time phase range are varied by cardiac compensating network 104.

As previously mentioned, alternative rate compensating arrangements may be had which produce somewhat less precise results. One such arrangement is to employ only the first compensating network (218, 219, 220, 221) triggered by pulse 25 from R—P interval delay MV 209, thereby deleting the second network (223, 224, 225, 226). Amplifier 220 is so adapted that its nonlinear output characteristics are dictated by a combination of P-wave and T-wave characteristics. The resulting control voltage is supplied in this case to the T-wave delay MV 205, the R—P interval delay MV 209 and the P-wave gate generator 215. This will cause all of the respective gating pulses, or their derivatives, to be keyed to the time phase relation of the P-wave and to vary as previously mentioned for both compensating network, but with less precision than with two compensating networks.

Another alternate arrangement is to employ only the first compensating network as in the alternate arrangement above. Triggering in this instance is accomplished by pulse 22 from the T-wave delay MV 205 instead of the R—P interval delay MV 209; and MV 219 is adjusted to produce pulse 32 (FIG. 23Y). This will cause all of the respective gating pulses, or their derivatives, to be keyed to the time phase relation of the T-wave and to vary as previously mentioned for both compensating networks, but also with less precision than with two compensating networks.

Referring now to FIG. 4, there is shown circuitry for the first compensating network of cardiac rate compensator 104. As previously mentioned, the second compensating network is substantially the same as the first except for the time constant of MV 223 and the characteristics of amplifier 225.

Rate compensating MMV 218 circuit is similar to that contemplated for delay MV 151 and exemplifies the monostable multivibrator circuitry employed in the present invention. However, it should be noted that the input triggering signal may be applied at either input terminal A or A', depending upon the shape and polarity of said signal. In the present case, MMV receives at its A input terminal the negative going form of output pulse 25 (FIG. 23S) over conductor 212 from the R—P interval delay MV 209. This pulse is coupled through a differentiator comprising capacitor 240 and resistor 241 and then fed to emitter follower transistor 242. A sharp positive pulse developed at terminal A' is introduced through inhibiting diode 243 to normally nonconducting transistor 244. The transistor 244 is intercoupled with normally conducting transistor 245 which is under control of amplifying transistor 246. Condenser 247, having one of its electrodes connected to the collector of transistor 244 and its other electrode to the base of transistor 246, together with serially connected rheostat 248 define the normal time constant which governs the unstable state of multivibrator operation. When a preselected steady voltage is applied at terminal C, the unstable state output pulse corresponds to pulse 29 shown in FIG. 23N. Pulse 29 is continuously available in positive and negative going forms at terminals B and D, respectively, and is actually contiguous with pulse 25 (FIG. 23S) at only the standard cardiac rate of 60 bpm. At other cardiac rates, it either leads or lags the successive leading edge of pulse 25. A control voltage from amplifier 220 is fed back over line 222 to terminal C of multivibrator 218 for varying its duration of unstable operation. In other applications of this type of multivibrator circuit where a variable duration is not required, terminal C is returned to the positive bus.

Control voltage synthesizer 219 includes a pair of input terminals 249 and 250 which receive the negative going form of pulses 25 and 29 (FIGS. 23S, 23W) supplied at the respective D terminals of multivibrators 209 and 218. Pulses 25 and 29 are fed over lines 212 and 251, respectively, and conductively coupled in opposition through equal series resistors 252 and 253 to summing junction 254 and then applied to summing capacitor 255. When multivibrator 209 is in its unstable state of operation, its low output voltage at terminal D tends to discharge condenser 255 while the high output voltage at terminal D of multivibrator 218 tends to charge it, and vice versa. At the standard cardiac rate, pulses 25 and 29 are sequentially contiguous and these voltages offset each other and develop no effective control voltage. When cardiac rate decreases, a net positive error pulse 30 (FIG. 23X) is produced at summing condenser 225 because pulse 29 terminates before the onset of pulse 25. When cardiac rate increases, a net negative error pulse 30 occurs at summing condenser 255 because pulse 29 terminates after the onset of pulse 25. Thus, a positive or negative voltage 31 (FIG. 23X) is developed across summing condenser 255 relative to that which occurs at the standard cardiac rate. The error pulse is applied to resistor 256 and capacitor 257 which comprises an averaging network to supply a voltage for driving transistor 258 whose output circuit develops a DC control voltage.

Potentiometer 259 drives the base of transistor 260 comprising DC control voltage amplifier network 220. The output of amplifier 220 at terminal 261 is supplied over lead 221 to the C terminal of multivibrators 209 and 215, and 205 under the alternate arrangements. Here the control voltage passes through a rheostat in the timing network and directly controls the charging rate of the timing condenser as above discussed. Amplifier 220 contains a number of adjustable features for selectively controlling its output as a function of the voltage delivered to the base of transistor 258. Potentiometer 259 is an input amplitude control which is effective in adjusting the time delay after onset of the pulse 25 at which the compensating control voltages are supplied by amplifier 220 to the multivibrators 209 and 215 (and 205) in timing networks 103. Potentiometer 262 serves to adjust the range displacement of the compensating voltage. Potentiometer 263 may be employed to provide a nonlinear output from the amplifier which depress its characteristics in the lower cardiac range rates, so that the compensation of the period of the gating pulses falls off somewhat in the very low rate range.

Rate compensating MMV 218 receives a control voltage from amplifier 220 which varies as the same characteristic function of the synthesized control voltage as do the multivibrators 209 and 215 (and 205). However, this voltage has a lesser amplitude and for this purpose lead 222 interconnects output terminal 264 of amplifier 220 and control terminal C of multivibrator 218.

ECG. SIGNAL ANALYSIS CHANNEL

Figure 5:
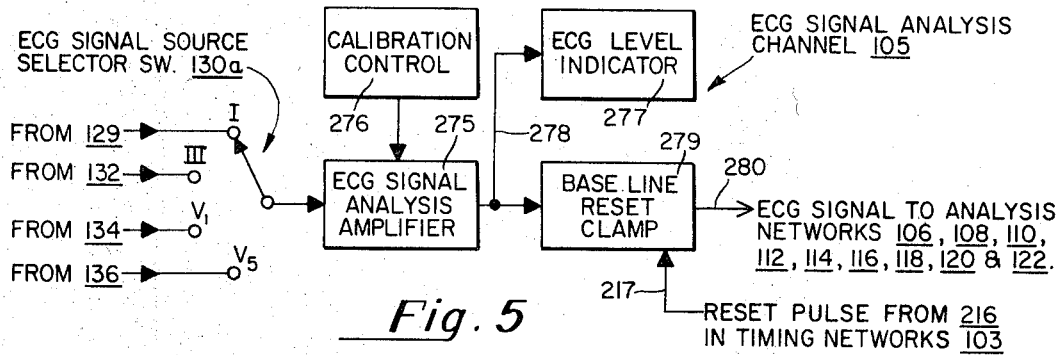
FIG. 5 is a block diagram showing a portion of the electrocardiac signal analysis channel including the base line reset clamper.

The operational configuration of the ECG. signal analysis channel 105 referred to in FIG. 1, is shown in more detail in the block diagram of FIG. 5. One of the ECG. signal sources 128, 131, 133 or 135 (lead I, III, $V_1$, $V_5$) is selected for analysis by selector switch section 130a and fed from its common connection to the input of the ECG. signal analysis amplifier 275. This amplifier incorporates a preset gain adjustment for providing a calibrated amplification of the ECG. signals. Moreover, it includes additional filtering networks for passing signals in the frequency range of from about 0.2 to about 350 cycles per second. A predetermined output level is also required for further signal processing. This level is checked by an attendant activating calibration control 276 while observing amplifier output on ECG. level indicator 277 fed thereto over conductor 278. Amplifier 275 output wave forms for the several leads selected also approximate those shown in FIGS. 23A, 23B, 23C and 23D.

The ECG. signal analysis amplifier 275 output signal is also conducted over lead 278 to the base line reset clamper 279. This clamper includes a large capacitor which in conjunction with the high impedance of its following circuitry provides a relatively long RC time constant AC coupling between amplifier 275 and the subsequent analysis networks appearing below. The output side of this AC coupling is clamped, or reset, to a reference potential levels such as ground, for a conveniently short period of time by reset pulse 27 (FIG. 23U) supplied by multivibrator 216 in timing networks 103. As will be observed in FIGS. 23A, 23U, this occurs at a time in each ECG. wave form cycle when the instantaneous voltage level is generally relatively free from variations. The clamping action is applied for about 3 ms. duration and removed such that the long time constant coupling allows only negligible "DC drift" to occur even during the longest cycle expected to be encountered in the apparatus of this invention. The base line reset clamper output has a very low impedance across which the ECG. signal is presented while having a suitably large amplitude level with respect to a fixed reference potential such as ground. The signal at this point is fed over conductor 280 to the analysis networks 106, 108, 110, 112, 114, 116, 118, 120 and 122 described below.

Figure 6:
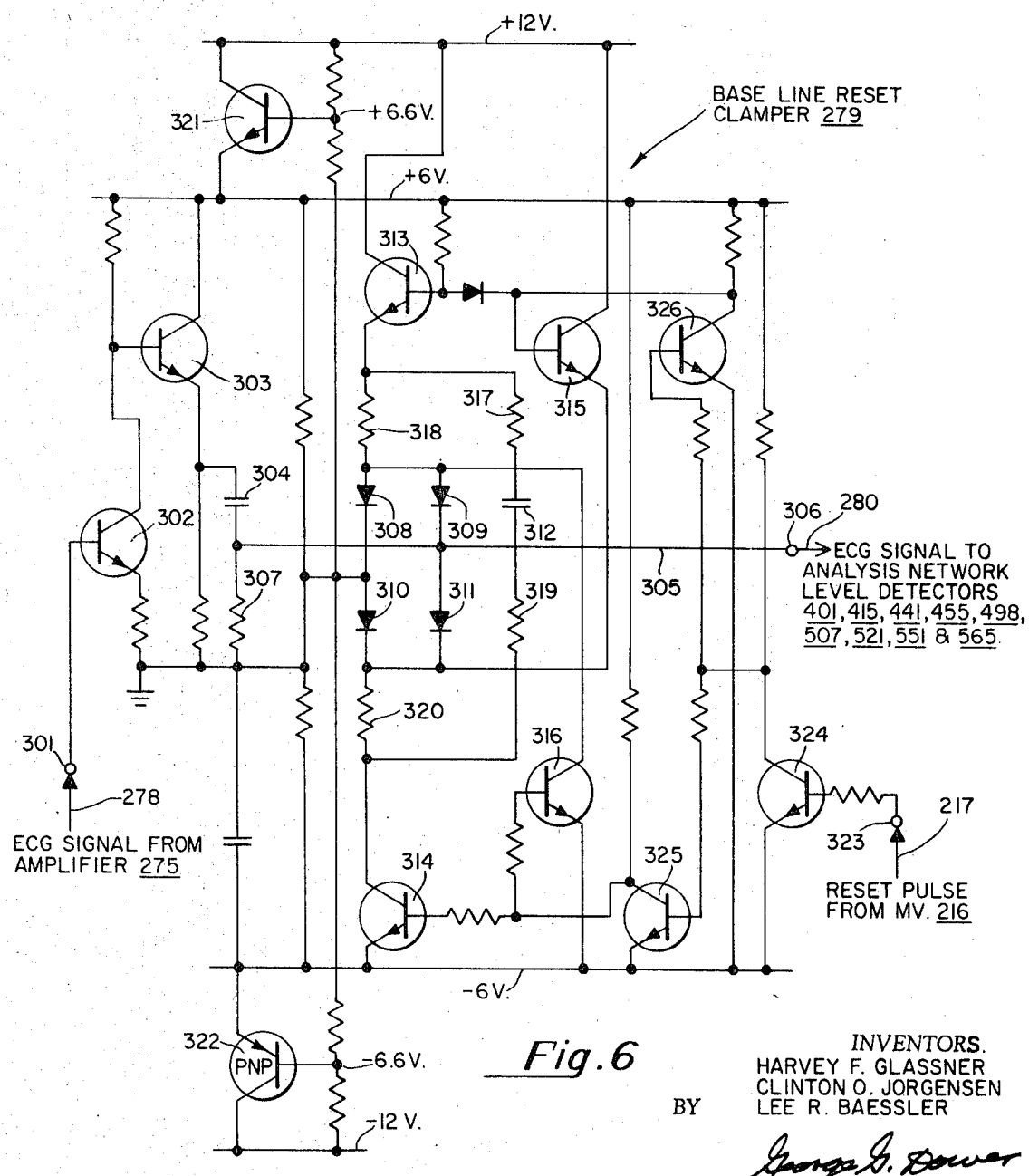
FIG. 6 shows circuitry for the base line reset clamper of FIG. 5.

Turning now to FIG. 6, there is shown detailed circuitry of the baseline reset clamper 279. The ECG. signal from amplifier 275 is applied over conductor 278 to input terminal 301. From there it is fed to a two-stage emitter follower amplifier involving transistors 302, 303, which has a very low output impedance to ground. This amplified signal is applied to AC coupling capacitor 304, which for convenience is about 10 mfd. and is delivered over conductor 305 directly to output terminal 306. The output is shunted to ground by a high impedance 307 which in this instance is a resistor of about 2 megohms.

The four diodes 308, 309, 310 and 311 are connected in a full wave bridge circuit having its input fed from a floating power source and its output connected across output terminal 306 and ground. These diodes are normally biased off and are caused to conduct only during the brief reset period as a result of the action of pulse 27, (FIG. 23U). During conduction, they clamp or reset the charge on capacitor 304 by permitting current to flow from capacitor 312 which acts as a floating power supply previously charged to about 8 to 10 volts. Furthermore, transistors 313, 314, 315 and 316 are in cutoff during diode conduction and therefore provide the necessary isolation for capacitor 312 to function as a floating power supply.

Under the foregoing conditions, diodes 308, 309, 310 and 311 conduct heavily, this being limited only by series resistors 217 and 318 connected in circuit between capacitor 312 and diodes 308, 309 and resistors 319 and 320 connected in circuit between the opposite side of capacitor 312 and diodes 310, 311. The junction between diodes 308 and 310 which forms one side of the bridge output is connected to ground. The potentials on the anode of diode 308 and the cathode of diode 310 are relatively fixed, this being about 0.6 volts above ground and about 0.6 volts below ground, respectively. Concurrently, diodes 309 and 311 try to establish the same voltage relationships so that their junction point which forms the other output side of the bridge (305, 306) is also at ground potential. However, if there is a charge on capacitor 304 this would try to hold the potential at the junction between diodes 309 and 311 (also 305, 306) either lower or higher than ground. When capacitor 304 potential is lower than ground, diode 309 conducts and draws electrons (or current) from capacitor 304 and supplies them to capacitor 312, thus raising the potential of capacitor 304 to ground potential. Conversely, when capacitor 304 potential is higher than ground, diode 311 conducts and supplies electrons (or current) from capacitor 312 to capacitor 304 to lower the latters potential to ground level. The capacitor 304 charging and discharging occurs very rapidly during the brief reset period of about 3 ms. This occurs because of the normally low impedance at the input of capacitor 304 and the temporary low impedance path at its output provided by the clamping circuit when it conducts as described below.

Transistors 321 and 322 provide for regulating the DC supply voltages of plus 6 volts and minus 6 volts, respectively, from plus 12 volts and minus 12 volts DC supply sources, respectively, since it is desired to use ground as the reference potential. If some positive voltage, for example, in the +3 to +9 volt range were selected to be the reference voltage instead of ground, transistors 321 and 322 and their associated circuitry could be eliminated. In addition, the junction between diodes 308 and 310 and the lower end of resistor 307 would be connected to this positive reference potential instead of ground. Moreover, the plus 6 volt bus would be connected to a plus 12 volt DC source and the minus 6 volt bus connected to ground. Thus the ECG. signal coupled by capacitor 304 to output terminal 306 can normally have a large amplitude ranging up to nearly 12 volts peak to peak.

Transistors 324, 325 and 326 by their action provides the clamping means for coordinating the functions of the transistors and diodes described above so that they can be controlled by one reset pulse. The reset pulse (27 in FIG. 23U), is applied in its negative form at terminal 323 via conductor 217 from reset MV 216. It then causes transistor 324 to continually conduct, except during the reset pulse, and saturate its base-emitter circuit, thereby holding its collector at a low potential which cuts off normally conducting transistors 325 and 326. When transistor 325 is cutoff, transistors 324 and 326 are driven into saturation. Concurrently, when transistor 326 is cutoff, transistors 313 and 315 are driven into saturation.

The saturation of transistors 313 and 314 causes the restoration of the charge on capacitor 312 to a convenient level of about 8 to 10 volts so that it will be ready to act during the next reset pulse as the floating power supply. Two resistors, 317 and 319, provide electrical symmetry in the limiting of recharging current flowing to capacitor 312. One resistor totaling the value of both of these resistors would work equally well.

When the negative going reset pulse arrives, the base of transistor 324 drops below the cutoff potential. This causes transistors 313, 314, 315, 316, 325 and 326 to act oppositely to that described above for the duration of the reset pulse. Diodes 308, 309, 310 and 311 become isolated and conductive, thus clamping the ECG. signal to ground potential for the duration of the reset pulse. Capacitor 304 is thereby either charged or discharged to ground potential at least once each cardiac cycle, thus eliminating any long term variation in its charge. This is necessary for precise evaluation of the ECG. signal by the analysis networks that follow.

ECG. SIGNAL ANALYSIS NETWORK COMPONENTS

Analysis of the electrocardiac ECG. signals are carried out in the apparatus of the present invention by signal discriminating networks which are based on the use of analogue and digital components, the latter relying upon binary logic techniques for operation. Because of the many instances where these components are referred to throughout this disclosure, it is felt desirable to presently discuss the construction and operation of exemplary circuits contemplated for use herein. Reference will therefore be made to FIGS. 7 through 11 immediately below.

Figure 9:
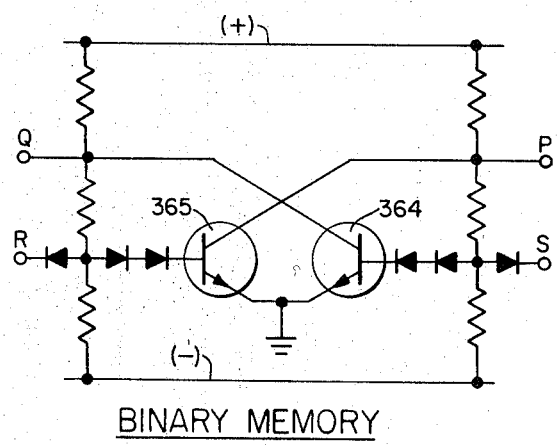
FIGS. 7 through 11 show circuits for analogue and digital components of the analysis networks portion of the electrocardiac signal analysis channel.
Figure 7:
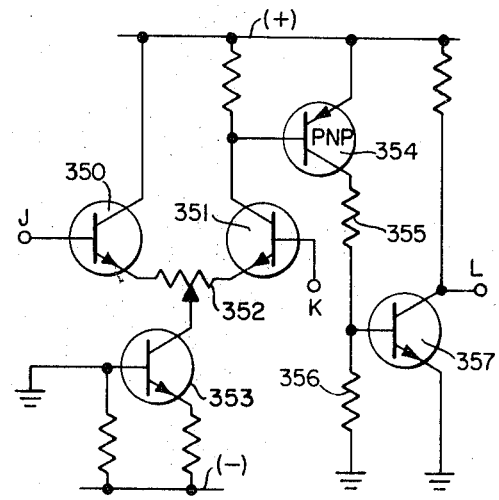
Figure 8:
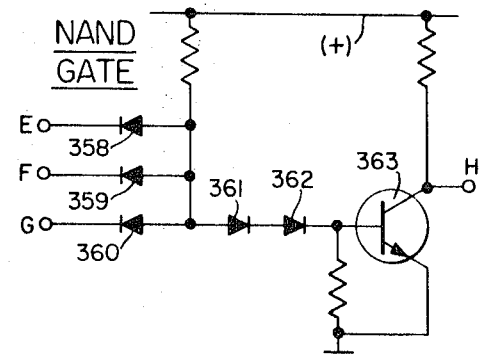

FIGS. 7, 8 and 9 pertain to circuits for logic elements which rely either wholly or partially upon binary logic in their operation. These have two different levels or states and the following definitions will apply herein. One binary state is a "zero" (0), or low state; the other binary state is a high, or "one" (1) state.

Turning now to FIG. 7, a level detector is shown in circuit diagram. Its block diagram symbol used hereinafter appears at the lower left of the circuit diagram while its logic or "truth" table appears at its lower right. The level detector compares an analogue voltage applied at input terminal J against an analogue voltage at input K and supplies either a high or a low binary output signal at L depending upon the relative amplitudes of the two input signals. Generally one of these signals is a steady DC reference voltage representative of a clinical standard for a wave parameter being evaluated, or may be of a particular amplitude or polarity to determine the onset of a wave form.

Transistors 350 and 351 operate under control of the input signals applied at terminals J and K, respectively. Potentiometer 352 interconnects the emitters of transistors 350 and 351 and receives at its slider a suitable biasing voltage maintained at a prescribed level by transistor 353, the latter being suitably biased itself for this purpose. The slider of potentiometer 352 is adjusted to provide a suitable bias to each emitter. This level is generally a ratio of 1 to 1, although other levels may be selected depending upon the parameters involved.

The voltage appearing at the collector of transistor 351 is used to drive PNP transistor 354 whose collector is supplied with current through voltage divider resistors 355 and 356. Transistor 357 is driven by transistor 354 and the output signal is delivered to terminal L from the collector thereof. The overall sensitivity of the level detector is, of course, determined by the gain provided by transistors 354 and 357.

The level detector has four conditions of operation listed in the logic table of FIG. 7. First, when a steady reference voltage ($V_r$) is applied to input K and a variable input signal ($V_i$) less than $V_r$ is received at J, the output at L will be low. Second, with $V_r$ appearing at K and $V_i$ at J is equal to or greater than $V_r$, the output at L will be high. Third, when $V_r$ is connected to input J and a $V_i$ equal to or greater than $V_r$ is applied at K, the output at L will also be high. Fourth, with $V_r$ appearing at J and $V_i$ at K is greater than $V_r$, the output at L will then be low.

FIG. 8, shows a circuit diagram of a NAND gate logic element. Its symbol used in the following block diagrams is shown at the lower left of the circuit diagram and the mathematical notation of its operation appears at its lower right. This NAND gate operates from the sum of plurality of high input pulse simultaneously applied, for example, to input terminals E, F and G while maintaining a low binary output signal at terminal H. If any one (or more) of the input signals is low, then the output at H becomes high and in effect inverts the input signal.

The NAND gate employs conventional circuitry and includes up to six inputs, although only three are shown in FIG. 8, these being input terminals E, F and G. Binary pulses are applied to the inputs and pass through diodes 358, 359, 360, respectively, actually one diode for each input pulse. When the algebraic sum of these pulses exceeds the biasing and breakdown voltage of diodes 361 and 362, transistor 363 is driven into conduction and the output voltage at H drops from a high to a low state. When any one (or all) of the binary input pulses at E, F, G, etc. drops from a high to a low level, then transistor 363 is cutoff and the output voltage at H raises to the high state.

Referring to FIG. 9, a binary memory, or flip-flop, is also shown in circuit diagram. A symbol for this logic element is used in subsequent block diagrams and is shown at the lower left of the circuit diagram. A logic table of its operation appears to the right of the symbol. The binary memory is a bistable device which receives complementary binary set and reset signals at its input terminals S and R, respectively, and produces complimentary high and low signals at its output terminals Q and P, respectively. When the S and R signal levels reverse the state of operation reverses, thus causing the level of output signal to reverse at Q and P and remain in this state until S and R signals are again reversed to their previous condition.

The binary memory employs a conventional bistable circuit. Transistors 364 and 365 are cross-coupled and suitable biased for alternate operation in either of two stable states according to the logic table shown in FIG. 7. More particularly, if a low signal is applied at the set input terminal S and a high signal of the reset terminal R, the high output terminal Q is high and the low output terminal P is low. Further, when a high signal is applied at S and a low signal at R, the Q output will be low and the P output high. Moreover, if high signals were applied at both S and R, the outputs Q and P would remain unchanged.

Figure 10:
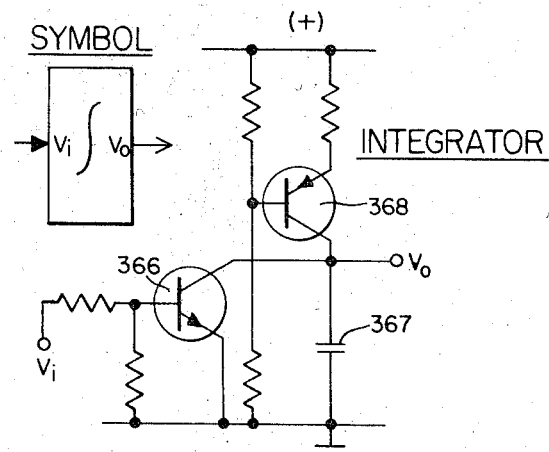

In FIG. 10 there is illustrated a clamped integrator circuit diagram which is accompanied at its left by a symbol used in the block diagrams shown in FIGS. 17 and 18. The clamped integrator includes transistor 366 which normally is saturated by a high binary pulse applied at $V_i$. The resulting very low impedance of transistor 366 shunts integrating capacitor 367 and maintains it in a discharged condition until an unclamping signal is received at $V_i$. Concurrently, transistor 368 acts as a constant current source whose output current is passed to ground through the saturated transistor 366 placing the output voltage $V_o$ at, or near, ground level.

When it is desired to operate the integrator, a low binary pulse is applied at $V_i$ for the time interval desired. This places transistor 366 into cutoff and causes the current from the constant current source transistor 368 to charge integrating capacitor 367 from a B+ source at a steady rate as determined by the current from transistor 368. During this action the voltage output $V_o$ steadily increases proportional to time for the duration of the unclamping pulse at $V_i$. Thereafter, the circuit immediately returns to its previous state while placing the output voltage $V_o$ at, or near, ground potential.

Figure 11:
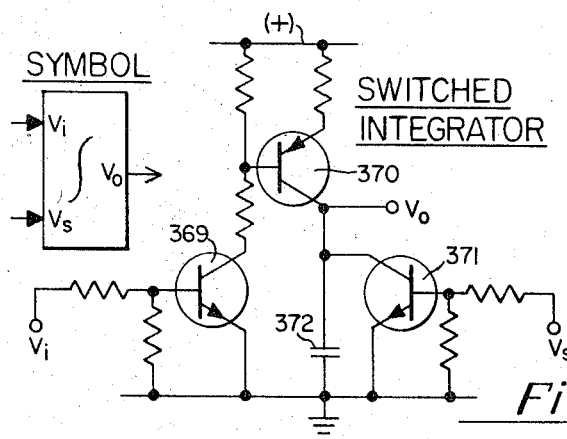

Turning now to FIG. 11, there is illustrated a switched integrator circuit diagram which has at its left a symbol used in the block diagram of FIG. 18 in the accompanying drawings. This switched integrator includes transistor 369 when rendered conductive by a high binary clamping pulse applied at $V_i$, causes transistor 370 to act as a constant current source. A high binary switching pulse applied at $V_s$ places transistor 371 into saturation. This shunts integrating capacitor 372 and maintains it in a discharged condition until a low level switching pulse appears at $V_s$. Concurrently, the saturated transistor 371 places the output voltage at $V_o$ as well as the collector voltage of transistor 370 at, or near, ground level. This integrator has the distinction of combining the logical functions of two binary pulses with an integrating function in the same device.

In operation, a high binary unclamping pulse in applied at $V_i$ for a prescribed time interval. This places transistor 369 into saturation and causes transistor 370 to furnish a constant current. While the low binary pulse is applied at $V_s$, a high binary pulse is applied at $V_i$ which causes current source 370 to conduct. This charges integrating capacitor 372 at a steady rate as determined by the conductivity of transistor 370. Capacitor 372 will continue to charge as long as the low binary pulse is present at $V_s$ and a high binary pulse at $V_i$. When the pulse at $V_i$ is decreased to a low level, transistor 369 is cutoff and current source transistor 370 is placed into cutoff. This terminates the flow of capacitor charging current and the rise in output voltage at $V_o$ provided the low binary pulse is still received at $V_s$. When the next high binary pulse is applied at $V_s$ integration terminates and the circuit immediately returns to its previous state while placing the output voltage at, or near, ground potential.

S—T SEGMENT ANALYSIS NETWORK

Figure 12:
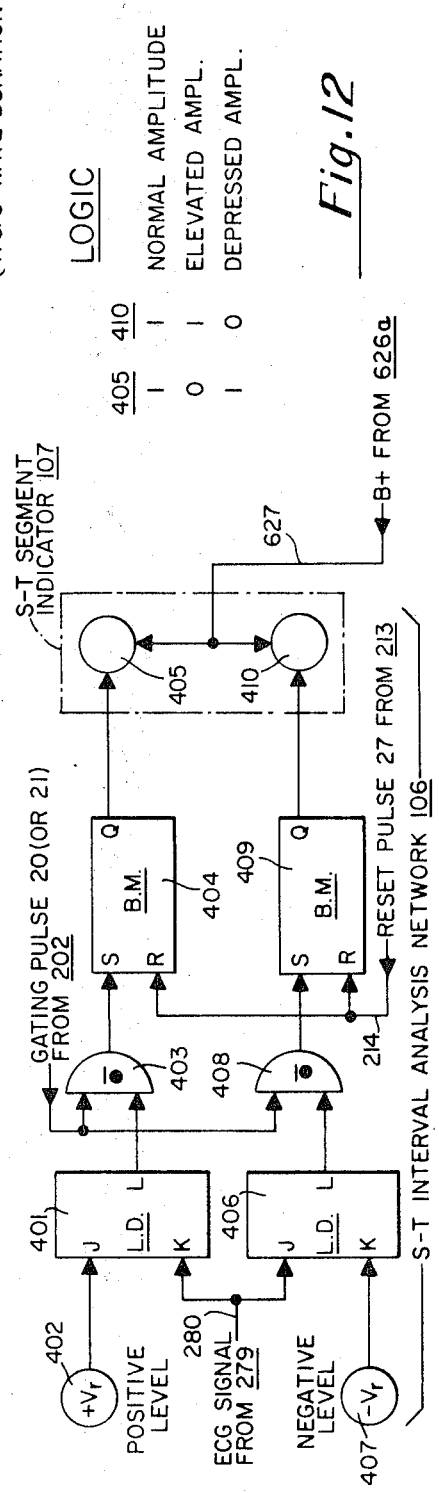
FIG. 12 is a block diagram of the S—T interval analysis network.

The first ECG. signal discriminating network to be discussed is the S—T segment analysis network 106, this being illustrated in the block diagram of FIG. 12. Analysis network 106 employs a combination of logic elements previously described in connection with FIGS. 7, 8 and 9 for evaluating the ECG. signals represented, for example, by the wave forms shown in FIGS. 23A, 23B, 23C and 23D. More particularly, level detectors receiving the ECG. signals from base line reset clamper 279 operate against preselected reference voltages representative of clinical standards for the parameters listed in table I. The level detectors feed NAND gates which respond to the S—T interval gating pulse 20 (or 21) shown in FIG. 23P for controlling binary memories which produce binary signals at the output of the analysis network. For convenience, these output signals drive an array of transistorized indicating lights in the S—T segment indicator 107, these being described below in connection with FIG. 22. The indicating lights are read in binary logic fashion to indicate normal, elevated and depressed wave amplitude when the ECG. signal deviates from the prescribed standards represented by the reference voltages during a sampling period within the S—T segment.

Turning now to FIG. 12, binary memories 404 and 409 are presumed to have been reset by pulse 27 (FIG. 23U) and their high outputs Q are both in the low state. The reset signal is normally at a high level and goes to the low state only during the brief (about 3 ms.) reset period. Therefore, both the reset inputs R of binary memory 404 and 409 are in the high state. This action is also typical of the reset pulse on the binary memories appearing below, unless otherwise stated.

A high gating pulse 20 (or 21) is supplied from S—T segment gate generator 202 only during the time that it is desired to evaluate the ECG. amplitude level during the S—T segment. This gating pulse is applied to both NAND gates 403 and 408. Since this signal is low, except during the time when the S—T segment is to be sampled, the outputs of NAND gates 403 and 408 are normally high. This makes S (set) and R (reset) inputs of binary memories 404 and 409 high. Therefore, the high output of both binary memories will stay in the low state as long as this condition persists.

The output of level detector 401 is fed to NAND gate 403 and the output of level detector 406 is fed to NAND gate 408. A positive threshold voltage representative of clinical standards for positive wave amplitude during the S—T segment is applied to input J of level detector 401 from source 402. Similarly, a negative threshold voltage is applied to input K of level detector 406 from source 407. The ECG. signal supplied from baseline reset clamper 279 has a 0 volt DC reference and is applied to input K of level detector 401 and input J of level detector 406.

With the reference voltages and ECG. signal applied to the inputs of each of these level detectors as described above, the output of each level detector is high whenever the ECG. signal is between the two reference voltages. In other words, the ECG. signal is less than the positive reference voltage and more positive than the negative reference voltage. If this condition persists when the gating pulse 20 (or 21) goes high, the outputs of both NAND gate 403 and NAND gate 408 will go low, thus applying a low signal to the S inputs of binary memories 404 and 409 and causing their high outputs Q to go high. Thus, when the ECG. level is between the two reference voltage threshold values at the proper time in the S—T segment, the Q output of binary memories 404 and 409 will both be high.

The high output signal from the Q outputs of binary memories 404 and 409 drive an illuminate their respective indicator lights 405 and 410 in the S—T segment indicator 107. This signifies a normal ECG. wave amplitude during the sampling period in this segment of the cardiac cycle. The indicator lights remain illuminated until the next reset pulse 27 is applied at the R inputs of binary memories 404 and 409, thus causing their high outputs Q to go low and extinguish indicator lights 405 and 410.

If during the S—T segment gating period of the ECG. signal level is greater than the positive threshold of level detector 401, thus causing the output of level detector 401 to be low and NAND gate 403 to be high, binary memory 404 will have high levels on both the set and reset inputs, therefore its Q output will stay low. Also during this time the output of level detector 406 will still be in the high state, therefore, the output of NAND gate 408 will be in a low state and binary memory 409 will be set and its Q output will be high. If the ECG. signal has an elevated S—T segment, the Q output of binary memory 404 will be low, and indicator light 405 will be out. The Q output of binary memory 409 will be high and drive indicator 410. Thus, when indicator 405 is out and 410 is illuminated, an elevated wave form exists.

If during the S—T segment the ECG. level is lower, or more negative than the negative threshold value, the output of level detector 406 will be low causing the output of NAND gate 408 to remain high. Therefore, binary memory 409 high output Q will remain low. Meanwhile, the output of level detector 401 remains high, therefore, the output of NAND gate 403 goes low during the gating period, thus, placing the low signal on the set input to binary 404 and causing its high output Q to go high. For the condition where the S—T segment of the ECG. signal is more negative than the negative threshold value during the sampling period, the Q output of binary 404 will be high and the Q output of binary 409 will be low. This causes indicator light 405 to become illuminated and light 410 to be extinguished which signifies a depressed wave condition. Since the Q outputs of binary 404 and binary 409 are operative only when the gating pulse 20 (or 21) occurs during the S-—T segment, these binary memories are inactive during any other period of the ECG. wave with the exception of their reset time.

Table I suggests that the S—T segment be evaluated during each lead selected by switch 130. However, when a severe arrhythmia condition is present in the ECG. signal, indicator lights 405 and 410 are automatically disabled by terminating their B+ voltage normally supplied over conductor 627 from arrhythmia disabling relay 626 as directed below.

T-WAVE ANALYSIS NETWORK

Figure 13:
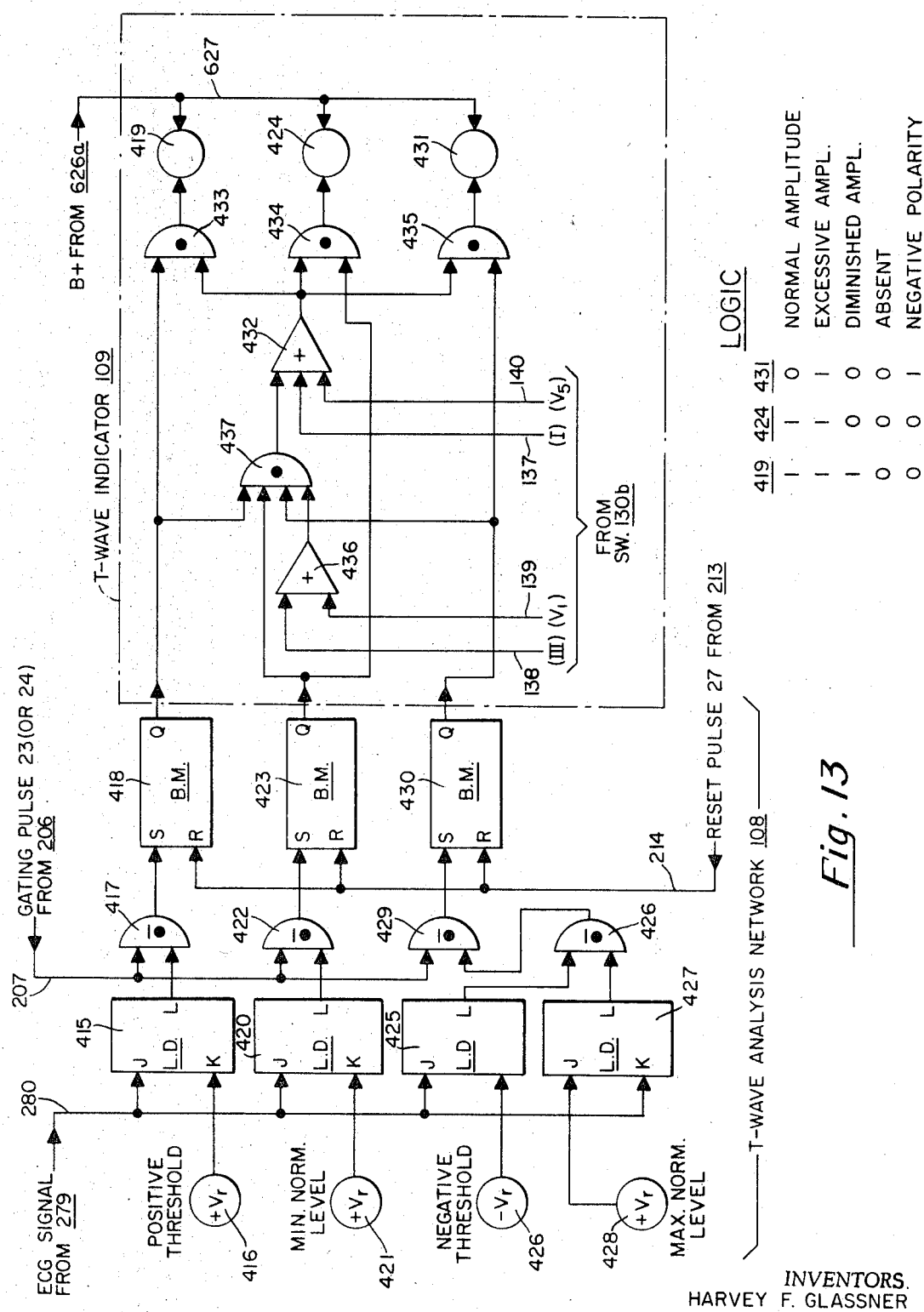
FIG. 13 is a block diagram of the T-wave interval analysis network.

The second signal discriminating network in the sequence for evaluating the ECG. signal is the T-wave analysis network 108. A block diagram of this network is shown in FIG. 13 and the ECG. signal wave form parameters evaluated by it are listed in table I. This analysis network is constructed and operated much the same as the S—T wave analysis network 106, except that it evaluates the ECG. signal and develops output signals for T-wave absence and negative polarity in addition to normal excessive and diminished wave amplitude. The output signals drive T-wave indicator 109 where all parameters are read when leads I and V$_5$ are selected, but only excessive wave amplitude is indicated during other lead selections. This feature is provided by a combination of conventional AND and OR gates controlling the passage of output signals to the indicator 109 in response to a disabling signal from lead selector switch 130b. The high T-wave gating pulse 23 (or 24) supplied from previously described T-wave gate generator 206 is preferred during the desired gating period. This gating period overlaps the normal T-wave duration in order to accommodate T-wave shifts that occur from patient to patient. This means that NAND gates 417, 422 and 429 controlling binary memories 418, 423 and 430 are only permitted to become activated when the gating pulse is high. For the remaining portion of the disclosure on the T-wave analysis network 108 it will be assumed that the T-wave gating pulse is high. Further, it is assumed that all binary memories have previously been reset by pulse 27 from MV 213 and therefore their outputs Q are in the low condition.

Referring again to FIG. 13, it will be noted that the ECG. signal on lead 280 from the base line reset clamper 279 is applied to input J of level detector 415 and a prescribed positive threshold reference voltage from source 416 is applied to its input K. The ECG. signal from base line reset clamper 279 is also applied to input J of level detector 420 and a preset minimum normal T-wave level reference voltage from source 421 is applied to input K of level detector 421. The ECG. signal is applied to input J of level detector 425 and a prescribed negative T-wave threshold level reference voltage from source 426 is applied to input K of level detector 425. The maximum normal T-wave level positive reference voltage from source 428 is applied to input J of level detector 427 and the ECG. signal is applied to its input K.

As a first case, assume that the ECG. signal level is zero or that the T-wave is missing during this period. Under these circumstances the output of level detector 415 is low causing the output of NAND gate 417 to be high thus putting a high signal on the S input and a high signal on the R input of binary memory 418, therefore, the output of binary 418 remains low. The output of level detector 420 is also low causing the output of NAND gate 422 to be high and the S and R inputs of binary memory 423 are both high, thus leaving its high output Q low. The output of level detector 425 is high and the output of level detector 427 is high causing the output of NAND gate 426 to be low. This low output of NAND gate 426 is applied to one of the inputs of NAND gate 429. This low input causes the output of NAND gate 429 to be high, therefore, the S and R inputs of binary 430 are both high and its high output Q is low. Under these circumstances, all binary memoried high outputs Q are low which signified the absence of the T-wave and none of the lights in defect indicator 109 will light.

Now assume that the ECG. signal is above the minimum positive threshold value established by source 416 but below the minimum normal T-wave value preset at source 421. This causes the output of level detector 415 to be high. This high signal applied to NAND gate 417 would cause its output to go low while applying a low signal to the S input of binary memory 418, thus causing its high output Q to go high. The remaining level detectors in this network, i.e., detectors 420, 425 and 427 remain in the same state that they were for the previous case as do the corresponding high outputs Q of binary memories 423 and 430.

Now, let it be assumed for the present that AND gates 433, 434 and 435 are activated by a high signal from OR gate 432 as will be later described. Then the high output Q of binary memory 418 turns on indicator light 419 in T-wave indicator 109 while indicator lights 424 and 431 remain off, thus signifying that the T-wave is present but has a diminished wave amplitude.

Now assume that the T-wave is above the minimum normal T-wave level preset by source 416, but below the maximum normal T-wave level (or above the level of source 421). Under this condition, the output of level detector 415 is high thus causing the output of NAND gate 417 to go low and applying a low signal to the S input of binary 418 and the high output Q of binary 418 will be high. Also, the output of level detector 420 will be high causing the output of NAND gate 422 to be low and applying a low signal to the S input of binary memory 423 and its high level output Q would be high. Level detectors 425 and 427 are not changed in this condition, therefore, the high output Q of binary memory 430 will be low. For a condition where the T-wave is above the minimum normal T-wave level, but below the maximum normal T-wave level, or in other words the T-wave is normal, the Q outputs of binary memories 423 and 430 will be high and drive AND gates 433 and 434. The Q output of binary memory 430 would be low. Indicator lights 419 and 424 will illuminate and light 431 will not, thus indicating a normal T-wave amplitude.

Next, consider the case where the ECG. signal is higher than the maximum normal T-wave level during the T-wave interval as compared to the level established by source 428. The output of level detector 415 will be high causing the output of NAND gate 417 to be low, thus applying a low signal to the set input of binary memory 418 which causes its Q output to go high. The output of level detector 420 will be high causing the output of NAND gate 422 to be low, thus applying a low signal to the S input of binary memory 423 and causing its Q output to go high. The output of level detector 427 will go low causing the output of NAND gate 426 to go high, thus causing the output of NAND gate 429 to go low while applying the low signal to the S input of binary memory 430. The Q output of binary memory 430 will go high. For the case where the T-wave has exceeded the maximum normal T-wave level the output of binary memories 418, 423 and 430 would all be high. Consequently, AND gates 433, 434 and 435 drive and illuminate indicator lights 419, 424 and 431 to indicate an excessive T-wave amplitude.

Consider next a negative going T-wave. When the ECG. level becomes more negative than the negative threshold value preset by source 426, the output of level detector 425 goes low causing the output of NAND gate 426 to go high.

This causes the output of NAND gate 429 to go low applying a low value signal to the S input of binary memory 430 which causes its Q output to go high. Level detectors 415 and 420 remain in the high state and binary memories 423 and 430 Q outputs remain low. Thus, when the ECG. level goes negative during the T-wave period, the Q outputs of binary memories 418 and 423 are low and the Q output of binary memory 430 is high. AND gate 435 becomes activated and illuminates indicator light 431 while lights 419 and 424 remain extinguished. This binary arrangement indicates the presence of a negative T-wave.

Since the Q outputs of the foregoing binary memories go high only when the T-wave gating pulse 23 (or 24) occurs, they remain inactive during other functional periods of the ECG. wave, except when reset by the next reset pulse 27. Therefore, the indications on indicator 109 are reset once each cardiac cycle.

Table I suggests that all of the chosen parameters for the T-wave functional period be evaluated during the selection of leads I and $V_5$ but only the excessive wave amplitude parameter during the selection of leads III and $V_1$. This selective feature is governed by either activating or disabling the AND gates 433, 434 and 435 mentioned above by the presence or absence of a high control signal from OR gate 432. OR gate 432 will pass any one of three high signals applied at its inputs. Two of these are signals supplied from lead selector switch 130b over conductors 137 and 140 when either lead I or lead $V_5$ is selected for evaluation, thereby enabling indicator lights 419, 424 and 431 to become illuminated in any combination during these lead selections.

The third high signal applied to OR gate 432 is fed from AND gate 437 which itself requires the sum of four high input signals to become activated. Three of these input signals are provided by the high outputs at Q of binary memories 418, 423 and 430. This occurs only when the T-wave has an excessive amplitude as noted above. The fourth input signal to AND gate 437 is fed from OR gate 436 which will pass either one of two high signal supplied from lead selector switch 130b over conductors 138 and 139 when either lead III or lead $V_1$ is selected for evaluation. This enables indicator lights 419, 424 and 431 to become illuminated only during excessive T-wave amplitude when either lead III or lead $V_1$ is selected. These indicator lights are disabled during severe arrhythmia regardless of lead selection by the action of relay 626 cutting off their B+ supply as noted below.

T—P INTERVAL ANALYSIS NETWORK

The T—P interval analysis network 110 is the third signal discriminating network in the sequence for evaluating the ECG. signals. FIG. 14 illustrates this network in block diagram form. Table I lists the ECG. wave form parameters evaluated by it and suggests that none of the indications derived from the four leads listed be excluded by lead selection. This analysis network is constructed much the same as the S—T segment analysis network 106. It operates to evaluate the ECG. signal and indicate on T—P interval indicator 111 normal wave amplitude and excessive positive wave amplitude, excessive negative wave amplitude and a combination or these excessive wave amplitudes during a selected portion or the normally quiescent T—P interval.

The T—P interval gating pulse 26 (FIG. 23T) is supplied from T—P interval gate generator 210 in its positive going form so that it is high during the desired evaluation period. The NAND gates 443 and 448 controlling binary memories 444 and 449 are thereby permitted to become activated only when the T—P gating pulse is high, a condition assumed for the balance of this particular disclosure. It is also presumed that both binary memories 444 and 449 have previously been reset and that their high outputs Q are in the low state.

Still referring to FIG. 14, the ECG. signal fed from base line reset clamper 279 is applied to input J of level detector 441 and the positive threshold level reference voltage from source 442 is applied to input K of level detector 441. A negative threshold level reference voltage from source 447 is applied to input J of level detector 446 and the ECG. signal is applied to input K.

If the ECG. signal level is zero, the output of level detector 441 is low causing the output of NAND gate 443 to be high and binary memory 444 Q output is low. During the same ECG. signal condition, the output of level detector 446 is low causing the output of NAND gate 448 to be high and the Q output of binary memory 449 also remains low. Neither of the indicator lights 445 or 450 in the T—P interval indicator 111 will become illuminated. This signifies a normal wave amplitude during this gating pulse.

When the ECG. signal level at input J of level detector 441 exceeds the positive threshold level voltage from source 442 at input K, the output of level detector 441 goes high causing the output of NAND gate 443 to go low. This low signal applied to the S input of binary memory 444 and causes the high output Q of binary memory 444 to go high. The positive ECG. signal level will not effect the output of level detector 446 or the output of NAND gate 448, therefore, binary memory 449 output Q will remain low. In this case, then, a positive going wave occurring during the T—P interval gating period will cause binary memory 444 output Q to be high and drive indicator light 445 to illumination. Concurrently, binary memory 449 output Q remains low and does not drive indicator light 450. This combination indicates an excessive positive wave amplitude.

If the ECG. signal level becomes more negative then the negative threshold level voltage applied to input J of level detector 446 from source 447, the output of this level detector will go high causing the output of NAND gate 448 to go low. This low signal is applied to the S input of binary memory 449 thereby causing the high output Q of binary memory 449 to go high. The output of level detector 441 is not changed by this negative going ECG. signal therefore, the output of NAND gate 443 remains high and the Q output of binary memory 444 remains in the low state. Therefore, for a negative going ECG. signal occurring during the T—P interval gating period, the Q output of binary memory 449 is high and drives indicator light 450 to illumination. Concurrently, the Q output of binary memory 444 is low, and indicator light 445 is out. This combination is indicative of an excessive negative wave amplitude.

Moreover, if the ECG. signal level goes both positive and negative during the T—P interval gating period (FIG. 23T) the analysis network 110 will function as described above. In this case, the Q outputs of binary memories 444 and 449 will both be high and drive both indicator lights 445 and 450, respectively, to illumination to signify excessive positive and excessive negative wave amplitudes.

The reset pulse 27 (FIG. 23U) is applied to the R inputs of binary memories 444 and 449 immediately after the termination of the T—P interval gating pulse 26. These binary memories remain inactive until the next cardiac cycle, and then are activated only by a low signal from their respective NAND gates which are under control of gating pulse 27.

When a severe arrhythmia condition in the ECG. signal is present, indicator lights 445 and 450 are disabled by cutting off their B+ supply through action of the severe arrhythmia relay 626 below.

P-WAVE ANALYSIS NETWORK

In FIG. 15 there is shown a block diagram of the P-wave analysis network 112, this being the fourth signal discriminating network in the sequence for evaluating the ECG. signals. As appears above, table I lists the ECG. wave form parameters evaluated by it and suggests that complete evaluation occur only during the selection of lead I although evaluation of excessive wave amplitude occurs during the four leads listed. This analysis network is also constructed much the same as the T-wave analysis network 108. However, it operates to evaluate the ECG. signal and indicate on the P-wave interval indicator 114 wave absence, normal and excessive wave amplitude, and negative polarity only during the P-wave gating period.

The P-wave gating pulse 28 (FIG. 23V) is supplied from the P-wave gate generator 215 in its positive going form so that it is high during the desired period of evaluation. Thus gating period overlaps the normal P-wave duration and timing in order to accommodate P-wave timing shifts that occur from patient to patient. The NAND gates 457, 462 and 465 controlling binary memories are thus permitted to be activated only when the P-wave gating pulse is high, a condition assumed hereinafter. It is presumed that the binary memories are reset and that their high outputs Q are at their low level before the P-wave gating pulse 28 arrives.

The ECG. signal from base line reset clamper 279 is applied to input J of level detector 455 and the positive threshold level reference voltage from source 456 is applied at input K. The ECG. signal is also applied at input J of level detector 460 and the negative threshold level reference voltage from source 461 is applied to input K of level detector 460. A reference voltage from source 464 equal to the maximum normal P-wave voltage level is applied to input J of level detector 463 and the ECG. signal is applied to its input K.

If the ECG. signal is 0 volts, (indicative of a missing P-wave), the output from level detector 455 is low and the output of NAND gate 457 is high. Therefore, the S and R inputs to binary memory 458 are both high causing the high output Q to remain low. The output of level detector 460 is high and the output of level detector 463 is also high. These two output signals are applied to NAND gate 465 thereby causing its output to be low. This low signal is applied to the input of NAND gate 462 which causes its output to be high. Both the S and R inputs to binary memory 466 are high and its high output Q is low. It can be seen then that when the ECG. level is zero during the P-wave interval, both binary memories 458 and 466 Q outputs will be low. There is not signal to activate AND gates 470 and 471 nor to drive indicator lights 459 and 467 in P-wave indicator 113. This is indicative of a missing or absent P-wave.

If the ECG. signal level exceeds the positive threshold level of source 456, the output of level detector 455 will be high causing the output of NAND gate 457 to go low. This low going signal applied to the S input of binary memory 458 will cause its high output Q to go high. This positive going ECG. signal will not change the output of level detectors 462 or 465, therefore, binary memory 466 Q output will remain in the low state. The high output Q from binary memory 458 and the low output Q from binary memory 466 are applied to AND gates 470 and 471, respectively, which gates its will be presently assumed are activated by a high signal from OR gate 472 described below and operate to drive indicator light 459 into illumination, but not indicator 467. This indicates a normal P-wave amplitude.

If the ECG. signal exceeds the maximum normal P-wave reference voltage from source 464 as applied to input J of level detector 463, the latter's output will be low causing the output of NAND gate 465 to go high. This high signal applied to NAND gate 462 will cause its output to go low thus setting binary memory 466 and driving its Q output high. Under this condition, the ECG. signal will have exceeded normal limits and also caused binary memory 458 Q output to go high. Assuming the high signal from OR gate 472 is available, both AND gates 470 and 471 become activated and drive indicators 459 and 467 into illumination. Thus, with both lights on an excessive P-wave amplitude is indicated.

When the ECG. signal level is lower than the negative threshold level of source 461, the output from level detector 460 will be low, thus causing the output of NAND gate 465 to be high. This causes the output of NAND gate 462 which causes its Q output to to high. Level detectors 455 and 463 remain in their high state, and binary memory 458 Q output remains low. Assuming the high signal from OR gate 472 is available, AND gate 471 is activated by the high Q output of binary memory 466 and drives indicator 467 into illumination to indicate the negative P-wave polarity.

Since the Q outputs of the foregoing binary memories only go high when the Q-wave gating pulse 28 occurs, they remain inactive during the other functional periods of the ECG. wave, except when reset by the reset pulse 27 from MV 213.

The complimentary or low outputs P from binary memories 458 and 467 are supplied via conductors 468 and 469, respectively, to the inputs of NAND gate 480 in the P—R interval analysis network 114 below. These P outputs are designated NOT signals and are high when their Q counterpart is low and vice versa. Their purpose is to signal the P—R interval analysis network 114 of either the absence or presence of the P-wave. Further, these signals are not under control of the disabling signals from OR gate 472 and are thereby available during all lead selections.

Table I suggests that all of the chosen parameters for the P-wave functional period be evaluated during the selection of lead I but only the excessive wave amplitude parameter during the selection of leads III, $V_1$ and $V_5$. This selective feature is governed by either activating or disabling the AND gates 470 and 471 mentioned above by the presence or absence of a high control signal from OR gate 472. OR gate 472 will pass either one of two high signals applied at its inputs. One of these is a signal supplied from lead selector switch 130b over conductor 137 when lead I is selected for evaluation, thereby enabling indicator lights 459 and 467 to become illuminated in any combination during this lead selection.

The second high signal applied to OR gate 472 is fed from AND gate 474 which itself requires the sum of three high input signals to become activated. Two of these input signals are provided by the high outputs at Q of binary memories 458 and 466. This occurs only when the P-wave has an excessive amplitude as noted above. The third input signal to AND gate 474 is fed from OR gate 473 which will pass one of three high signals supplied from lead selector switch 130b over conductors 138, 139 and 140 when either one of leads III, $V_1$ or $V_5$ is selected for evaluation. This enables indicator lights 459 and 467 to become illuminated only during excessive P-wave amplitude when lead III, $V_1$ or $V_5$ is selected. These indicator lights are disabled during severe arrhythmia regardless of lead selection by the action of relay 626 cutting off their B+ supply as noted below.

P—R INTERVAL ANALYSIS NETWORK

Figure 16:
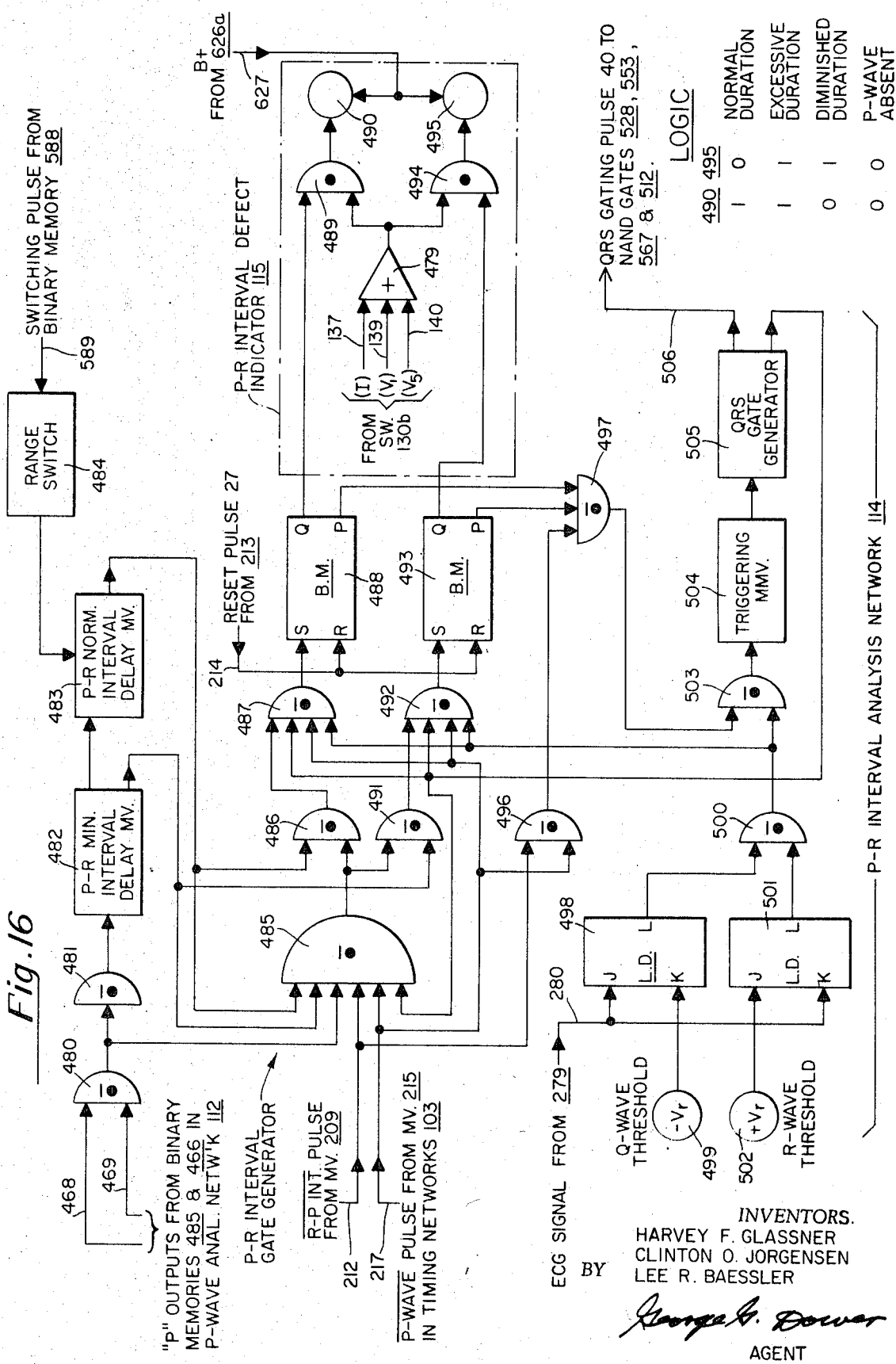
FIG. 16 is a block diagram of the P—R interval analysis network.

FIG. 16 illustrates in block diagram the P—R interval analysis network, the fifth signal discriminating network in the successive sequence for evaluating the ECG. signals. As will appear from table I, evaluation of all of the ECG. signal wave parameters by this network occurs only during the selection of lead I, $V_1$ and $V_5$. No evaluations are made during lead III selection. This network employs logic elements including level detectors, reference voltage sources, NAND gates and binary memories as previously described or referred to above. In addition, it includes monostable multivibrators of the type also previously referred to above. These are employed herein for establishing time standards representative of clinical standards of duration of the P—R interval, as well as that of the QRS wave train, and will be explained more fully below. This network operates to evaluate the P—R interval for normal, excessive and diminished duration. These parameters are indicated in binary fashion on an array of indicator lights in P—R interval defect indicator 115. The absence of the P-wave is also indicated thereon, this being an added feature since it is also determined in the P-wave analysis network 112. A combination of previously described AND and OR gates are employed to control the array of indicator lights responsive to lead selection signals.

The P—R interval gate is generated in this analysis network by means of a logic combination of pulses as appears below. These operate on NAND gate 485 to establish pulse 38 (FIG. 23CC) whose onset corresponds with the variable onset of the P-wave as signaled by P-wave analysis network 112, and whose termination corresponds with the relatively fixed onset of the Q-wave as detected at a constant cardiac rate in the present analysis network. The duration and timing of this gating pulse is therefore variable, this being dependent upon the arrival of the P-wave.

Just prior to the onset of the P-wave shown in FIG. 23A, the following conditions exist throughout the P—R interval analysis network 114. The Q outputs of binary memories 458 and 466 in P-wave analysis networks 112 are both low, therefore, their P outputs are both high. These P outputs are applied to the inputs of NAND gate 480 via conductors 468 and 469. Since both inputs to NAND gate 480 are high, the output of NAND gate 480 is low and the output of NAND gate 481 is high, the later being used as an inverter in this instance.

Monostable multivibrators (MMV) 482 and 483 are similar in construction to MMV 218 and MMV 200, respectively. The RC time constant of MMV 482 is about 100 ms. The normal RC time constant of MMV 483 is about 100 ms, this being extended to about 110 ms by action of electronic range switch 484 when the cardiac rate is equal to, or less than, 70 bpm as will be explained below. The B or high outputs of MMV 482 and 483 are also low at this time as shown by pulses 35 and 36 (or 37) in FIGS. 23AA and 23BB, respectively. The NOT R—P interval pulse supplied over conductor 212 by R—P interval delay MV 209 from its D terminal, (complement of pulse 26 in FIG. 23S) is high. The NOT P-wave pulse supplied over conductor 217 by P-wave gate generator MMV 215 from its D terminal (complement of pulse 28 in FIG. 23V) is low. Therefore, the output of NAND gate 485 is high, this gate acting as the P—R interval gate generator.

The high signal from the D output of monostable multivibrator 483 (pulse $\overline{36}$ or $\overline{37}$ in FIG. 23BB) and the high signal from NAND gate 485 is applied to NAND gate 486 causing its output to be low. This low signal from NAND gate 486 is applied to one of the inputs of NAND gate 487 causing its output to be in the high condition. Binary memory 488 then has a high signal on both its S and R inputs and its Q output remains low. The high signal from the output of NAND gate 485 and the high signal from the D output of monostable multivibrator 482 (pulse $\overline{35}$ in FIG. 23AA) are applied to the inputs of NAND gate 491 causing its output to be low. This low signal is applied to the input of NAND gate 492 causing its output to be high. Both the S and the R inputs of binary memory 493 are high, therefore, the Q output of binary memory 493 remains low.

Still just prior to the onset of the P-wave, the output of level detectors 498 and 501 are fed to NAND gate 500. A negative reference voltage from source 499 is applied to input K of level detector 498 for detecting the Q-wave threshold. Similarly, a positive reference voltage from source 502 is applied to input J of level detector 501 for detecting the P-wave and R-wave thresholds. The ECG. signal supplied from the base line reset clamper 279 not only has a 0 volt DC reference but also has a substantially zero amplitude at this time. Therefore, the outputs of level detectors 498 and 501 are both high causing the output of NAND gate 500 to be low. This low output from NAND gate is applied to one input of NAND gate 503 causing its output to be high. The high P output of R—P interval MMV 209 (pulse $\overline{25}$ ) and the low D output of P wave gate generator 215 (pulse $\overline{28}$ ) at the inputs of NAND gate 496 cause the output of NAND gate 496 to be high. The P outputs of binary memories 488 and 493 are both high and these outputs plus the output from NAND gate 396 are applied to the inputs of NAND gate 497 causing the output of NAND gate 497 to be low. The low output from NAND gate 497 is applied to one of the inputs of NAND gate 503 and this signal also causes the output of NAND gate 503 to remain high. Since the P outputs of binary memories 488 and 493 are both high, their high outputs Q are both low. Under this condition AND gates 489 and 494 are not activated nor are indicator lights 490 and 495. This indicates the absence of the P-wave.

Now assume that a normal P wave arrives in the ECG. signal. This P-wave signal would cause the Q output of binary memory 458 to go from a low to a high state and its P output to go from a high to a low state. Binary memory 466 high signal at output P remains unchanged. Therefore, NAND gate 480 now has a high and a low signal at its input which causes its output to go from a low to a high state. This high state applied to the input of NAND gate 481 causes its output to go from a high to a low state thereby triggering monostable multivibrator 482. Thus, the B output of monostable multivibrator 482 will go from a low to a high state and its D output will go from a high to a low state and will remain that way for about 100 ms, these taking the form of pulse 35 shown in FIG. 23AA. At the same time that the P output of binary memory 458 goes from a high to a low state, the output of level detector 501 will go from a high to a low state. This will cause the output of NAND gate 500 to go from a low to a high state. This high signal is applied to the inputs of NAND gates 487, 492, and 503. The outputs of NAND gates 487 and 492 will not change state at this time because the D output of P-wave gate generator 215 (pulse $\overline{28}$ ) which is low keeps the outputs of NAND gates 487 and 492 high. Since all the inputs to NAND gate 497 are high, its output is driven low. This low signal is applied to one of the inputs of NAND gate 503 and will keep the output of NAND gate 503 high even though the high output from NAND gate 500 is applied to one of the inputs of NAND gate 503. As a result, triggering MMV 504 and QRS gate generator 505 will not be triggered when the output of NAND gate 500 goes from a low to a high state.

When the P-wave of the EKG. signal has concluded and the ECG. signal returns back to approximately a zero level, the output of level detector 498 goes high. This causes the output of NAND gate 500 to go low and this is the only change that takes place in the whole network.

Now assume that the D output of the P-wave gate generator 215 (pulse $\overline{28}$ ) goes from a low to a high state, thus signifying the end of the P-wave gating pulse. When this occurs, the output of NAND gate 496 goes from a high to a low state causing the output of NAND gate 497 to go from a low to a high state. This high signal from NAND gate 497 is applied to the input of NAND gate 503 but the output of NAND gate 503 cannot go low because the output of NAND gate 500 which is low is holding the output of NAND gate 503 high, and monostable multivibrators 504 and 505 cannot be triggered. The B output of monostable multivibrator 482 is still in the high state and if the ECG. signal should go either positive or negative now, the Q output of binary memory 493 will go to a high state due to the following action.

As the ECG. signal goes negative or positive indicating the arrival of the Q-wave or the R-wave, the output of NAND gate 500 goes from a low to a high state. This high signal is applied to one of the inputs of NAND gate 487 and NAND gate 492. If the ECG. signal now goes either positive or negative the output of NAND gate 500 will go from a low to a high state. The high signal from the output of NAND gate 500 applied to the input of NAND gate 503 will cause the output of NAND gate 503 to go low. This initiates triggering MMV 504 and produces pulse 39 shown in FIG. 23DD. The trailing edge of pulse 39 triggers the QRS gate generator 505 which produces pulse 40 shown in FIG. 23EE and supplies a low pulse to NAND gate 487 and 492 and a high pulse to the analysis networks 116, 118, 120 and 122 described below. Both MMV 504 and 505 are monostable multivibrators constructed and operated similar to MMV 218. MMV 504 has an RC time constant of about 1 ms while MMV 505 has one of about 120 ms.

The high signal from the output of NAND gate 500 is also applied to the inputs of NAND gate 487 and NAND gate 492. If the D output of monostable multivibrator 482 is low, the output of NAND gate 491 will be high. All four inputs to NAND gate 492 are now high, thereby causing the output of NAND gate 492 to go low thus putting a low signal on the S input to binary memory 493 which causes the Q output of binary memory 493 to go high. Assuming for the present that OR gate 479 supplies a high pulse and activates AND gates 489 and 494. The high output Q from binary memory 493 then drives indicator light 495 to illumination. Indicator light 490 is extinguished at this time. This combination of lights in P—R interval defect indicator 115 indicates that the onset of the QRS wave train in the ECG. signal occurred during the 100 ms interval of monostable multivibrator 482 (pulse 35 in FIG. 23AA) and that the P—R interval duration is diminished to too short.

When the B output of monostable multivibrator 482 goes from a high to a low state, it triggers monostable multivibrator 483. If the output of NAND gate 500 has gone from a low to a high state when the D output of monostable multivibrator 483 was low, the output of NAND gate 486 will go high causing the output of NAND gate 487 to go low, thus setting binary memory 488 and causing its high output Q to go high. This activates AND gate 489 which drives indicator light 490 into illumination. Indicator light 495 is out at this time. Thus, if the onset of the QRS wave train occurs during the timing interval or unstable state of monostable multivibrator 483 (pulse 36, or 37, in FIG. 23BB), the P—R interval duration is normal.

At a predetermined cardiac rate of about 70 bpm and less, the 100 ms duration of monostable multivibrator 483 is automatically extended to about 110 ms by action of range switch 484, thus changing the timing standard for duration evaluation of the P—R interval as a function of cardiac rate. Pulse 36 in FIG. 23BB extends to pulse 37 by this action. This switch is constructed like range switch 201 in timing networks 103 and operates on MMV 483 as 201 does on delay MV 200. This extension in duration is necessary for precise operations in the lower cardiac rate range because of the inherently longer duration of the P—R interval.

If the output of NAND gate 500 had gone high after the termination of the time duration of monostable multivibrator 483, the output of NAND gate 485 (the P—R interval gate) would go low and this low signal is applied to both NAND gates 486 and 491, thereby causing their outputs to be high. Now all four inputs to both NAND gates 487 and NAND gate 492 are high, thereby causing their outputs to be low, thus setting both binary memories 488 and 493. This causes their high outputs Q to become high and activate both AND gates 489 and 494. Both indicator lights 490 and 495 are driven to illumination when the QRS wave train occurs after the termination of MMV's 482 and 483, thus indicating excessive duration of the P—R interval.

The input of NAND gate 485 from the output of NAND gate 480 is necessary to keep binary memories 488 and 493 from being set if no P-wave occurs. The complementary or D output from the QRS gate MMV 505 is applied to NAND gate 485 and is necessary to keep both binary memories 488 and 493 from being turned on after either one has been set indicating a P—R interval that is too short or a P—R interval that is normal. The 1 ms monostable multivibrator 504 is necessary to insure that both binary memories 488 and 493 can be set before the complement of the QRS gating pulse 40 is produced at the D output of MMV 505. Pulse 40 acts on NAND gate 485 which disables the succeeding NAND gates which control binary memories 488 and 493. The D output from MMV 505 is also applied to NAND gates 487 and 492 to keep binary memories 488 and 493 from changing state once they have been set by the onset of the QRS wave train.

Since the Q outputs of binary memories 488 and 493 only go high when the P—R interval occurs, they remain inactive during the other functional periods of the ECG. wave, except when reset by pulse 27.

Table I suggests that all of the chosen parameters for the P—R interval functional period be evaluated during the selection of leads I, $V_1$, and $V_5$. This selective feature is governed by either activating or disabling the AND gates 489 and 494 mentioned above by the presence or absence of a high control signal from OR gate 479. OR gate 479 will pass any one of three high signals applied at its input. These are signals supplied from lead selector switch 130b over conductors 137, 139 and 140 when either lead I, lead $V_1$, or lead $V_5$ is selected for evaluation, thereby enabling indicator lights 490 and 495 to become illuminated in any combination during these lead selections.

When lead III is selected for evaluation there is an absence of a signal from switch 130b at OR gate 479, thus disabling AND gates 489 and 494 and any indications from indicator lights 490 and 495. Likewise, when a severe arrhythmia condition exists in the ECG. signal these indicator lights are disabled regardless of lead selection by cutting off their B+ supply from line 627 through action of the severe arrhythmia relay 626 as appears below.

Q-WAVE ANALYSIS NETWORK

According to FIG. 17 there is shown a block diagram of the Q-wave analysis network 116, this being the sixth signal discriminating network in the sequence for evaluating the ECG. signals according to parameters listed in table I. This network is constructed and operated much like the S—T interval analysis network 106, except that it includes the clamped integrator described in connection with FIG. 10 for use in determining Q-wave duration. It evaluates the ECG. signal and develops output signals for Q-wave amplitude and duration normally; and excesses in amplitude, duration and a combination of these. The output signals drive Q-wave indicator 117 where all parameters are read on an array of indicating lights in binary fashion when leads I, III and $V_5$ are selected for evaluation. No parameters are read when lead $V_1$ is selected. This feature is provided by a combination of conventional AND and OR gates controlling the passage of output signals to the indicator 117 in response to a lead selection control signal.

The high QRS gating pulse 40 (FIG. 23EE) is supplied from the B output of QRS gate generator 505 to the present analysis network only during the desired period of evaluation of the ECG. signal. This gating period of 120 ms overlaps the normal Q-wave duration in order to accommodate variations which sometimes occur in Q-wave duration. The NAND gates 512 and 517 controlling binary memories 513 and 518 are permitted to be activated only when the QRS gating pulse 40 is high while receiving a high pulse activating signal from the low output P of binary memory 542, described below. The latter pulse indicates that a R-wave has not yet occurred in the cardiac cycle and which prevents the Q-wave analysis circuitry from mistaking an S-wave for a Q-wave. Both of these high pulses are presumed to be present hereinafter. It is also presumed that the binary memories 513 and 518 are reset and that their high outputs Q are at their low level before the QRS gating pulse 40 arrives.

The ECG. signal from base line reset clamper 279 is applied to input J of level detector 507 and input K of level detector 515. A minimum Q-wave threshold level reference voltage from source 508 is applied to input K of level detector 507 and a maximum Q-wave threshold level reference voltage from source 516 is applied to input J of level detector 515. If the ECG. signal level is near zero, the output of level detector 507 is high and integrator 509 (FIG. 10) remains in the reset or clamped position and its output is low. Also, the outputs of level detectors 510 and 515 are low causing the outputs of NAND gates 512 and 517 to be high, therefore, the high outputs of binary memories 513 and 518 are low. Since these signals are inadequate to activate AND gates 477 and 478, indicator lights 514 and 519 in Q-wave defect indicator 117 will not light. This condition indicates a normal amplitude as well as a normal duration for the Q-wave if it was present.

If the ECG. signal exceeds the minimum Q-wave threshold level, the output of level detector 507 goes from a high to a low state. This starts the output of integrator 509 going from essentially a zero level and increasing linearly with time. As soon as the output of integrator 509 exceeds the reference voltage from source 511 which is applied to input K of level detector 510, the output of level detector 510 goes from a low to a high state. As long as the ECG. signal level is more negative than the minimum Q-wave threshold level, the output of integrator 509 will increase linearly with time. The gain of integrator 509 in combination with the reference voltage level from source 511 at input K level detector 510, act as an interval measuring device for the ECG. signal Q-wave. Whenever the duration of the Q-wave excursion exceeds a prescribed value as determined by the gain of integrator 509 and the reference voltage applied to level detector 510, the output of level detector 510 goes from a low to a high state thereby causing the output of NAND gate 512 to go from high to a low state. This low signal is supplied to the S input of binary memory 513 which causes its high output Q to go from a low to a high state. Assume for the present that AND gates 477 and 478 are activated by a high signal from OR gate 476 as will be described later. Then the high signal from binary memory 513 will be passed by AND gate 477 which drives indicator light 514 to illumination. Indicator light 519 is out at this time. This combination of lights indicates an excessive Q-wave duration in the QRS wave train.

If the ECG. signal level becomes even more negative than the maximum Q-wave threshold level, the output of level detector 515 goes from a low to a high state, thus causing the output of NAND gate 517 to go from a high to a low state. This low output signal is applied to the S input of binary memory 518 causing its high output Q to go from a low to a high state. This high signal passes through AND gate 478 and turns on indicator light 519. If the Q-wave duration is normal, light 514 remains off. This combination of lights signifies that the Q-wave is present but has an excessive amplitude.

If the ECG. signal exceeds both the maximum Q-wave threshold level and the normal duration standards represented by sources 511 and 516, then the outputs of NAND gates 512 and 517 will go from high to low. This sets the S inputs of binary memories 513 and 518 while causing their high outputs Q to go from low to high. AND gates 477 and 478 pass these high output signals which turn on both indicating lights 514 and 519, thereby indicating excesses in both amplitude and duration.

Since the Q outputs of binary memories 513 and 518 only go high when the QRS gating pulse occurs, they remain inactive during the other functional periods of the ECG. wave, except when reset by pulse 27.

Table I suggests that all of the chosen parameters for the Q-wave functional period be evaluated during the selection of leads I, III and $V_5$. This selective feature is governed by either activating or disabling the AND gates 477 and 478 mentioned above by the presence or absence of a high control signal from OR gate 476. OR gate 476 will pass any one of three signals applied at its inputs. These are signals supplied from lead selector switch 130$b$ over conductors 137, 138 and 140 only when either lead I, lead III or lead $V_5$ is selected for evaluation, thereby enabling indicator lights 514 and 519 to become illuminated in any combination during these lead selections. When lead $V_1$ is selected for evaluation, there is an absence of a signal from switch 130$b$ or OR gate 476, thus disabling AND gates 477 and 478 and any indications from appearing on indicator lights 514 and 519. These indicator lights are also disabled during severe arrhythmia regardless of lead selection by the action of relay 626 cutting off their B+ supply as noted below.

COMBINED R- AND S-WAVE ANALYSIS NETWORK

The seventh signal discriminating network in the sequence for evaluating the ECG. signal is the combined R- and S-wave analysis network 118. A block diagram of this network is shown in FIG. 18 and the ECG. signal wave form parameters evaluated by it are listed in table I. This network employs a combination of logic elements previously described in connection with FIGS. 7, 8, 9, 10 and 11. Evaluation of the ECG. signals represented, for example, by the wave forms shown in FIGS. 23A, 23B, 23C and 23D takes place only during the QRS gating pulse period shown in FIG. 23EE. During operation, this analysis network integrates DC voltages representative of the ECG. signal and develops output signals for normal R- and S-wave duration and duration excesses in R-wave, S-wave and a combination of these. The output signals drive R- and S-wave defect indicator 119 where all parameters are read on an array of indicating lights in binary fashion when leads I, III, $V_1$ and $V_5$ are selected for evaluation.

Throughout the following discussion it is assumed that the QRS wave train has started and that the high gating pulse 40 (FIG. 23EE) as supplied from the B output of QRS gate generator 505 is present. This permits the activation of NAND gates 523, 533 and 544 in addition to NAND gates 528 and 538 which control binary memories 529 and 539. These latter devices, including binary memory 542 are reset by pulse 27 and their high outputs Q are at their low state before the QRS gating pulse 40 arrives. Furthermore, it is presumed that the integrators 524 and 534 (FIG. 10) and integrator 545 (FIG. 11) are held in their clamped, or reset, state by a high output signal from their respective NAND gates 523, 533, 544 and 546, thus signifying the absence of both the R-wave and the S-wave at this instant.

The ECG. signal from base line reset clamper 279 is applied to the input J of level detector 521 and the input K of level detector 531. An R-wave threshold positive reference voltage from source 522 is applied to input K of level detector 521 and an S-wave threshold negative reference voltage from source 532 is applied to input J of level detector 531. If the ECG. signal is low during the QRS gating period, or the duration of the R-wave, the S-wave or both is not greater than normal, then the output of level detectors 521 and 531 remains low and nothing else happens in the circuit. The high outputs Q of binary memories 529 and 539 remain low and indicator lights 530 and 540 in the R- and S-wave defect indicator 119 will not light, this indicates a normal duration for the R-wave, the S-wave and the R plus S-wave.

When the ECG. signal level exceeds the R-wave threshold level on level detector 521, its output goes from a low to a high state and this causes the output of NAND gate 523 to go from a high to a low state. The output of NAND gate 523 is applied to the input of integrator 524 (FIG. 10) and to the input of NAND gate 546 and the S input of binary memory 542. This low input applied to the S input of binary memory 542 causes its high output Q (pulse 41 shown in FIG. 23FF) to go from a low to a high state and its low output P to go from a high to a low state. The low output P is fed over conductor 543 to NAND gate 517 in the Q-wave analysis network 116 referred to above, and the S-wave triggering MV 575 in the S-wave analysis network 122 as appears below.

The low output signal from NAND gates 523 unclamps integrator 524 and starts it integrating from a 0 voltage to a positive level. Also, the output of NAND gate 523 being low causes the output of NAND gate 546 to go high. This high signal coupled with the output of the binary memory 542 through NAND gate 544 starts integrator 545 (FIG. 11) integrating from a 0 voltage to a positive level. As soon as the ECG. signal returns below the R-wave threshold level the output of NAND gate 523 goes back to a high level and resets, integrator 524 and interrupts the integration process at integrator 545. The increasing positive output voltage of integrator 524 is fed to the K input of level detector 525 where it operates against a preselected positive reference voltage from source 526 applied at the detector's J input. The integrator 524 has its gain preselected such that its output voltage rises to a level of about equal to, but not greater than, the preselected reference voltage level during a time interval of about 70 ms, this condition being representative of normal R-wave duration.

When the integrator 524 output voltage is equal to, or greater than, the reference voltage from source 526, the output of level detector 525 is driven from a high to a low state, thus causing the output of NAND gate 527 to go high and NAND gate 528 to go low. This low output signal at the output of NAND gate 528 is applied to the S input of binary memory 529, thus causing its high output Q to go high. Indicator light 530 is thereby illuminated while light 540 is out at this time thus indicating an excessive R-wave duration in the QRS wave train.

Whenever the ECG. signal level becomes more negative than the S-wave threshold at input J of level detector 531, the output of level detector 531 goes from a low to a high state. When the output of level detector 531 is high, the output of NAND gate 533 is low. The low level at the output of NAND gate 533 unclamps integrator 534 (FIG. 10) and starts it integrating from a 0 voltage to a positive level. It also causes integrator 545 (FIG. 11) to continue integrating because the output of NAND gate 533 is applied to integrator 545 through NAND gate 546. The increasing positive output voltage of integrator 534 is fed to the K input of level detector 535 where it operates against a preselected positive reference voltage from source 536 applied at the detector's J input. The integrator 534 has its gain preselected such that its output voltage rises to a level of about equal to, but not greater than, the preselected reference voltage level during a time interval of about 70 ms, this condition being representative of normal S-wave duration.

When the integrator 534 output voltage is equal to, or greater than, the reference voltage from source 536, the output of level detector 535 is driven from a high to a low state thus causing the output of NAND gate 537 to go high and NAND gate 538 to go low. This low output signal at the output of NAND gate 538 is applied to the S input of binary memory 539, thus causing its high output Q to go high. Indicator light 540 is thereby illuminated while light 530 is out at this time, thus indicating an excessive S-wave duration in the QRS wave train.

As soon as the ECG. signal becomes more positive than the S-wave threshold value at input J of level detector 531, the output of level detector 531 will go low. This will cause the output of NAND gate 533 to go high. When the output of NAND gate 533 is high, integrator 534 is clamped or reset and the integration being carried on in integrator 545 (FIG. 11) is terminated. The increasing output voltage of integrator 545 is proportional to the sum of the durations of the R- and S-waves. The increasing positive output voltage of integrator 545 is fed to the K input of level detector 547 where it operates against a preselected positive reference voltage from source 548 applied at the detector's J input. The integrator 545 has its gain preselected such that its output voltage rises to a level of about equal to, but not greater than, the preselected reference voltage level during a time interval of about 110 ms, this condition being representative of normal R- and S-wave duration.

When the integrator 545 output voltage is equal to, or greater than, the reference voltage from source 548, the output of level detector 547 is driven from a high to a low state, thus causing the output of NAND gates 527 and 528 to go high and NAND gates 528 and 538 to go low. These low output signals at the outputs of NAND gates 528 and 538 are applied to the S inputs of binary memories 529 and 539 thus causing their high outputs Q to go high. Indicator lights 530 and 540 are thereby illuminated, thus indicating an excessive F- plus S-wave duration in the QRS wave train. The output of integrator 545 will not be reset until the QRS gating pulse 40 returns to a low state and causes NAND gate 544 to supply a high pulse at its switching input terminal $V_s$. A Q-wave appearing at input K of level detector 531 will never be mistaken for an S-wave by binary memory 539 because the duration of the Q-wave would be too short to be detected by level detector 535. Also, integrator 545 will not start measuring the combined R- and S-wave duration because it is not unclamped until there has been an R-wave as determined by pulse 41 (FIG. 23FF) from the Q output binary memory 542 which activates NAND gate 544 and provides the low signal at integrator 545 switching input terminal $V_s$.

Since the Q outputs of binary memories 529, 539 and 542 only go high during the QRS gating pulse, they remain inactive during the other functional periods of the ECG. wave, except when reset by pulse 27.

Still referring to FIG. 18, it will be noted that binary memory 539 high output Q becomes high when the duration of either the S-wave or the combined R- and S-waves are determined to be excessive. This high signal from the binary memory 539 Q output is fed over conductor 541 to activate range change switch 201. This increases the RC time constant of the ST segment delay MV 200 from about 60 ms to about 100 ms as described above in the Timing Networks 103.

When a severe arrhythmia condition is present in the ECG. signal, R- and S-wave duration indicator lights 530 and 540 in defect indicator 119 are automatically disabled. This is accomplished by terminating their B+ voltage normally supplied over conductor 627 from disabling relay 626 as described below.

R-WAVE ANALYSIS NETWORK

The eighth signal discriminating network in the sequence for evaluating the ECG. signal is the R-wave analysis network 120. A block diagram of this network is shown in FIG. 19 and the ECG. signal wave form parameters evaluated by it are listed in table I. This analysis network is constructed and operated much like the S—T interval analysis network 106. It evaluates the ECG. signal only during the QRS gating pulse 40 (FIG. 23EE) and develops output signals for R-wave normal, excessive and diminished amplitude. The output signals drive R-wave indicator 121 where all parameters are read on an array of indicator lights in binary fashion when leads I, III and $V_5$ are selected for evaluation but only the excessive wave amplitude when lead $V_1$ is selected. This feature is provided by a combination of conventional AND and OR gates controlling the passage of output signals to the indicator 121 in response to a lead selection control signal.

The high QRS gating pulse 40 (FIG. 23EE) is supplied to the present analysis network as described for the Q-wave analysis network 116 above. The NAND gates 553 and 558 controlling binary memories 554 and 559 are permitted to be activated only when the QRS gating pulse 40 is high. These latter devices are reset by pulse 27 and their high outputs Q are at their low state before the QRS gating pulse 40 arrives.

The ECG. signal from the base line reset clamper 279 is applied to the J inputs of level detectors 551 and 556. A minimum normal R-wave threshold level positive reference voltage from source 552 is applied to the input K of level detectors 551. A maximum normal R-wave threshold level positive reference voltage from source 557 is applied to the input K of level detector 556.

When the ECG. signal level is near zero, the outputs of level detectors 551 and 556 are both low, therefore the outputs of NAND gates 553 and 558 are both high and binary memories 554 and 559 stay in their initial low condition. Since these low signals are inadequate to activate AND gates 563 and 564, indicator lights 555 and 560 in R-wave defect indicator 121 will not light. This condition indicates a diminished R-wave amplitude.

When the ECG. signal level exceeds the minimum R-wave threshold level, the output of level detector 551 goes from a low to a high state thus causing the output of NAND gate 553 to go from a high to a low state. This low signal is applied to the S input of binary memory 554 causing its high output Q to go from a low to a high state. Level detector 556 has stayed in its initial low state, therefore, the output of binary memory 559 is also low. Assume for the present that AND gates 563 and 564 are activated by a high signal from OR gate 562 as will be described later. Then the high signal from binary memory 554 will be passed by AND gate 563 which drives indicator light 555 to illumination. Indicator light 560 is out at this time. This combination of lights indicates a normal R-wave amplitude in the QRS wave train.

If the ECG. signal level should exceed the maximum R-wave threshold level of level detector 556, the outputs of level detectors 551 and 556 will go from a low to a high state, thus causing NAND gates 553 and 558, respectively, to go from a high to a low state. These low signals are applied to the respective S inputs of binary memories 554 and 559 which cause their high outputs Q to go from a low to a high state. Those high signals pass through AND gates 563 and 564 and turn on indicator lights 555 and 560. This combination of lights signifies that the R-wave has an excessive amplitude.

Since the Q outputs of binary memories 554 and 559 only go high when the QRS gating pulse occurs, they remain inactive during the other functional periods of the ECG. wave, except when reset by pulse 27.

Table I suggests that all of the chosen parameters for the R-wave functional period be evaluated during the selection of leads I, III and $V_5$ but only the excessive wave amplitude parameter during the selection of lead $V_1$. This selective feature is governed by either activating or disabling the AND gates 563 and 564 mentioned above by the presence or absence of a high control signal from OR gate 562. OR gate 562 will pass any one of four high signals applied at its inputs. Three of these are signals supplied from lead selector switch 130b over conductors 137, 138 and 140 when either lead I, III or lead $V_5$ is selected for evaluation, thereby enabling indicator lights 555 and 560 to become illuminated in any combination during these lead selections.

The fourth high signal applied to OR gate 562 is fed from AND gate 561 which itself requires the sum of three high input signals to become activated. Two of these input signals are provided by the high outputs at Q of binary memories 554 and 559. This occurs only when the R-wave has an excessive amplitude as noted above. The third high input signal to AND gate 561 is fed from lead selector switch 130b over conductors 139 when lead $V_1$ is selected for evaluation. This enables indicator lights 555 and 560 to become illuminated only during excessive R-wave amplitude when lead $V_1$ is selected. These indicator lights are disabled during severe arrhythmia regardless of lead selection by the action of relay 626 cutting off their B+ supply as noted below.

S-WAVE ANALYSIS NETWORK

The ninth signal discriminating network in the sequence for evaluating the ECG. signal is the S-wave analysis network 122. A block diagram of this network is shown in FIG. 20 and the ECG. signal wave form parameters evaluated by it are listed in table I. This analysis network is constructed and operated much like the R-wave analysis network 120. It evaluates the ECG. signal only during the QRS gating pulse 40 (FIG. 23EE) and develops output signals for S-wave normal, excessive and diminished amplitude. The output signals drive S-wave indicator 123 where all parameters are read on an array of indicator lights in binary fashion when lead $V_1$ is selected for evaluation but only the excessive wave amplitude when leads I, III and $V_5$ are selected. This feature is provided by a combination of conventional AND and OR gates controlling the passage of output signals to the indicator 123 in response to a lead selection control signal.

The high QRS gating pulse 40 (FIG. 23EE) is supplied to the present analysis network as described for the Q-wave analysis network 116 above. The NAND gates 567 and 572 controlling binary memories 568 and 573 are permitted to be activated only when the QRS gating pulse 40 is high. These latter devices are reset by action of the R-wave, thus making it impossible for a Q-wave to be indicated as an S-wave by them as explained hereinafter. Their high outputs Q are at their low state before the QRS gating pulse 40 arrives.

The ECG. signal from the base line reset clamper 279 is applied to the K inputs of level detectors 565 and 570. A minimum normal S-wave threshold level negative reference voltage from source 566 is applied to the input J of level detector 565. A maximum normal S-wave threshold level negative reference voltage from source 571 is applied to the input J of level detector 570.

When the ECG. signal level is near zero, the outputs of level detectors 565 and 570 are both low, therefore the outputs of NAND gates 567 and 572 are both high and binary memories 568 and 573 stay in their initial low condition. Since these low signals are inadequate to activate AND gates 594 and 595, indicator lights 569 and 574 in S-wave defect indicator 123 will not light. This condition indicates a diminished S-wave amplitude.

When the ECG. signal level exceeds the minimum S-wave threshold level, the output of level detector 565 goes from a low to a high state thus causing the output of NAND gate 567 to go from a high to a low state. This low signal is applied to the S input of binary memory 568 causing its high output Q to go from a low to a high state. Level detector 570 has stayed in its initial low state, therefore, the output of binary memory 573 is also low. Assume for the present that AND gates 594 and 595 are activated by a high signal from OR gate 593 as will be described later. Then the high signal from binary memory 568 will be passed by AND gate 594 which drives indicator light 569 to illumination. Indicator light 574 is out at this time. This combination of lights indicates a normal S-wave amplitude in the QRS wave train.

If the ECG. signal level should become more negative than the maximum S-wave threshold level of level detector 570, the outputs of level detectors 565 and 570 will go from a low to a high state, thus causing NAND gates 567 and 572, respectively, to go from a high to a low state. These low signals are applied to the respective S inputs of binary memories 568 and 573 which cause their high outputs Q to go from a low to a high state. These high signals pass through AND gates 594 and 595 and turn on indicator lights 569 and 574. This combination of lights signifies that the S-wave has an excessive negative amplitude.

Since the Q outputs of binary memories 568 and 573 only go high when the QRS gating pulse occurs, they remain inactive during the other functional periods of the ECG. wave, except when reset by either one of two reset pulses as appears below.

The NOT R-wave gating pulse 41 (FIG. 23FF) is supplied from the P output of the R-wave presence binary memory 542 in the R- and S-wave analysis network 118 over conductor 543 to the input of S-wave triggering MV 575. This is a monostable multivibrator similar in construction and operation to MMV 218, but having an RC time constant of about 10 ms, which produces pulse 42 (FIG. 23GG) when triggered by the leading edge of pulse 41. The D output from MV 575, a normally high pulse which goes low during the unstable state of operation, is coupled to NAND gate 576 along with reset pulse 27 of like polarity from MMV 213. The output of NAND gate 576 is normally low which drives NAND 577 (an inverter) to normally produce a high output signal, this being fed to the R inputs of binary memories 568 and 573. When either of the pulses 42 or 27 reverse polarity, the outputs of NAND gates 576 and 577 also reverse and apply to low signal at the R inputs of binary memories 568 and 573, thereby resetting them in response to either pulse 42 or pulse 27. This arrangement in timing of the resetting of the aforementioned binary memories makes it impossible for a Q-wave to be indicated as an S-wave.

Table I suggests that all of the chosen parameters for the S-wave functional period be evaluated during the selection of lead $V_1$ but only the excessive wave amplitude parameter during the selection of leads I, III and $V_5$. This selective feature is governed by either activating or disabling the AND gates 594 and 595 mentioned above by the presence or absence of a high control signal from OR gate 593. OR gate 593 will pass any one of two high signals applied at its inputs. One of these is a signal supplied from lead selector switch 130b over conductor 139 when lead $V_1$ is selected for evaluation, thereby enabling indicator lights 569 and 574 to become illuminated in any combination during this lead selection.

The second high signal applied to OR gate 593 is fed from AND gate 592 which itself requires the sum of three high input signals to become activated. Two of these high input signals are provided by the high outputs at Q of binary memories 568 and 573. This occurs only when the S-wave has an excessive negative amplitude as noted above. The third input signal to AND gate 592 is fed from OR gate 591 which will pass either one of three high signals supplied from lead selector switch 130b over conductors 137, 138 and 140 when either of leads I, III or lead V₅ is selected for evaluation. This enables indicator lights 569 and 574 to become illuminated only during excessive S-wave amplitude when either lead I, III or V₅ is selected. These indicator lights are disabled during severe arrhythmia regardless of lead selection by the action of relay 626 cutting off their B+ supply as noted below.

CARDIAC RATE ANALYSIS NETWORK

In FIG. 21 there is shown a block diagram of the cardiac rate analysis network 124, another signal discriminating network for evaluating the ECG. signals. Cardiac rate parameters evaluated by this network are listed in table I. Analysis network 124 employs a combination of logic elements previously described in connection with FIGS. 7 and 9. These devices evaluate a control voltage fed from amplifier 220 in cardiac rate compensator 104 (FIG. 3, 4) which represents the deviation of the time rate between successive waves in the ECG. signal from a prescribed value. This action is keyed, for example, to the R-wave or the S-wave in the wave forms shown in FIGS. 23A, 23B, 23C, 23D. More particularly, level detectors receive the control voltage and operate against reference voltages representative of clinical standards for several cardiac rates. Their outputs drive binary memories which produce binary signals for normal, high and low cardiac rate and 70 bpm at the output of the analysis network. For convenience, the first group of output signals drive cardiac rate indicator 125 where all parameters are read in binary fashion during every lead selection, the 70 bpm signal being used for switching purposes as appears below.

The present invention deals with a recurrent phenomenon which may occur over a wide range of repetition rates, from below 40 to above 140 per minute, and which can fluctuate over a substantial range during evaluation. In the apparatus of the present invention, the control voltage amplifier 220 in cardiac rate compensator 104 supplies at its output a DC control voltage whose amplitude varies proportional to cardiac rate deviation from the 60 bpm standard referred to above, and whose polarity is positive below 60 bpm and negative above this rate. The polarity of this signal is inverted by an amplifier not shown and the resulting voltage is applied to the J inputs of level detectors 578 and 586 and to the K input of level detector 582. DC reference voltages representative of different cardiac rate threshold levels are applied to the remaining input terminals of these level detectors. More particularly, a low rate positive reference voltage from source 579 is applied to input K of level detector 578; a high rate positive reference voltage from source 583 is applied to input J of level detector 582; and a 70 bpm positive reference voltage from source 587 is applied to the input K of level detector 586. Binary memories 580, 584 and 588 are all presumed to have been reset by pulse 27.

These logic circuits operate the same as previous ones under similar conditions. Therefore, when the cardiac rate as represented by the control voltage applied at the level detector inputs is between prescribed low and high cardiac rates, the high outputs Q of binary memories 580 and 584 are low. Accordingly, both indicator lights 581 and 585 are out, thus indicating a normal cardiac rate.

When the cardiac rate as represented by the control voltage at input J of level detector 578 goes below the prescribed low rate, the high output Q of binary memory 580 goes high and causes indicator light 581 to go on while light 585 remains out, thus indicating a low cardiac rate.

When the cardiac rate control voltage at input K of level detector 582 is above the prescribed high rate, the high output Q of binary memory 584 goes high and causes indicator light 585 to go on while light 581 remains out, thus indicating a high cardiac rate.

When the cardiac rate control voltage at input J of level detector 586 is equal to or less than that prescribed for 70 bpm, the high output Q of binary memory 588 goes from low to high. This high signal is fed over conductor 589 to activate the range change switch 484 and the P—R interval analysis network 114. This increases the RC time constant of the P—R normal interval delay MV 483 from about 100 ms to about 110 ms as described above.

Since the Q outputs of binary memories 580, 584 and 588 go high only when their respective detectors become activated. Once set by a signal from their detectors, they remain in this state until reset by pulse 27 every cardiac cycle.

When a severe arrhythmia condition is present in the ECG. signal, indicator lights 581 and 585 in defect indicator 125 are automatically disabled. This is accomplished by terminating their B+ voltage normally supplied over conductor 627 from disabling relay 626 as described below.

DEFECT INDICATOR LIGHTS

Figure 22:
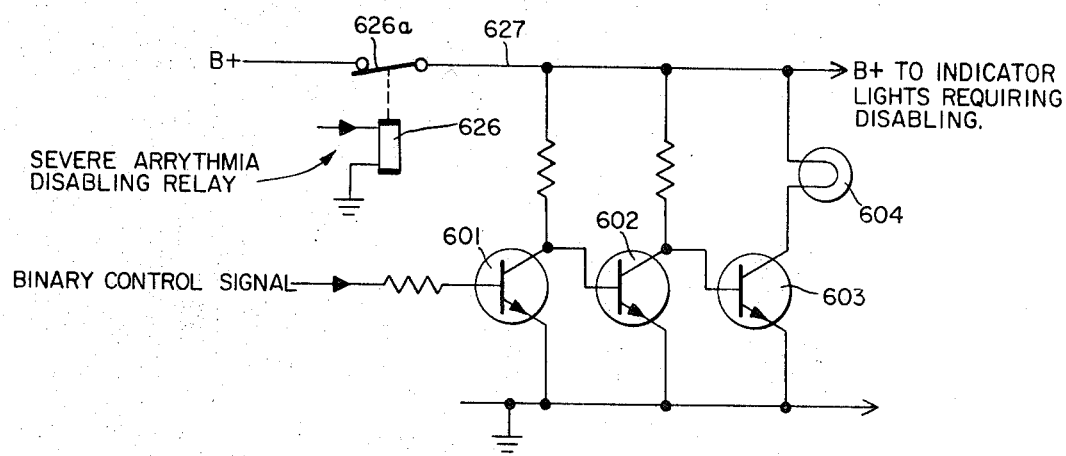
FIG. 22 shows circuitry for a typical defect indicator light.

FIG. 22 shows exemplary circuitry for a typical transistorized amplifier driven indicator light as referred to in the analysis networks above. Other well known circuit arrangements and means for indicating the evaluation parameters enumerated above may also be employed.

In the present case, a positive high binary pulse, such as is available at the Q outputs of the aforementioned binary memory devices, is applied at the base of transistor 601. This causes transistor 601 to conduct and drive transistor 602, the latter causing transistor 603 to saturate. This causes indicator light 604 to become illuminated by allowing current to flow from the B+ conductor 627 to ground. The indicator light generally remains illuminated until the binary control signal is removed from the base of transistor 601.

Many of the foregoing indicator lights are required to become disabled when a severe arrhythmia condition in the ECG. signal is encountered. Such disabling is carried out by interrupting, for example, the B+ source by action of the severe arrhythmia disabling relay contact 626a as described below. This prevents light 604 from being illuminated during this condition.

ARRHYTHMIA ANALYSIS NETWORK

Figure 24:
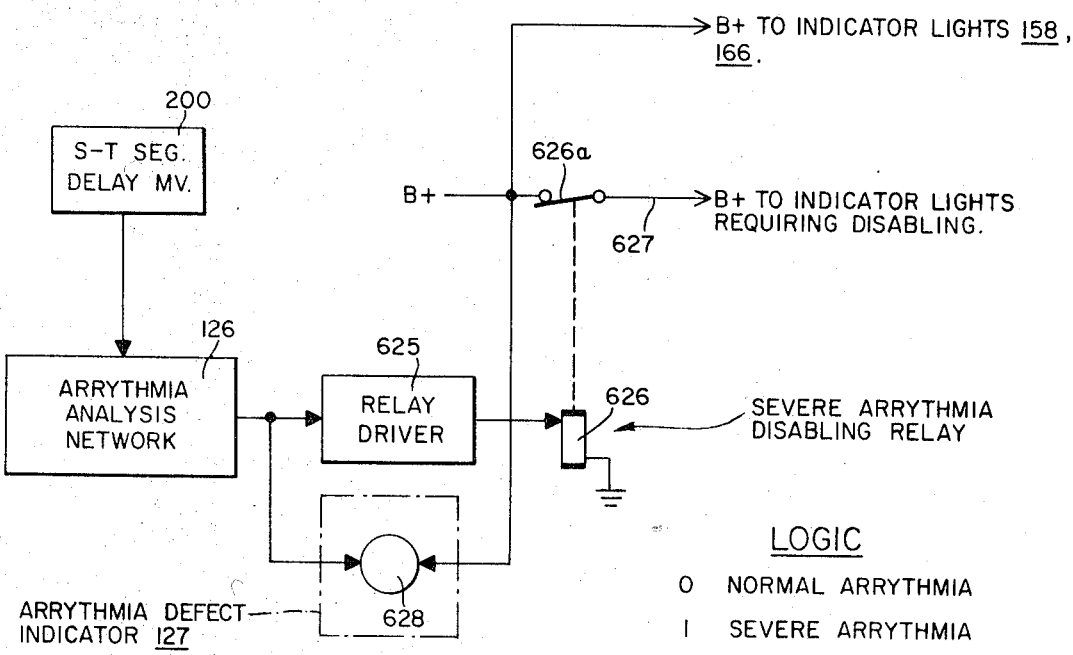
FIG. 24 shows a block diagram of arrhythmia analysis network.

Still another discriminator for evaluating the ECG. signal is shown in FIG. 24. This embodies the arrhythmia analysis network 126 for providing an indication on defect indicator 127 and a disabling signal when a severe arrhythmia condition is encountered in the ECG. signal.

As has been previously mentioned, the cardiac rate of recurrency varies over a wide range. In addition, a patient may experience substantial changes in cardiac rate from cycle to cycle as well as over a period involving a number of cycles. This condition is known as arrhythmia, and in the apparatus of the present invention reference is conveniently made to the changing rate of occurrence of the R-wave or S-wave as appears immediately below.

A triggering pulse 18 (or 19) as shown in FIG. 23N is supplied from the B (or D) output of the S—T segment delay MV 200 in the timing networks 103, the initiation of which is keyed to the R-wave or the S-wave as explained therein. The leading edge of this pulse is employed to trigger an unidentified conventional arrhythmia detector in arrhythmia analysis network 126. The operation of this detector is adjusted to produce a high binary output signal when a clinical standard severe arrhythmia condition is encountered in the recurrence of the triggering signal. The binary output signal is fed to both a transistorized relay driver 625 which is coupled to severe arrhythmia disabling relay 626 and defect indicator light 628 (FIG. 22). Relay 626 is energized responsive to a severe arrhythmia condition in the cardiac rate. This opens normally closed relay contacts 626a to interrupt the B+ source fed to many of the indicator lights as previously mentioned. Indicator light 628 is also caused to become illuminated by the same signal. The uninterrupted B+ source is fed to indicator lights 158 and 166 in the R- and S-wave presence indicator 147, and light 628 in this arrhythmia defect indicator 127.

The present invention has been described with a certain particularity for illustrative purposes. It shall be understood that departures therefrom may be made by persons skilled in the art but the scope of this invention is limited only to the extent defined in the appended claim.

I claim:

1. The method of evaluating electrocardiac signals comprising:

detecting electrocardiac signals comprising cycles of successive functional periods variable in both recurrency and wave form characteristics, one of said variable periods including a QRS wave train having at least one peak;

determining S-wave duration;

generating a triggering signal responsive to the substantially unfiltered detected electrocardiac signal in substantial uniform time phase relation with the R-wave peak and after a delay of S-wave duration;

generating gating pulses in dependency on the triggering signal, each of the gating pulses having a duration and time phase range for selecting a prescribed functional period of the detected signal;

electrically measuring the detected electrocardiac signal during each gating pulse to evaluate at least one predetermined characteristic of the related functional period; and generating a distinctive output signal when said measurement deviates from limits prescribed for each functional period.

2. The method of evaluating electrocardiac signals comprising:

detecting electrocardiac signals comprising cycles of successive functional periods variable in both recurrency and wave form characteristics, one of said variable periods including a QRS wave train having at least one peak;

generating a triggering signal responsive to the substantially unfiltered detected electrocardiac signal in substantial uniform time phase relation with the S-wave peak when the R-wave is defective;

generating gating pulses in dependency on the triggering signal, each of the gating pulses having a duration and time phase range for selecting a prescribed functional period of the detected signal;

electrically measuring the detected electrocardiac signal during each gating pulse to evaluate at least one predetermined characteristic of the related functional period; and generating a distinctive output signal when said measurement deviates from limits prescribed for each functional period.

3. The method of evaluating electrocardiac signals comprising:

detecting electrocardiac signals comprising cycles of successive functional periods variable in both recurrency and wave form characteristics, one of said variable periods including a QRS wave train having at least one peak;

generating a triggering signal responsive to the substantially unfiltered detected electrocardiac signal in substantial uniform time phase relation with the wave peak of a cycle of the detected signal;

generating gating pulses in dependency on the triggering signal, each of the gating pulses having a duration and time phase range for selecting a prescribed functional period of the detected signal;

sensing cardiac rate;

varying the duration of a plurality of the gating pulses inversely with cardiac rate, at least one of said gating pulses being varied independently of another of said gating pulses;

electrically measuring the detected electrocardiac signal during each gating pulse to evaluate at least one predetermined characteristic of the related functional period; and generating a distinctive output signal when said measurement deviates from limits prescribed for each functional period.

4. The method of evaluating electrocardiac signal comprising:

detecting electrocardiac signals comprising cycles of successive functional periods variable in both recurrency and wave form characteristics, one of said variable periods including a QRS wave train having at least one peak;

generating a triggering signal responsive to the substantially unfiltered detected electrocardiac signal in substantial uniform time phase relation with the wave peak of a cycle of the detected signal;

generating gating pulses in dependency on the triggering signal, each of the gating pulses having a duration and time phase range for selecting a prescribed functional period of the detected signal;

sensing cardiac rate;

contracting the time delay after the triggering signal at which at least one gating pulse is initiated with an increase in cardiac rate;

electrically measuring the detected electrocardiac signal during each gating pulse to evaluate at least one predetermined characteristic of the related functional period; and generating a distinctive output signal when said measurement deviates from limits prescribed for each functional period.

5. The method of evaluating electrocardiac signals comprising:

detecting electrocardiac signals comprising cycles of successive functional periods variable in both recurrency and wave form characteristics, one of said variable periods including a QRS wave train having at least one peak;

generating a triggering signal responsive to the substantially unfiltered detected electrocardiac signal in substantial uniform time phase relation with the wave peak of a cycle of the detected signal;

generating gating pulses in dependency on the triggering signal, each of the gating pulses having a duration and time phase range for selecting a prescribed functional period of the detected signal;

electrically measuring the detected electrocardiac signal during each gating pulse to evaluate at least one predetermined characteristic of the related functional period;

sensing cardiac rate;

varying an evaluation limit for at least one functional period responsively to change in cardiac rate; and generating a distinctive output signal when said measurement deviates from limits prescribed for each functional period.

6. The method of evaluating electrocardiac signals comprising:

detecting electrocardiac signals comprising cycles of successive functional periods variable in both recurrency and wave form characteristics, one of said variable periods including a QRS wave train having at least one peak;

generating a triggering signal in substantial uniform time phase relation with said wave peak;

generating gating pulses in dependency on the triggering signal, each pulse having a duration and time phase range for selecting a prescribed functional period of the detected signal;

clamping the detected signal to a base line reference voltage in dependency on the triggering signal for a predetermined duration;

electrically measuring the detected electrocardiac signal after said clamping and during each gating pulse to evaluate at least one predetermined characteristic of the related functional period with respect to said reference voltage; and generating a distinctive output signal when said measurement deviates from limits prescribed for each functional period.

7. The method of evaluating electrocardiac signals during a cardiac functional period comprising:

detecting electrocardiac signals comprising cycles of successive functional periods variable in both recurrency and wave form characteristics, one of said variable functional periods being normally active and including a QRS wave train having at least one peak, another of said variable functional periods being normally quiescent;

generating a triggering signal responsive to the substantially unfiltered detected signal in substantial uniform time phase relation with said wave peak;

generating a gating pulse in dependency on the triggering signal, said pulse having a duration and time phase range for selecting a sequence of normally active functional periods adjacent a substantially quiescent period related to a cycle of the detected signal;

electrically measuring the detected electrocardiac signal during said gating pulse to evaluate at least one predetermined characteristic of the sequence of active functional periods; and generating a distinctive output when said measurement deviates from limits prescribed for said sequence of active functional period.

8. The method of evaluating the S—T segment of electrocardiac signals comprising:

detecting electrocardiac signals comprising cycles of successive functional periods variable in recurrency and wave form characteristics each cycle including in sequence a QRS wave train interval having at least one wave peak and an S—T segment;

generating in response to the substantially unfiltered detected signal a triggering signal in substantial uniform time phase relation with the peak in the QRS wave train;

generating a gating pulse in dependency on the triggering signal, said pulse having a prescribed duration and time phase range for selecting that portion of a cycle within the S—T segment of the detected signal;

sensing the duration of at least a portion of the QRS interval;

expanding the time delay after the triggering signal at which the gating pulse is initiated with an excess in duration of at least a portion of the QRS interval;

electrically measuring the detected electrocardiac signal during said gating pulse to evaluate the S—T segment for characteristics comprising normal, elevated and depressed wave amplitude; and generating a distinctive output signal when said measurement deviates from limits prescribed for said S—T interval.

9. The method of evaluating the P—R interval of electrocardiac signals comprising:

detecting electrocardiac signals comprising cycles of successive functional periods variable in recurrency and wave form characteristics, each cycle including in sequence a QRS wave train interval having at least one wave peak, and S—T segment and T-wave, T—P, P-wave and P—R intervals;

generating a triggering signal in substantial uniform time phase relation with said peak in the QRS wave train;

generating a gating pulse in dependency on the triggering signal, said pulse having a prescribed duration and time phase range for selecting that portion of a cycle lying within the P—R interval of the detected signal;

electrically measuring the detected electrocardiac signal during said gating pulse to evaluate the P—R interval for characteristics comprising normal, excessive and diminished interval duration;

sensing cardiac rate;

expanding the evaluation limit for the P—R interval duration with a decrease in cardiac rate only in a range below a predetermined cardiac rate; and generating a distinctive output signal when said measurement deviates from limits prescribed for said P—R interval.

10. The method of evaluating the QRS wave train interval of electrocardiac signal comprising:

detecting electrocardiac signals comprising cycles of successive functional periods variable in recurrency and wave form characteristics, each cycle including in sequence a QRS wave train interval having at least one wave peak;

generating a triggering signal responsive to the substantially unfiltered detected signal in substantial uniform time phase relation with said peak in the QRS wave train;

generating a gating pulse in dependency on the triggering signal, said pulse having a prescribed duration and time phase range for selecting that portion of a cycle including the QRS wave train interval of the detected signal;

electrically measuring the detected electrocardiac signal during said gating pulse to evaluate at least a portion of the QRS wave train interval for characteristics comprising normal, excessive and diminished wave duration, and a combination of these; and generating a distinctive output signal when said measurement deviates from limits prescribed for said QRS wave train interval.

11. The method of evaluating cardiac rate of recurrency in electrocardiac signals comprising:

detecting electrocardiac signals including cyclic QRS wave trains variable in recurrency and having at least one wave peak in each cycle;

generating a first pulse having a prescribed duration, said first pulse being generated responsively to said wave peak, the ending of said pulse varying respective a subsequent wave peak and being coincident therewith only at a preselected cardiac rate;

electrically measuring the difference between the ending of said pulse and said subsequent wave peak to evaluate their time difference; and generating a distinctive output signal if said measurement deviates from said preselected cardiac rate.

12. The method of evaluating electrocardiac signals comprising:

detecting electrocardiac signals comprising cycles of successive functional periods variable in both recurrency and wave form characteristics, one of said variable periods including a QRS wave train having at least one peak;

generating a triggering signal in substantial uniform time phase relation with said wave peak;

generating gating pulses in dependency on the triggering signal, each pulse having a duration and time phase range for selecting prescribed functional periods of the detected signal;

electrically measuring the detected electrocardiac signal during each gating pulse to evaluate at least one predetermined characteristic of the related functional period; and generating a distinctive output signal when said measurement deviates from limits prescribed for each functional period;

disabling the generation of the output signal when variations in signal recurrency exceeds a preselected value of arrhythmia.

13. The method of evaluating cardiac arrhythmia in electrocardiac signals comprising:

detecting electrocardiac signal including a cyclic QRS wave train variable in rhythm and having at least one wave peak in each cycle;

summing two separate but complimentary voltages whose source polarities are alternated each cycle in substantial uniform time phase relation with the wave peak;

electrically measuring the two summed voltages simultaneously once during each cycle to evaluate their magnitude at alternate and intervening cycles; and generating a distinctive output signal when said measurement deviates from preselected limits.

14. Apparatus for evaluating electrocardiac signals comprising:

detecting means for detecting electrocardiac signals comprising a cyclic sequence of functional periods variable in both recurrence and wave form characteristics, one of said functional periods being normally active and including a QRS wave train having at least one peak, another of said functional periods being normally quiescent;

substantially frequency insensitive triggering means receiving the detected signal for generating a triggering signal in substantial uniform time phase range with said wave peak;

timing network means for generating gating pulses in dependency on the triggering signal, each pulse having a predetermined duration and time phase range for selecting a prescribed functional period of the detected signal;

analysis network means receiving the substantially unfiltered detected signal and operating in dependency on the gating pulses for electrically evaluating at least one predetermined characteristic of the detected signal only during said related functional period;

means operative in dependency on the analysis network means for generating a distinctive output signal when the evaluated electrocardiac signal deviates from medically significant limits prescribed for each functional period; and a clamping network receiving the detected electrocardiac signal and operating in dependency on the triggering signal for momentarily restoring the base line of the electrocardiac signal to a reference potential.

15. Apparatus according to claim 14 wherein the timing network means includes means for generating at least one gating pulse having a predetermined duration and time phase range for selecting a normally active functional period adjacent at least one substantially quiescent functional period within a cycle of the detected signal.

16. Apparatus according to claim 14 wherein the timing network means includes means for generating at least one gating pulse having a predetermined duration and time phase range for selecting a sequence of normally active functional periods adjacent a substantially quiescent functional period related to a cycle of the detected signal.

17. Apparatus according to claim 14 wherein the analysis network means constitutes an electrocardiac signal discriminating network having wave amplitude evaluation circuitry.

18. Apparatus according to claim 14 wherein the analysis network means constitutes an electrocardiac signal discriminating network having wave duration evaluation circuitry.

19. Apparatus according to claim 14 wherein the analysis network means constitutes an electrocardiac signal discriminating network having wave polarity evaluation circuitry.

20. Apparatus according to claim 14 wherein the analysis network means constitutes an electrocardiac signal discriminating network having circuitry for evaluating wave amplitude, duration, polarity and a combination thereof.

21. Apparatus according to claim 14 wherein the analysis network means constitutes an electrocardiac signal discriminating network comprising reference voltage means, level detecting means receiving the detected signal and operating with respect to said reference voltage means for evaluating at least one predetermined characteristic of the detected signal and producing a corresponding evaluation signal, a utilization device, and gating means operative in dependency on said gating pulse for controlling the passage of said evaluation signal to said utilization device.

22. Apparatus according to claim 14 wherein the analysis network means constitutes an electrocardiac signal discriminating network comprising reference voltage means, level detecting means receiving the detected signal and operating with respect to said reference voltage means for evaluating at least one predetermined characteristic of said detected signal to produce a corresponding evaluation signal, a utilization device, gating means operative in dependency on said gating pulse for controlling the passage of said evaluation signal to said utilization device, and memory means for storing the gated evaluation signal, said memory means being reset in dependency on said triggering signal.

23. Apparatus according to claim 14 wherein the analysis network means constitutes an electrocardiac signal discriminating network comprising reference voltage means, level detecting means receiving the detected signal and operating with respect to said reference voltage means for evaluating at least one predetermined characteristic of the detected signal and producing a corresponding evaluation signal, means operative in dependency on at least one evaluation signal for detecting the duration of at least one related functional period and generating an output signal when the duration exceeds a predetermined value of medical significance, a utilization device, and gating means operative in dependency on said gating pulse for controlling the passage of said output signal to said utilization device.

24. Apparatus according to claim 23 wherein the duration detecting means includes integrating circuitry responsive to said evaluation signal.

25. Apparatus according to claim 23 wherein the duration detecting means includes monostable multivibrator circuitry operative in dependency on said evaluation signal.

26. Apparatus for evaluating electrocardiac signals comprising:

detecting means for detecting electrocardiac signals comprising a cyclic sequence of functional periods variable in both recurrence and wave form characteristics, one of said functional periods being normally active and including a QRS wave train having at least one peak, another of said functional periods being normally quiescent;

substantially frequency insensitive triggering means receiving the detected signal for generating a triggering signal in substantial uniform time phase range with said wave peak, said triggering means including R-wave detecting means, S-wave detecting means, and a trigger operative in dependency on one of said wave detection means for generating said triggering signal;

timing network means for generating gating pulses in dependency on the triggering signal, each pulse having a predetermined duration and time phase range for selecting a prescribed functional period of the detected signal;

analysis network means receiving the substantially unfiltered detected signal and operating in dependency on the gating pulses for electrically evaluating at least one predetermined characteristic of the detected signal only during said related functional period; and means operative in dependency on the analysis network means for generating a distinctive output signal when the evaluated electrocardiac signal deviates from medically significant limits prescribed for each functional period.

27. Apparatus for evaluating electrocardiac signals comprising:

detecting means for detecting electrocardiac signals comprising a cyclic sequence of functional periods variable in both recurrence and wave form characteristics, one of said functional periods being normally active and including a QRS wave train having at least one peak, another of said functional periods being normally quiescent;

substantially frequency insensitive triggering means receiving the detected signal for generating a triggering signal in substantial uniform time phase range with said wave peak, said triggering means including R-wave detecting means, S-wave detecting means, and a trigger responsive to the S-wave detecting means when said R-wave is undesirable for generating said triggering signal;

timing network means for generating gating pulses in dependency on the triggering signal, each pulse having a predetermined duration and time phase range for selecting a prescribed functional period of the detected signal;

analysis network means receiving the substantially unfiltered detected signal and operating in dependency on the gating pulses for electrically evaluating at least one predetermined characteristic of the detected signal only during said related functional period; and means operative in dependency on the analysis network means for generating a distinctive output signal when the evaluated electrocardiac signal deviates from medically significant limits prescribed for each functional period.

28. Apparatus according to claim 27 including means for sensing cardiac rate wherein the timing network means includes compensating means for varying the time phase range of at least one gating pulse inversely with cardiac rate.

29. Apparatus according to claim 27 including means for sensing cardiac rate wherein the timing network means includes compensating means for contracting at least one gating pulse with increase in cardiac rate only in a range above a preselected cardiac rate.

30. Apparatus according to claim 27 including means for sensing cardiac rate wherein the timing network means includes compensating means for varying the selection of one functional period in proportion to variations in duration of at least a portion of another functional period of the detected signal.

31. Apparatus according to claim 27 wherein the timing network means includes means for generating at least one gating pulse having a predetermined duration and time phase range for selecting a normally substantially quiescent functional period adjacent at least one active functional period within a cycle of the detected signal.

32. Apparatus for evaluating electrocardiac signals comprising:
  detecting means for detecting electrocardiac signals comprising a cyclic sequence of functional periods variable in both recurrence and wave form characteristics, one of said functional periods being normally active and including a QRS wave train having at least one peak, another of said functional periods being normally quiescent;
  substantially frequency insensitive triggering means receiving the detected signal for generating a triggering signal in substantially uniform time phase range with said wave peak;
  means for sensing cardiac rate;
  timing network means for generating gating pulses in dependency on the triggering signal, each pulse having a predetermined duration and time phase range for selecting a prescribed functional period of the detected signal, said timing means including compensating means for varying the duration of a plurality of gating pulses inversely with cardiac rate, one of said pulses being varied independently of the other of said pulses;
  analysis network means receiving the substantially unfiltered detected signal and operating in dependency on the gating pulses for electrically evaluating at least one predetermined characteristic of the detected signal only during said related functional period; and
  means operative in dependency on the analysis network means for generating a distinctive output signal when the evaluated electrocardiac signal deviates from medically significant limits prescribed for each functional period.

33. Apparatus for evaluating the ST segment of electrocardiac signals during a cardiac functional period comprising:
  detecting means for detecting electrocardiac signals comprising a cyclic sequence of functional periods variable in both recurrence and wave form characteristics, each cycle including in sequence a QRS wave train interval having at least one peak and an ST segment;
  substantially frequency insensitive triggering means receiving the detected signal for generating a triggering signal in substantial uniform time phase range with said peak in the QRS wave train;
  timing network means for generating a gating pulse in dependency on the triggering signal, said pulse having a prescribed duration and time phase range for selecting that portion of a cycle within the ST segment of the detected signal;
  analysis network means receiving the detected signal and operating in dependency on said gating pulse for electrically evaluating the ST segment for characteristics comprising normal, elevated and depressed wave amplitude; and
  means operative in dependency on the analysis network means for generating distinctive output signals when the evaluated electrocardiac signal deviates from medically significant limits prescribed for each wave characteristic evaluated during the ST segment.

34. Apparatus according to claim 33 further including means in the timing network means for expanding the time delay after the triggering signal at which the ST segment gating pulse is initiated responsive to an excess in duration of at least a portion of the QRS wave train.

35. Apparatus for evaluating the T-wave interval of electrocardiac signals during a cardiac functional period comprising:
  detecting means for detecting signals comprising a cyclic sequence of functional periods variable in both recurrence and wave form characteristics, each cycle including in sequence a QRS wave train interval having at least one peak, an ST segment and T-wave, TP, P-wave and PR intervals;
  triggering means receiving the detected signal for generating a triggering signal in substantial uniform time phase range with said peak in the QRS train;
  timing network means for generating a gating pulse in dependency on the triggering signal, said pulse having a prescribed duration and time phase range for selecting that portion of a cycle comprising at least the T-wave portion of the detected signal;
  analysis network means receiving the detected signal and operating in dependency on said gating pulse for electrically evaluating the T-wave interval for characteristics comprising absent wave, normal, excessive and diminished wave amplitude, and negative wave polarity; and
  means operative in dependency on the analysis network means for generating distinctive output signals when the evaluated electrocardiac signal deviates from medically significant limits prescribed for each wave characteristic evaluated during the T-wave interval.

36. Apparatus for evaluating the TP interval of electrocardiac signals during a cardiac functional period comprising:
  detecting means for detecting electrocardiac signals comprising a cyclic sequence of functional periods variable in both recurrence and wave form characteristics, each cycle including in sequence a QRS wave train interval having at least one peak, an ST segment and T-wave, TP, P-wave and PR intervals;
  triggering means receiving the detected signal for generating a triggering signal in substantial uniform time phase range with said peak in the QRS wave train;
  timing network means for generating a gating pulse in dependency on the triggering signal, said pulse having a prescribed duration and time phase range for selecting that portion of a cycle within the TP interval of the detected signal;
  analysis network means receiving the detected signal and operating in dependency on said gating pulse for electrically evaluating the TP interval for characteristics comprising normal amplitude, and excesses in negative wave polarity, positive wave polarity, and positive and negative wave polarity; and
  means operative in dependency on the analysis network means for generating distinctive output signals when the evaluated electrocardiac signal deviates from medically significant limits prescribed for each wave characteristic evaluated during the TP interval.

37. Apparatus for evaluating the P-wave interval of electrocardiac signals during a cardiac functional period comprising:
  detecting means for detecting electrocardiac signals comprising a cyclic sequence of functional periods variable in both recurrence and wave form characteristics, each cycle including in sequence a QRS wave train interval having at least one peak, an ST segment and T-wave, TP, P-wave and PR intervals;

triggering means receiving the detected signal for generating a triggering signal in substantial uniform time phase range with said peak in the QRS wave train;

timing network means for generating a gating pulse in dependency on the triggering signal, said pulse having a prescribed duration and time phase range for selecting that portion of a cycle comprising the P-wave interval of the detected signal;

analysis network means receiving the detected signal and operating in dependency on said gating pulse for electrically evaluating the P-wave interval for characteristics comprising absent wave, normal and excessive wave amplitude, and negative wave polarity; and means operative in dependency on the analysis network means for generating distinctive output signals when the evaluated electrocardiac signal deviates from medically significant limits prescribed for each wave characteristic evaluated during the P-wave interval.

38. Apparatus for evaluating the PR interval of electrocardiac signals during a cardiac functional period comprising:

detecting means for detecting electrocardiac signals comprising a cyclic sequence of functional periods variable in both recurrence and wave form characteristics, each cycle including in sequence a QRS wave train interval having at least one peak, an ST segment and T-wave, TP, P-wave and PR intervals;

triggering means receiving the detected signal for generating a triggering signal in substantial uniform time phase range with said peak in the QRS wave train;

timing network means for generating a gating pulse in dependency on the triggering signal, said pulse having a prescribed duration and time phase range for selecting that portion of a cycle lying within the PR interval of the detected signal;

analysis network means receiving the detected signal and operating in dependency on said gating pulse for electrically evaluating the PR interval for characteristics comprising normal, excessive and diminished wave duration; and means operative in dependency on the analysis network means for generating distinctive output signals when the evaluated electrocardiac signal deviates from medically significant limits prescribed for each wave characteristic evaluated during the PR interval.

39. Apparatus according to claim 38 further including means for sensing cardiac rate and means in the analysis network means for expanding the evaluation limit for the PR interval duration responsive to a decrease in cardiac rate only in a range below a prescribed cardiac rate.

40. Apparatus for evaluating the QRS wave train interval of electrocardiac signals during a cardiac functional period comprising:

detecting means for detecting electrocardiac signals comprising a cyclic sequence of functional periods variable in both recurrence and wave form characteristics, each cycle including in sequence a QRS wave train interval having at least one peak, an ST segment and T-wave, TP, P-wave and PR intervals;

triggering means receiving the detected signal for generating a triggering signal in substantial uniform time phase range with said peak in the QRS wave train;

timing network means for generating a gating pulse in dependency on the triggering signal, said pulse having a prescribed duration and time phase range for selecting that portion of a cycle including the QRS wave train interval of the detected signal;

analysis network means receiving the detected signal and operating in dependency on said gating pulse for electrically evaluating the QRS wave train interval for characteristics comprising normal, excessive and diminished wave amplitude, and normal, excessive and diminished wave duration, and a combination of these; and means operative in dependency on the analysis network means for generating distinctive output signals when the evaluated electrocardiac signal deviates from medically significant limits prescribed for each wave characteristic evaluated during the QRS wave train interval.

41. Apparatus for evaluating electrocardiac signals comprising:

detecting means for simultaneously detecting electrocardiac signals from two sources on a patient, each of said sources comprising a cyclic sequence of functional periods variable both in recurrence and wave form characteristics, one of said variable periods including a QRS wave train having at least one peak, the R-wave peak being better defined in the first source than in the second source;

triggering means receiving the detected signal for generating a triggering signal in substantial uniform time phase range with the R-wave peak in the first source;

timing network means for generating gating pulses in dependency on the triggering signal, each pulse having a predetermined duration and time phase range for selecting a prescribed functional period of the second source detected signal;

analysis network means receiving the second source detected signal and operating in dependency on the gating pulses for electrically evaluating at least one predetermined characteristic of the second source detected signal only during said related functional period; and means operative in dependency on the analysis network means for generating a distinctive output signal when the evaluated electrocardiac signal deviates from medically significant limits prescribed for each functional period.

42. Apparatus for evaluating cardiac rate of recurrence in electrocardiac signals comprising:

detecting means for detecting electrocardiac signals including cyclic QRS wave trains variable in recurrency and having at least one wave peak in each cycle;

first and second means for generating first and second pulses respectively, each having a prescribed duration, the first pulse means being keyed by said wave peak and the second pulse means keyed by the termination of the first pulse, the ending of the second pulse varying respective a subsequent wave peak and being coincident therewith only at a preselected cardiac rate;

means for generating a variable signal corresponding to the time difference and phase relation between the ending of the second pulse and said subsequent wave peak, thereby producing a variable signal representative of cardiac rate deviation from said preselected rate;

analysis network means receiving the rate variable signal for electrically evaluating at least one predetermined characteristic of said signal; and means operative in dependency on the analysis network means for generating a distinctive output signal when the evaluated cardiac rate signal deviates from prescribed limits.

43. Apparatus for evaluating electrocardiac signals comprising:

detecting means for detecting electrocardiac signals comprising a cyclic sequence of functional periods variable in both recurrence and wave form characteristics, one of said functional periods including a QRS wave train having at least one peak;

substantially frequency insensitive triggering means receiving the detected signal for generating a triggering signal in substantial uniform time phase range with said wave peak;

means operative in dependency on said triggering signal for detecting arrhythmia in the electrocardiac signal and producing a corresponding output signal;

timing network means for generating gating pulses in dependency on the triggering signal, each pulse having a predetermined duration and time phase range for selecting a prescribed functional period of the detected signal;

analysis network means receiving the detected signal and operating in dependency on the gating pulses for electrically evaluating at least one predetermined characteristic of the detected signal only during said related functional period; and means operative in dependency on the analysis network means for generating a distinctive output signal when the evaluated electrocardiac signal deviates from medically significant limits prescribed for each functional period; said means being disabled responsive to the arrhythmia detector signal when said signal exceeds a predetermined value.

UNITED STATES PATENT OFFICE
CERTIFICATE OF CORRECTION

Patent No. 3,554,187            Dated January 12, 1971

Inventor(s) Harvey F. Glassner et al.

It is certified that error appears in the above-identified paten and that said Letters Patent are hereby corrected as shown below:

Col. 3, line 26, delete "configurations" and insert --configurati
Col. 3, line 32, delete "and" and insert --an--;
Col. 3, line 64, delete "to", first occurrence;
Col. 4, line 23, after "to", second occurrence, insert --momel
Col. 8, line 28, delete "wave forms" and insert --waveforms--
Col. 8, line 40, delete "latters" and insert --latter's--;
Col. 9, line 48, after "R-wave", but before the comma (,), ins
--or the S-wave--;
Col. 9, line 55, "suitable" should be --suitably--;
Col. 10, line 44, "or" should be added before --R--;
Col. 12, line 1, delete "wave form" and insert --waveform--;
Col. 12, line 30, "network" should be added after "ysis";
Col. 12, line 65, after "T-wave" insert --delay--;
Col. 14, line 45, after "delay" insert --MV--;
Col. 15, line 75, delete "200" and insert --220--;
Col. 16, line 58, after "electrode" insert --connected--;
Col. 17, line 45, delete "depress" and insert --depresses--;
Col. 17, line 70, delete "wave forms" and insert --waveforms-
Col. 18, line 9, delete "wave form" and insert --waveform--;
Col. 18, line 5, delete "levels" and insert --level--;
Col. 18, line 48, delete "217" and insert --317--;
Col. 18, line 69, delete "latters" and insert --latter's--;
Col. 19, line 26, delete "cutoff" and insert --cut off--;
Col. 19, line 28, delete "cutoff" and insert --cut off--;
Col. 19, line 26, delete "324" and insert --314--;
Col. 19, line 27, delete "326" and insert --316--;
Col. 20, line 5, "wave form" should be --waveform--;
Col. 20, line 52, delete "cutoff" and insert --cut off--;

UNITED STATES PATENT OFFICE
CERTIFICATE OF CORRECTION

Patent No. 3,554,187          Dated January 12, 1971

Inventor(s) Harvey F. Glassner et al.

It is certified that error appears in the above-identified patent and that said Letters Patent are hereby corrected as shown below:

Page 2

Col. 20, line 69, delete "suitable" and insert --suitably--;
Col. 21, line 41, delete "in", second occurrence, and insert --is--
Col. 21, line 50, delete "cu-";
Col. 21, line 51, delete "toff" and insert --cut off--;
Col. 21, line 66, delete "wave forms" and insert --waveforms--;
Col. 22, line 51, after "drive", delete "an" and insert --and--;
Col. 22, line 60, after "period", delete "of";
Col. 22, line 73, delete "wave form" and insert --waveform--;
Col. 23, line 24, delete "directed" and insert --described--;
Col. 23, line 31, delete "wave form" and insert --waveform--;
Col. 23, line 47, insert "timing" before the word "shifts";
Col. 23, line 55, insert "high" before the word "outputs";
Col. 25, line 53, delete "wave form" and insert --waveform--;
Col. 25, line 61, delete "or" and insert --of--;
Col. 25, line 62, delete "or" and insert --of--;
Col. 26, line 30, delete "then" and insert --than--;
Col. 26, line 69, delete "wave form" and insert --waveform--;
Col. 27, line 36, after "is", delete "not" and insert --no--;
Col. 27, line 49, delete "respective" and insert --respectively--;
Col. 27, line 49, delete "its" and insert --it--;
Col. 27, line 55, before "reference" insert --level--;
Col. 27, line 69, after "462" insert --to go low and apply a low va signal to the S input of binary memory 466--;
Col. 27, line 70, delete "to", second occurrence, and insert --go
Col. 28, line 2, delete "Q" and insert --P--;
Col. 29, line 12, delete "later" and insert --latter--;
Col. 29, line 57, after "gate", first occurrence, insert --500--;

UNITED STATES PATENT OFFICE
CERTIFICATE OF CORRECTION

Patent No. 3,554,187          Dated January 12, 1971

Inventor(s) Harvey F. Glassner et al.

It is certified that error appears in the above-identified patent and that said Letters Patent are hereby corrected as shown below:

Page 3

Col. 26, line 21, delete "effect" and insert --affect--;
Col. 31, line 6, delete "to" and insert --or--;
Col. 32, line 39, delete "a" and insert --an--;
Col. 32, line 74, after "K" insert --of--;
Col. 33, line 52, after "130b", delete "or" and insert --at--;
Col. 33, line 64, delete "wave form" and insert --waveform--;
Col. 33, line 68, delete "wave forms" and insert --waveforms--;
Col. 35, line 56, "F" should be deleted and --R-- inserted;
Col. 36, line 18, delete "wave form" and insert --waveform--;
Col. 38, line 51, delete "to" and insert --a--;
Col. 39, line 21, delete "wave forms" and insert --waveforms--;
Col. 40, line 6, delete "Since the" and insert --The--;
Col. 41, line 5, delete "claim" and insert --claims--;
Col. 41, line 6, delete "I" and insert --We--;
Col. 41, line 11, delete "wave form" and insert --waveform--;
Col. 41, line 32, delete "wave form" and insert --waveform--;
Col. 41, line 53, delete "wave form" and insert --waveform--;
Col. 42, line 3, delete "wave form" and insert --waveform--;
Col. 42, line 28, delete "wave form" and insert --waveform--;
Col. 42, line 52, delete "wave form" and insert --waveform--;
Col. 42, line 75, delete "wave form" and insert --waveform--;
Col. 43, line 16, after "output" insert --signal--;
Col. 43, line 24, delete "wave form" and insert --waveform--;
Col. 43, line 51, delete "wave form" and insert --waveform--;
Col. 43, line 53, delete "and", first occurrence, and insert --an
Col. 44, line 1, delete "wave form" and insert --waveform--;
Col. 44, line 39, delete "wave form" and insert --waveform--;
Col. 44, line 74, delete "wave form" and insert --waveform--;

UNITED STATES PATENT OFFICE
CERTIFICATE OF CORRECTION

Patent No. 3,554,187          Dated January 12, 1971

Inventor(s) Harvey F. Glassner et al.

It is certified that error appears in the above-identified patent and that said Letters Patent are hereby corrected as shown below:

Page 4

Col. 46, line 26, delete "wave form" and insert --waveform--;
    Col. 46, line 55, delete "wave form" and insert --waveform--;
    Col. 47, line 31, delete "wave form" and insert --waveform--;
    Col. 47, line 62, delete "wave form" and insert --waveform--;
    Col. 48, line 17, after "detecting", second occurrence, insert --electrocardiac--;
    Col. 48, line 19, delete "wave form" and insert --waveform--;
    Col. 48, line 26, after "QRS" insert --wave--;
    Col. 48, line 47, delete "wave form" and insert --waveform--;
    Col. 49, line 1, delete "wave form" and insert --waveform--;
    Col. 49, line 28, delete "wave form" and insert --waveform--;
    Col. 49, line 61, delete "wave form" and insert --waveform--;
    Col. 50, line 14, delete "wave form" and insert --waveform--;
    Col. 50, line 66, delete "wave form" and insert --waveform--.

Signed and sealed this 14th day of September 1971.

(SEAL)
Attest:

EDWARD M. FLETCHER, JR.      ROBERT GOTTSCHALK
Attesting Officer             Acting Commissioner of Patent